United States Patent
Walton et al.

(10) Patent No.: US 7,894,538 B2
(45) Date of Patent: *Feb. 22, 2011

(54) FREQUENCY-INDEPENDENT SPATIAL PROCESSING FOR WIDEBAND MISO AND MIMO SYSTEMS

(75) Inventors: J. Rodney Walton, Carlisle, MA (US); John W. Ketchum, Harvard, MA (US); Mark S. Wallace, Bedford, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/471,415

(22) Filed: Jun. 19, 2006

(65) Prior Publication Data
US 2006/0274844 A1    Dec. 7, 2006

Related U.S. Application Data

(63) Continuation of application No. 10/650,295, filed on Aug. 27, 2003, now Pat. No. 7,065,144.

(51) Int. Cl.
H04L 27/04 (2006.01)
(52) U.S. Cl. .................. 375/260; 375/299; 375/347
(58) Field of Classification Search ............. 375/260, 375/299, 347
See application file for complete search history.

(56) References Cited

U.S. PATENT DOCUMENTS 4,747,100 A    5/1988    Roach et al.
(Continued)

FOREIGN PATENT DOCUMENTS
EP    0475682    5/1991
(Continued)

OTHER PUBLICATIONS

International Search Report, PCT/US04/027038 - International Search Authority- European Patent Office - Dec. 17, 2004.
(Continued)

*Primary Examiner*—Kevin Y Kim
(74) *Attorney, Agent, or Firm*—Qualcomm Patent Group; Dmitry R. Milikovsky; James Hunt Yancey, Jr.

(57) ABSTRACT

Frequency-independent eigensteering in MISO and MIMO systems are described. For principal mode and multi-mode eigensteering, a correlation matrix is computed for a MIMO channel based on channel response matrices and decomposed to obtain $N_S$ frequency-independent steering vectors for $N_S$ spatial channels of the MIMO channel. $N_D$ data symbol streams are transmitted on $N_D$ best spatial channels using $N_D$ steering vectors, where $N_D=1$ for principal mode eigensteering and $N_D>1$ for multi-mode eigensteering. For main path eigensteering, a data symbol stream is transmitted on the best spatial channel for the main propagation path (e.g., with the highest energy) of the MIMO channel. For receiver eigensteering, a data symbol stream is steered toward a receive antenna based on a steering vector obtained for that receive antenna. For all eigensteering schemes, a matched filter is derived for each receive antenna based on the steering vector(s) and channel response vectors for the receive antenna.

80 Claims, 17 Drawing Sheets

U.S. PATENT DOCUMENTS

| | | | |
|---|---|---|---|
| 4,750,171 A | 6/1988 | Kedar et al. | |
| 5,081,623 A | 1/1992 | Ainscow et al. | |
| 5,133,081 A | 7/1992 | Mayo | |
| 5,276,703 A | 1/1994 | Budin et al. | |
| 5,297,144 A | 3/1994 | Gilbert et al. | |
| 5,384,777 A | 1/1995 | Ahmadi et al. | |
| 5,444,702 A | 8/1995 | Burnett et al. | |
| 5,638,371 A | 6/1997 | Raychaudhuri et al. | |
| 5,677,909 A | 10/1997 | Heide | |
| 5,684,791 A | 11/1997 | Raychaudhuri et al. | |
| 5,719,868 A | 2/1998 | Young et al. | |
| 5,729,542 A | 3/1998 | Dupont | |
| 5,818,842 A | 10/1998 | Burwell et al. | |
| 5,923,650 A | 7/1999 | Chen et al. | |
| 5,970,059 A | 10/1999 | Ahopelto et al. | |
| 5,974,045 A | 10/1999 | Ohkura et al. | |
| 6,002,691 A | 12/1999 | Citta et al. | |
| 6,014,087 A | 1/2000 | Krishnakumar et al. | |
| 6,069,886 A | 5/2000 | Ayerst et al. | |
| 6,111,927 A | 8/2000 | Sokoler | |
| 6,252,854 B1 | 6/2001 | Hortensius et al. | |
| 6,256,317 B1 | 7/2001 | Holloway et al. | |
| 6,404,751 B1 | 6/2002 | Roark et al. | |
| 6,433,737 B2 | 8/2002 | Katz et al. | |
| 6,438,104 B1 | 8/2002 | Fodor et al. | |
| 6,452,917 B1 | 9/2002 | Leung | |
| 6,456,599 B1 | 9/2002 | Elliott et al. | |
| 6,483,819 B1 | 11/2002 | Take et al. | |
| 6,504,506 B1 * | 1/2003 | Thomas et al. | 342/383 |
| 6,512,773 B1 | 1/2003 | Scott | |
| 6,532,225 B1 | 3/2003 | Chang et al. | |
| 6,553,020 B1 | 4/2003 | Hughes et al. | |
| 6,563,816 B1 | 5/2003 | Nodoushani et al. | |
| 6,580,704 B1 | 6/2003 | Wellig et al. | |
| 6,587,441 B1 | 7/2003 | Urban et al. | |
| 6,609,866 B2 | 8/2003 | Huang et al. | |
| 6,611,525 B1 | 8/2003 | Natanson et al. | |
| 6,611,529 B1 | 8/2003 | Krishnakumar et al. | |
| 6,621,805 B1 | 9/2003 | Kondylis et al. | |
| 6,621,827 B1 | 9/2003 | Rezvani et al. | |
| 6,625,171 B1 | 9/2003 | Matsudo | |
| 6,633,564 B1 | 10/2003 | Steer et al. | |
| 6,724,740 B1 | 4/2004 | Choi et al. | |
| 6,741,635 B2 | 5/2004 | Lo et al. | |
| 6,751,187 B2 | 6/2004 | Walton et al. | |
| 6,760,388 B2 | 7/2004 | Ketchum et al. | |
| 6,768,730 B1 | 7/2004 | Whitehill | |
| 6,771,706 B2 | 8/2004 | Ling et al. | |
| 6,791,962 B2 | 9/2004 | Wentink | |
| 6,795,409 B1 | 9/2004 | Youssefmir et al. | |
| 6,795,418 B2 | 9/2004 | Choi et al. | |
| 6,795,419 B2 | 9/2004 | Parantainen | |
| 6,813,260 B1 | 11/2004 | Fogle | |
| 6,847,626 B1 | 1/2005 | Carneal et al. | |
| 6,912,225 B1 | 1/2005 | Kohzuki et al. | |
| 6,868,133 B2 * | 3/2005 | Hicks et al. | 375/341 |
| 6,898,441 B1 | 5/2005 | Kogiantis et al. | |
| 6,907,020 B2 | 6/2005 | Periyalwar et al. | |
| 6,944,688 B1 | 9/2005 | Batcher | |
| 6,961,311 B2 | 11/2005 | Rakotoarivelo et al. | |
| 6,977,944 B2 | 12/2005 | Brockmann et al. | |
| 7,006,848 B2 | 2/2006 | Ling et al. | |
| 7,046,639 B2 | 5/2006 | Garcia-Luna-Aceves et al. | |
| 7,058,074 B2 | 6/2006 | Ho et al. | |
| 7,065,144 B2 | 6/2006 | Walton et al. | |
| 7,068,633 B1 | 6/2006 | Ho | |
| 7,079,552 B2 | 7/2006 | Cain et al. | |
| 7,082,117 B2 | 7/2006 | Billhartz | |
| 7,085,281 B2 | 8/2006 | Thomas et al. | |
| 7,092,737 B2 | 8/2006 | Horng et al. | |
| 7,095,732 B1 | 8/2006 | Watson, Jr. | |
| 7,099,300 B2 | 8/2006 | Sugaya | |
| 7,116,652 B2 | 10/2006 | Lozano et al. | |
| 7,123,627 B2 | 10/2006 | Kowalski | |
| 7,130,289 B2 | 10/2006 | Kuan et al. | |
| 7,142,527 B2 | 11/2006 | Garcia-Luna-Aceves et al. | |
| 7,145,895 B2 | 12/2006 | Mueckenheim et al. | |
| 7,149,245 B2 | 12/2006 | Budka et al. | |
| 7,154,876 B2 | 12/2006 | Benveniste | |
| 7,158,504 B2 | 1/2007 | Kadaba et al. | |
| 7,187,691 B2 | 3/2007 | Gavette | |
| 7,203,192 B2 | 4/2007 | Desai et al. | |
| 7,236,459 B1 | 6/2007 | Okholm et al. | |
| 7,260,073 B2 | 8/2007 | Sipola et al. | |
| 7,263,083 B2 | 8/2007 | Kisigami et al. | |
| 7,266,087 B2 | 9/2007 | Wahl | |
| 7,269,152 B2 | 9/2007 | Vukovic et al. | |
| 7,274,707 B2 | 9/2007 | Choi et al. | |
| 7,277,419 B2 | 10/2007 | McGowan | |
| 7,277,430 B2 | 10/2007 | Ono et al. | |
| 7,280,513 B2 | 10/2007 | Cao et al. | |
| 7,284,260 B2 | 10/2007 | Hilts et al. | |
| 7,301,924 B1 | 11/2007 | Gurbuz et al. | |
| 7,301,944 B1 | 11/2007 | Redmond | |
| 7,313,104 B1 | 12/2007 | Kern et al. | |
| 7,330,877 B2 | 2/2008 | Kandala | |
| 7,333,556 B2 | 2/2008 | Maltsev et al. | |
| 7,336,642 B2 | 2/2008 | Rich et al. | |
| 7,372,855 B2 | 5/2008 | Kandala | |
| 7,400,641 B2 | 7/2008 | Koo et al. | |
| 7,400,642 B2 | 7/2008 | Koo et al. | |
| 7,417,974 B2 | 8/2008 | Hansen et al. | |
| 7,440,573 B2 | 10/2008 | Lor et al. | |
| 7,450,550 B2 | 11/2008 | Jin et al. | |
| 7,512,070 B2 | 3/2009 | Stephens | |
| 7,599,340 B2 | 10/2009 | Chandra et al. | |
| 7,633,946 B2 | 12/2009 | Pavon et al. | |
| 7,639,657 B1 | 12/2009 | Ho et al. | |
| 7,706,399 B2 | 4/2010 | Janczak | |
| 2001/0024173 A1 | 9/2001 | Katz et al. | |
| 2001/0053141 A1 | 12/2001 | Periyalwar et al. | |
| 2002/0046257 A1 | 4/2002 | Killmer et al. | |
| 2002/0067736 A1 | 6/2002 | Garcia-Luna-Aceves et al. | |
| 2002/0071413 A1 | 6/2002 | Choi et al. | |
| 2002/0071449 A1 | 6/2002 | Ho et al. | |
| 2002/0093929 A1 | 7/2002 | Mangold et al. | |
| 2002/0172186 A1 | 11/2002 | Larsson | |
| 2002/0172217 A1 | 11/2002 | Kadaba et al. | |
| 2002/0191703 A1 | 12/2002 | Ling et al. | |
| 2003/0002605 A1 | 1/2003 | Lo et al. | |
| 2003/0003880 A1 | 1/2003 | Ling et al. | |
| 2003/0015611 A1 | 1/2003 | Teng et al. | |
| 2003/0043732 A1 | 3/2003 | Walton et al. | |
| 2003/0063563 A1 | 4/2003 | Kowalski et al. | |
| 2003/0076797 A1 | 4/2003 | Lozano et al. | |
| 2003/0108117 A1 | 6/2003 | Ketchum et al. | |
| 2003/0125040 A1 | 7/2003 | Walton et al. | |
| 2003/0128684 A1 | 7/2003 | Hirsch et al. | |
| 2003/0169763 A1 | 9/2003 | Choi et al. | |
| 2003/0174645 A1 | 9/2003 | Paratainen et al. | |
| 2003/0174680 A1 | 9/2003 | Kuan et al. | |
| 2003/0198312 A1 | 10/2003 | Budka et al. | |
| 2003/0202574 A1 | 10/2003 | Budka et al. | |
| 2003/0223365 A1 | 12/2003 | Kowalski et al. | |
| 2003/0223418 A1 | 12/2003 | Desai et al. | |
| 2004/0042556 A1 | 3/2004 | Medvedev et al. | |
| 2004/0047319 A1 | 3/2004 | Elg | |
| 2004/0082356 A1 | 4/2004 | Walton et al. | |
| 2004/0105386 A1 | 6/2004 | Sipola et al. | |
| 2004/0109433 A1 | 6/2004 | Khan et al. | |
| 2004/0125778 A1 | 7/2004 | Lin et al. | |
| 2004/0131019 A1 | 7/2004 | Kandala et al. | |
| 2004/0151199 A1 | 8/2004 | Sykes et al. | |
| 2004/0156345 A1 | 8/2004 | Steer et al. | |

| | | | |
|---|---|---|---|
| 2004/0156367 | A1 | 8/2004 | Albuquerque et al. |
| 2004/0163129 | A1 | 8/2004 | Chapman et al. |
| 2004/0204104 | A1 | 10/2004 | Horng et al. |
| 2004/0252664 | A1 | 12/2004 | Cao et al. |
| 2004/0258039 | A1 | 12/2004 | Stephens et al. |
| 2004/0258091 | A1 | 12/2004 | Meyer et al. |
| 2004/0264504 | A1 | 12/2004 | Jin |
| 2004/0266451 | A1 | 12/2004 | Stolyar et al. |
| 2005/0047429 | A1 | 3/2005 | Koo et al. |
| 2005/0053003 | A1 | 3/2005 | Cain et al. |
| 2005/0111462 | A1 | 5/2005 | Walton et al. |
| 2005/0135284 | A1 | 6/2005 | Nanda et al. |
| 2005/0135291 | A1 | 6/2005 | Ketchum et al. |
| 2005/0135295 | A1 | 6/2005 | Walton et al. |
| 2005/0135318 | A1 | 6/2005 | Walton et al. |
| 2005/0135403 | A1 | 6/2005 | Ketchum et al. |
| 2005/0135416 | A1 | 6/2005 | Ketchum et al. |
| 2005/0152465 | A1 | 7/2005 | Maltsev et al. |
| 2005/0239407 | A1 | 10/2005 | Foore et al. |
| 2006/0052088 | A1 | 3/2006 | Pavon et al. |
| 2006/0092871 | A1 | 5/2006 | Nishibayashi et al. |
| 2006/0099956 | A1 | 5/2006 | Harada et al. |
| 2006/0164969 | A1 | 7/2006 | Malik et al. |
| 2006/0165036 | A1 | 7/2006 | Chandra et al. |
| 2006/0193294 | A1 | 8/2006 | Jorswieck et al. |
| 2006/0274844 | A1 | 12/2006 | Walton et al. |
| 2007/0037548 | A1 | 2/2007 | Sammour et al. |
| 2007/0058605 | A1 | 3/2007 | Meylan et al. |
| 2008/0130660 | A1 | 6/2008 | Ros-Giralt et al. |
| 2009/0097444 | A1 | 4/2009 | Lohr et al. |
| 2009/0103558 | A1 | 4/2009 | Zangi et al. |
| 2009/0116434 | A1 | 5/2009 | Lohr et al. |

FOREIGN PATENT DOCUMENTS

| | | |
|---|---|---|
| EP | 1052855 | 11/2000 |
| EP | 1089500 A2 | 4/2001 |
| EP | 1182900 | 2/2002 |
| EP | 1261183 | 11/2002 |
| EP | 1317110 | 6/2003 |
| EP | 1463217 A1 | 9/2004 |
| JP | 2001160813 | 6/2001 |
| JP | 2001507907 T | 6/2001 |
| JP | 200360655 | 2/2003 |
| JP | 2003249939 | 9/2003 |
| JP | 2003258807 A | 9/2003 |
| JP | 2003289309 A | 10/2003 |
| KR | 2003-0036847 | 5/2003 |
| KR | 2006-0090258 | 8/2006 |
| KR | 2006-0090259 | 8/2006 |
| WO | 9905881 | 2/1999 |
| WO | 0056113 | 9/2000 |
| WO | WO0128170 A2 | 4/2001 |
| WO | WO 0171928 A2 | 9/2001 |
| WO | WO0176110 A2 | 10/2001 |
| WO | 0228119 | 4/2002 |
| WO | 0233852 | 4/2002 |
| WO | WO2002033582 A2 | 4/2002 |
| WO | WO02065664 A2 | 8/2002 |
| WO | 02082751 | 10/2002 |
| WO | 02093843 | 11/2002 |
| WO | WO02093843 A1 | 11/2002 |
| WO | 03032526 | 4/2003 |
| WO | WO03034619 A1 | 4/2003 |
| WO | WO 03039074 A1 | 5/2003 |
| WO | WO 03050968 A2 | 6/2003 |
| WO | WO2004030287 A2 | 4/2004 |
| WO | WO2004038985 A2 | 5/2004 |
| WO | 2005039127 | 4/2005 |
| WO | 2005039133 | 4/2005 |

OTHER PUBLICATIONS

International Preliminary Report on Patentability - PCT/US04/027038 - IPEA/US May 5, 2005.

Written Opinion - PCT/US04/027038 - International Search Authority - European Patent Office - Dec. 17, 2004.

3GPP2-C.S0002-C v1.0, "Physical Layer Standard for cdma2000 Spread Spectrum Systems", (TR 45.5), Release C, May 28, 2002.

ETSI TS 125 211 v5.6.0; "Universal Mobile Telecommunications System (UMTS); Physical channels and mapping of transport channels onto physical channels (FDD)", 3GPP TS 25.211 version 5.6.0 Release 5 (Sep. 2004).

ETSI TS 125 212 v6.2.0; "Universal Mobile Telecommunications System (UMTS); Multiplexing and channel coding (FDD)", 3G TS 25.212 version 6.2.0 Release 5 (Jun. 2004).

ETSI TS 125 213 v6.0.0; "Universal Mobile Telecommunications System (UMTS); Spreading and modulation (FDD)", 3G TS 25.213 version 6.0.0 Release 5 (Dec. 2003).

ETSI TS 125 214 v6.3.0; "Universal Mobile Telecommunications System (UMTS); Physical layer procedures (FDD)", 3G TS 25.214 version 6.3.0 Release 5 (Sep. 2004).

Seung et al., : "Multi-Stage Partial PIC Receivers for Multi-Rate DS-CDMA System with Multiple Modulation", IEEE 2003, pp. 591-594.

Won-Tae et al., : "MMAC : An Efficient WMATM MAC For Multicast Communications", Global Telecommunications Conference- Globecom '99, IEEE, pp. 587-591.

"TIA/EIA/IS-856 Standard" CDMA2000 High Rate Packet Data Air Interface Specification, Nov. 2000, (the IS-856 standard).

3GPP2 TS 25.211: "Physical channels and mapping of transport channels onto physical channels (FDD)", Release 6, V.6.0.0, Dec. 2003.

3GPP2 TS 25.212: "Multiplexing and channel coding (FDD)", Release 5, V.510.0, Jun. 2005.

3GPP2 TS 25.213: "Spreading and modulation (FDD)", Release 5, V5.6.0, Jun. 2005.

3GPP2 TS 25.214: "Physical layer procedures (FDD)", Release 5, V5.11.0, Jun. 2005.

3GPP: "TIA/EIA/IS-95-B Mobile Station-Base Station Compatibility Standard for Dual-Mode Wideband Spread Spectrum Cellular System".

TR-45.5 "Physical Layer Standard for cdma2000 Spread Spectrum Systems", (the IS-2000 standard).

"A Wireless Token Ring Protocol for Ad-Hoc Networks," IEEE Aerospace Conference Proceedings, 2002. vol. 3, pp. 6-1219 to 3-1228.

3GPP TS 25.211 v5.0.0 (Mar. 2002) Technical Specification Group Radio Access Network; Physical Channels and Mapping of Transport Channels onto Physical Channels (FDD) (Release 5).

3GPP TS 25.212 v6.0.0 (Dec. 2003) Technical Specification Group Radio Access Network; Multiplexing and Channel Coding (FDD) (Release 6),.

3GPP TS 25.213 v6.0.0 (Dec. 2003) Technical Specification Group Radio Access Network; Spreading and Modulation (FDD) (Release 6).

3GPP TS 25.214 v6.0.0 (Dec. 2003) Technical Specification Group Radio Access Network; Physical Layer Procedures (FDD) (Release 6).

ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Sep. 2004).

IEEE Std. 802.11a-1999 Part 11: Wireless LAN Medium Access Control (MAC) and Physical Layer (PHY) Specifications: High-speed Physical Layer in the 5 GHZ Band.

IEEE Std. 802.11b-1999 Part 11: Wireless LAN Medium Access Control (MAC) and Physical Layer (PHY) Specifications: Higher-Speed Physical Layer Extension in the 2.4 GHz Band.

IEEE Std. 802.11e-2003 Part 11: Wireless LAN Medium Access Control (MAC) and Physical Layer (PHY) Specifications, Amendment 4: Further Higher Data Rate Extension in the 2.4 GHz Band.

IEEE Std. 802.11g-2003 Part 11: Wireless LAN Medium Access Control (MAC) and Physical Layer (PHY) Specifications, Amendment 4: Further Higher Data Rate Extension in the 2.4 GHz Band.

Mangold, et al.: "IEEE 802.11e Wireless LAN for Quality of Service," Feb. 2002, pp. 1-8, XP002251598.

Mujtaba, "TGn Sync Proposal Technical Specification," IEEE Wireless LANS, IEEE 802.11-04/0899r5, May 2005, pp. 1-134.

TIA/EIA-95-B Mobile Station-Base Station Compatibility Standard for Dual-Mode Wideband Spread Spectrum Cellular System (IS-95 Standard), Mar. 1999.

TIA/EIA/IS-856 cdma2000 High Rate Packet Data Air Interface Specification, Nov. 2000.

TIA/EIA/IS-856-A, "cdma2000 High Rate Packet Data Air Interface Specification", (Revision of TIA/EIA/IS-856), Apr. 2004.

TR-45.5 Physical Layer Standard for cdma2000 Spread Spectrum Systems, 3GPP2 C.S000-2D, Version 1.0, Feb. 13, 2004.

3GPP: "TIA/EIA/IS-95-B Mobile Station-Base Station Compatibility Standard for Dual Mode Wideband Spread Spectrum Cellular System". Feb 3, 1999.

Ohgane et al. "Eigenbeam Spatial Multiplex (E-SDM) System in MIMO Channels", Technical Research Report by Electric Information Communication Academic Conference, May 17, 2002, vol. 102, No. 86, pp. 13-18, RCS2002-53.

* cited by examiner

FREQUENCY-INDEPENDENT SPATIAL PROCESSING FOR WIDEBAND MISO AND MIMO SYSTEMS

CLAIM OF PRIORITY UNDER 35 U.S.C. §120

The present Application for Patent is a continuation of patent application Ser. No. 10/650,295 entitled "FREQUENCY-INDEPENDENT SPATIAL PROCESSING FOR WIDEBAND MISO AND MIMO SYSTEMS" filed Aug. 27, 2003 now U.S. Pat. No. 7,065,144, allowed, and assigned to the assignee hereof and hereby expressly incorporated by reference herein.

BACKGROUND

I. Field

The present invention relates generally to data communication, and more specifically to techniques for performing spatial processing for wideband multiple-input single-output (MISO) and multiple-input multiple-output (MIMO) communication systems.

II. Background

A MIMO system employs multiple ($N_T$) transmit antennas and multiple ($N_R$) receive antennas for data transmission and is denoted as an ($N_T$, $N_R$) system. A MIMO channel formed by the $N_T$ transmit and $N_R$ receive antennas may be decomposed into $N_S$ independent channels, where $N_S \leq \min\{N_T, N_R\}$. $N_S$ spatial channels may be formed by the $N_S$ independent channels of the MIMO channel and used for data transmission.

For a time dispersive MIMO channel, a signal sent from a given transmit antenna may reach a given receive antenna via multiple signal paths (i.e., propagation paths). These signal paths may include a line-of-sight path and/or reflected paths, which are created when the transmitted signal reflects off reflection sources (e.g., buildings, obstructions, and so on) and arrives at the receive antenna via different signal paths than the line-of-sight path. The received signal at the receive antenna may thus include multiple instances (i.e., multipath components) of the signal sent from the transmit antenna. The delay spread L of the MIMO channel is the time difference between the earliest and latest arriving multipath components (of some certain minimum energy) for all of the transmit-receive antenna pairs in the MIMO channel.

Time dispersion in the MIMO channel causes frequency selective fading, which is characterized by a frequency response that varies across the system bandwidth (i.e., different channel gains for different frequencies). The multipath components are associated with different complex channel gains and may add constructively or destructively at the receiver. Time dispersion and frequency selective fading are more problematic for a wideband MIMO system with a wide system bandwidth.

Various techniques may be used to combat frequency selectivity in a wideband MIMO channel. For example, a multi-carrier modulation technique such as orthogonal frequency division multiplexing (OFDM) may be used to partition the system bandwidth into multiple ($N_F$) orthogonal frequency subbands. The wideband MIMO channel may then be viewed as being composed of $N_F$ flat-fading narrowband MIMO channels, each of which may be decomposed into $N_S$ spatial channels. Data may then be transmitted on the NS spatial channels of each of the NF subbands.

For a MIMO system that utilizes OFDM (i.e., a MIMO-OFDM system), the wideband MIMO channel can be characterized with (1) a complex channel gain for each of the $N_F$ subbands of each of the $N_T \cdot N_R$ transmit/receive antenna pairs (i.e., $N_F \cdot N_T \cdot N_R$ channel gains in all) and (2) the noise floor at the receiver. The channel gains and receiver noise floor may then be used to select the data rate(s) for data transmission on the $N_S$ spatial channels of each of the $N_F$ subbands. The channel gains may also be used for spatial processing at the receiver and possibly the transmitter in order to transmit data on the $N_S$ spatial channels of each of the $N_F$ subbands. Thus, for the MIMO-OFDM system, frequency selectivity can be combated by treating the wideband MIMO channel as $N_F$ flat-fading narrowband MIMO channels and performing spatial processing separately for each of the narrowband MIMO channels. However, this frequency-dependent spatial processing can greatly increase computation complexity at the transmitter and receiver. Moreover, the receiver may need to provide a large amount of feedback information (e.g., the channel gains) to the transmitter to support frequency-dependent spatial processing.

There is therefore a need in the art for techniques to more efficiently perform spatial processing in a wideband MIMO system.

SUMMARY

Techniques for performing frequency-independent eigensteering in MISO and MIMO systems are provided herein. Eigensteering refers to spatial processing performed on a data symbol stream with a steering vector at a transmitter in order to transmit the data symbol stream on a spatial channel of a MISO channel or a MIMO channel. The MISO channel may be characterized by either (1) a sequence of time-domain channel impulse response vectors for a plurality of time delays or (2) a sequence of frequency-domain channel frequency response vectors for the $N_F$ subbands. Similarly, the MIMO channel may be characterized by either a sequence of channel impulse response matrices or a sequence of channel frequency response matrices. The eigensteering is frequency-independent in that one steering vector is used for the data symbol stream even if the MISO or MIMO channel is time dispersive and regardless of whether the eigensteering is performed in the time domain or the frequency domain. Eigensteering may be performed on one or multiple data symbol streams with one or multiple steering vectors to transmit the data symbol stream(s) on one or multiple spatial channels. Various frequency-independent eigensteering schemes are described herein including principal mode eigensteering, multi-mode eigensteering, main path eigensteering, and receiver eigensteering.

For principal mode and multi-mode eigensteering, a correlation matrix is computed for the MIMO channel based on the channel (impulse or frequency) response matrices for the MIMO channel, as described below. The correlation matrix is then decomposed (e.g., using eigenvalue decomposition) to obtain $N_S$ frequency-independent steering vectors for $N_S$ spatial channels of the MIMO channel. For principal mode eigensteering, one data symbol stream is transmitted on the principal or best spatial channel using the steering vector $\underline{v}_{pm}$ for the best spatial channel. For multi-mode eigensteering, $N_D$ data symbol streams are transmitted on the $N_D$ best spatial channels using $N_D$ steering vectors $\underline{V}_{mm}$ for these spatial channels, where $N_S \geq N_D > 1$ in this case.

For main path eigensteering, a data symbol stream is transmitted on the principal spatial channel for the main propagation path of the MIMO channel using a frequency-independent steering vector $\underline{v}_{mp}$. For this scheme, the energy of each channel impulse response matrix is first determined. The main path is the time delay of the channel impulse response matrix with the highest energy. A correlation matrix of the channel impulse response matrix with the highest energy is computed and decomposed to obtain the steering vector $\underline{v}_{mp}$ for the best spatial channel of the main path. The data symbol stream is transmitted on this spatial channel using the steering vector $\underline{v}_{mp}$.

For receiver eigensteering, a data symbol stream is steered toward an individual receive antenna based on a frequency-independent steering vector $\underline{v}_{rx,i}$ obtained for that receive antenna. The MIMO channel may be viewed as being composed of $N_R$ MISO channels for the $N_R$ receive antennas. A correlation matrix may be computed for each MISO channel based on its sequence of channel (impulse or frequency) response vectors and decomposed to obtain a steering vector for the main spatial channel of that MISO channel. $N_R$ frequency-independent steering vectors $\underline{V}_{rx}$ may be obtained for the $N_R$ MISO channels. $N_D$ data symbol streams may be transmitted using the $N_R$ steering vectors $\underline{V}_{rx}$, where min$\{N_R, N_T\} \geq N_D \geq 1$ in this case. Each data symbol stream may be steered to one, multiple, or all receive antennas. For a MISO system with one receive antenna, one steering vector is obtained for the single receive antenna and used to transmit one data symbol stream.

For all of the eigensteering schemes, a matched filter is derived for each receive antenna based on the steering vector(s) used by the transmitter and the sequence of channel (impulse or frequency) response vectors for the receive antenna. The received symbol stream for each receive antenna is filtered with the matched filter for that receive antenna to obtain one or more filtered symbol substreams. The filtered symbol substreams from all $N_R$ matched filters for the $N_R$ receive antennas are then combined to obtain $N_D$ detected symbol streams for the $N_D$ data streams sent by the transmitter, where $N_D \geq 1$ in this case. Equalization and other post-processing may be performed on the $N_D$ detected symbol streams to obtain $N_D$ recovered symbol streams, which are estimates of the $N_D$ data symbol streams sent by the transmitter.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
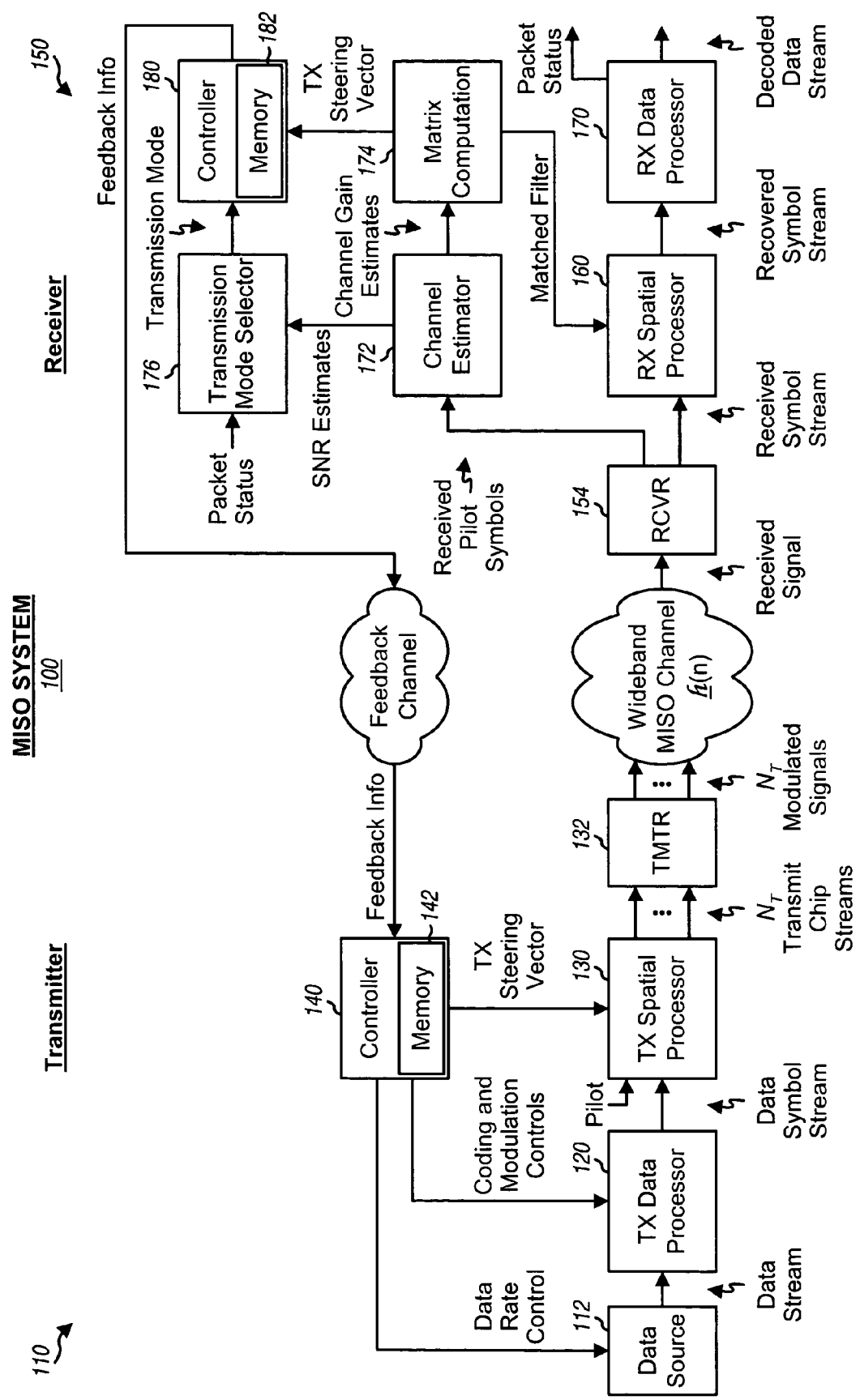
FIG. 1 shows a transmitter and a receiver in a MISO system.

The word "exemplary" is used herein to mean "serving as an example, instance, or illustration." Any embodiment or design described herein as "exemplary" is not necessarily to be construed as preferred or advantageous over other embodiments or designs.

The eigensteering techniques described herein may be used for various wireless communication systems including single-carrier and multi-carrier MISO and MIMO systems. Multiple carriers may be provided by OFDM or some other multiple-carrier modulation technique or construct. In the description below, the term "MIMO system" generically refers to both single-carrier and multi-carrier MIMO systems.

For clarity, the following notations are used for the description below. Time-domain variables are functions of n and are denoted with cursive texts (e.g., h(n)). Frequency-domain variables are functions of k and are denoted with plain texts (e.g., h(k)). Vectors are denoted with lower-case bold-faced and underlined texts (e.g., $\underline{h}(n)$ and $\underline{h}(k)$). Matrices are denoted with upper-case bold-faced and underlined texts (e.g., $\underline{H}((n)$ and $\underline{H}(k)$). Three-dimension matrices are denoted with upper-case bold-faced and doubly underlined texts (e.g., $\underline{\underline{H}}$ and $\underline{\underline{H}}$).

i) MISO System

A time-dispersive MISO channel with $N_T$ transmit antennas and a single receive antenna may be characterized by a time-domain channel impulse response matrix $\underline{\underline{H}}$ with dimensions of $(L+1) \times N_T$, where L denotes the delay extent of the MISO channel in symbol periods. The delay extent of a channel is the difference between the earliest and latest resolvable propagation paths in the channel. The matrix $\underline{\underline{H}}$ is composed of $N_T$ channel impulse response vectors $\underline{h}_j$, for j=1, 2, ... $N_T$, or equivalently, L+1 row vectors $\underline{h}(n)$, for n=0, 1, ... L, which may be expressed as:

$$\underline{\underline{\mathcal{H}}} = \begin{bmatrix} \underline{\mathscr{h}}(0) \\ \underline{\mathscr{h}}(1) \\ \vdots \\ \underline{\mathscr{h}}(L) \end{bmatrix} \qquad \text{Eq (1)}$$

$$= \begin{bmatrix} \mathscr{h}_1(0) & \mathscr{h}_2(0) & \cdots & \mathscr{h}_{N_T}(0) \\ \mathscr{h}_1(1) & \mathscr{h}_2(1) & \cdots & \mathscr{h}_{N_T}(1) \\ \vdots & \vdots & \ddots & \vdots \\ \mathscr{h}_1(L) & \mathscr{h}_2(L) & \cdots & \mathscr{h}_{N_T}(L) \end{bmatrix}$$

$$= [\underline{\mathscr{h}}_1 \underline{\mathscr{h}}_2 \cdots \underline{\mathscr{h}}_{N_T}],$$

where entry $h_j(n)$, for j=1, 2, ... $N_T$ and n=0, 1, ... L, is the coupling (i.e., complex gain) between transmit antenna j and the receive antenna for time delay n. Each vector $\underline{h}_j$, for j=1, 2, ... $N_T$, includes L+1 complex values for the channel impulse response between transmit antenna j and the receive antenna. Each row vector $\underline{h}(n)$, for n=0, 1, ... L, includes $N_T$ complex values for the channel gains between the $N_T$ transmit antennas and the receive antenna for time delay n.

The channel impulse response may be estimated by the receiver based on pilot symbols sent by the transmitter. The transmitter can "cover" the pilot for each transmit antenna with a unique orthogonal sequence assigned to that antenna. Covering is a process whereby a given modulation symbol p (or a set of W symbols having the same value) to be transmitted is multiplied by all W chips of a W-chip orthogonal sequence to obtain W covered symbols, which are then transmitted. $N_T$ orthogonal pilots can be obtained with $N_T$ orthogonal sequences for the $N_T$ transmit antennas. The covering achieves orthogonality among the $N_T$ pilots sent from the $N_T$ transmit antennas and allows the receiver to distinguish the individual transmit antennas.

The receiver can "decover" the received pilot symbols with each of the same $N_T$ orthogonal sequences to estimate the channel impulse response between each of the $N_T$ transmit antennas and the receive antenna. Decovering is a complementary process whereby W received symbols for W covered symbols are multiplied by the W chips of the same W-chip orthogonal sequence to obtain W decovered symbols, which are then accumulated to obtain an estimate of the transmitted symbol p. The decovering is performed at L+1 time delays to obtain the L+1 row vectors $\underline{h}(n)$, for n=0, 1, ... L, for the channel impulse response of the MISO channel.

A time dispersive MISO channel may also be characterized by a two-dimensional frequency-domain channel frequency response matrix $\underline{H}$ with dimensions of $N_F \times N_T$, where $N_F$ is the number of frequency subbands and $N_F \geq (L+1)$. The matrix $\underline{H}$ is composed of $N_T$ channel frequency response vectors $\underline{h}_j$, for j=1, 2, ... $N_T$, i.e., $\underline{H}=[\underline{h}_1 \ \underline{h}_2 \ ... \ \underline{h}_{N_T}]$. Each vector $\underline{h}_j$ includes $N_F$ frequency-domain values that may be obtained by performing an $N_F$-point discrete Fourier transform (DFT) on the L+1 time-domain values of the corresponding vector $\underline{h}_j$ of the matrix $\underline{H}$. For each transmit-receive antenna pair, there is thus a one-to-one correspondence between the time-domain channel impulse response vector $\underline{h}_j$ and the frequency-domain channel frequency response vector $\underline{h}_j$. The matrix $\underline{H}$ is equivalently composed of $N_F$ row vectors $\underline{h}(k)$, for k=1, 2, ... $N_F$, i.e., $\underline{H}=[\underline{h}^T(1) \ \underline{h}^T(2) \ ... \ \underline{h}^T(N_F)]^T$, where $M^T$ is the transpose of $\underline{M}$. Each row vector $\underline{h}(k)$ includes $N_T$ complex gain values for the frequency response between the $N_T$ transmit antennas and the receive antenna for subband k. The DFT to obtain $\underline{h}(k)$ may be expressed as:

$$\underline{h}(k) = \sum_{n=0}^{L} \underline{h}(n) \cdot e^{-j(2\pi/N_F)(k-1)n}, \quad \text{Eq (2)}$$

for $k = 1, 2, ... N_F$.

The transmitter may perform eigensteering on a data symbol stream s(n) prior to transmission via the MISO channel in order to achieve higher received signal-to-noise ratio (SNR) for the data symbol stream. The eigensteering may be performed using a frequency-independent steering vector $\underline{v}_{miso}$ which may be derived to maximize the received SNR or based on some other criteria.

In one embodiment, the steering vector $\underline{v}_{miso}$ for the transmitter is obtained by first computing an $N_T \times N_T$ correlation matrix $\underline{R}_{miso}$ as follows:

$$\underline{R}_{miso} = \sum_{n=0}^{L} \underline{h}^H(n)\underline{h}(n) = \frac{1}{N_F}\sum_{k=1}^{N_F} \underline{h}^H(k)\underline{h}(k), \quad \text{Eq (3)}$$

where $\underline{h}^H$ is the conjugate transpose of $\underline{h}$. The matrix $\underline{R}_{miso}$ may be viewed as an average of either L+1 individual correlation matrices of $\underline{h}(n)$ for L+1 time delays or $N_F$ individual correlation matrices of $\underline{h}(k)$ for $N_F$ subbands. The individual correlation matrices are given equal weight in equation (3). In another embodiment, the individual correlation matrices may be given unequal weights in the computation of $\underline{R}_{miso}$. For example, each individual correlation matrix may be weighted by the energy associated with that matrix, which can be computed as described below.

Eigenvalue decomposition of the correlation matrix $\underline{R}_{miso}$ is then performed as follows:

$$\underline{R}_{miso} = \underline{V}_{miso}\underline{\Lambda}_{miso}\underline{V}_{miso}^H, \quad \text{Eq (4)}$$

where $\underline{V}_{miso}$ is an $N_T \times N_T$ unitary matrix whose columns are the eigenvectors of $\underline{R}_{miso}$; and $\underline{\Lambda}_{miso}$ is an $N_T \times N_T$ diagonal matrix whose diagonal entries are the eigenvalues of $\underline{R}_{miso}$.

A unitary matrix $\underline{M}$ is characterized by the property $\underline{M}^H\underline{M}=\underline{I}$, where $\underline{I}$ is the identity matrix with ones along the diagonal and zeros elsewhere. The $N_T$ eigenvectors of the unitary matrix $\underline{V}_{miso}$, denoted as $\underline{v}_j$ for j=1, 2, ... $N_T$, are thus orthogonal to one another. Moreover, the length of each eigenvector is equal to one, i.e., $$\|\underline{v}_j\|^2 = \sum_{i=1}^{N_T} |v_{i,j}|^2 = 1,$$

where $\underline{v}_j = [v_{1,j} \ v_{2,j} \ ... \ v_{N_T,j}]^T$. The $N_T$ eigenvectors are also referred to as steering vectors and may be used for eigensteering by the transmitter and matched filtering by the receiver, as described below.

The matrix $\underline{R}_{miso}$ is of dimension $N_T \times N_T$ and rank $N_{miso}$, where $N_{miso} \leq \min\{N_T, (L+1)\}$. The diagonal matrix $\underline{\Lambda}_{miso}$ thus contains $N_{miso}$ positive real values along the diagonal and zeros elsewhere. The largest non-zero entry is referred to as the principal eigenvalue $\lambda_{miso}$ of the matrix $\underline{R}_{miso}$ and is indicative of the power gain for the spatial channel (or "time-domain eigenrode") corresponding to that eigenvalue. The frequency-independent steering vector $\underline{v}_{miso}$ to use for eigensteering is the "principal" eigenvector of $\underline{R}_{miso}$, which is the column of $\underline{V}_{miso}$ that corresponds to the principal eigenvalue of $\underline{R}_{miso}$.

The transmitter performs eigensteering on the data symbol stream s(n) with the steering vector $\underline{v}_{miso}$ to obtain $N_T$ transmit symbol streams $\underline{x}_{miso}(n)$, as follows:

$$\underline{x}_{miso}(n) = s(n) \cdot \underline{v}_{miso}. \quad \text{Eq (5)}$$

With the eigensteering shown in equation (5), the data symbol stream s(n) observes an effective channel that is a single-input single-output (SISO) channel with an effective channel impulse response of $\underline{h}(n)\underline{v}_{miso}$, for n=0, 1, ... L. The $N_T$ transmit symbol streams $\underline{x}_{miso}(n)$ are further processed and transmitted from the $N_T$ transmit antennas to the receiver.

The receiver obtains a received symbol stream $y_{miso}(n)$ from the single receive antenna, which may be expressed as:

$$y_{miso}(n) = \underline{h}(n) \otimes \underline{x}_{miso}(n) + n_{miso}(n), \quad \text{Eq (6)}$$

-continued $$\tilde{s}_{miso}(n) = \left(\sum_{j=0}^{L} \underline{h}(j)s(n-j)\underline{v}_{miso}\right) + n_{miso}(n),$$

where "⊗" denotes a convolution and $n_{miso}(n)$ is additive white Gaussian noise (AWGN). The received symbol stream $y_{miso}(n)$ experiences intersymbol interference (ISI), which is a phenomenon whereby each symbol in a received stream acts as distortion to subsequent symbols in the received stream. Intersymbol interference may be mitigated through the use of OFDM in conjunction with a sufficiently long cyclic prefix, as described below. Alternatively, for a single-carrier MISO system, intersymbol interference may be mitigated through the use of appropriate temporal matched filtering in combination with equalization, as also described below.

The receiver can perform matched filtering of the received symbol stream $y_{miso}(n)$ in either the time domain or the frequency domain. The time-domain matched filtering may be expressed as:

$$\tilde{s}_{miso}(n) = \underline{v}_{miso}^H \underline{h}^H(L-n) \otimes \underline{y}_{miso}(n), \qquad \text{Eq (7)}$$

$$= \underline{v}_{miso}^H \sum_{j=0}^{L} \underline{h}^H(L-j) \cdot \underline{y}_{miso}(n-j),$$

where $\tilde{s}_{miso}(n)$ denotes a detected symbol stream, which is an estimate of the data symbol stream $s(n)$ sent by the transmitter. The matched filter $m_{miso}(n) = \underline{v}_{miso}^H \underline{h}^H(L-n)$, for $n=0, 1, \ldots L$, maximizes the received SNR.

An equalizer may be used to mitigate intersymbol interference due to time dispersion in the MIMO channel. The equalizer may be a minimum mean square error (MMSE) equalizer, a decision feedback equalizer (DFE), a maximum likelihood sequence estimator (MLSE), or some other type of equalizer. The equalizer may be implemented with an adaptive filter having coefficients that can be updated with pilot and/or data symbols and based on a particular criterion (e.g., minimum mean square error). The equalizer performs equalization on the detected symbol stream $\tilde{s}_{miso}(n)$ and provides a recovered symbol stream $\hat{s}_{miso}(n)$, which is a better estimate of the data symbol stream $s(n)$ sent by the transmitter. In general, the detected symbol stream $\tilde{s}_{miso}(n)$ may be provided directly as the recovered symbol stream $\hat{s}_{miso}(n)$ or may be post-processed (e.g., equalized) to obtain the recovered symbol stream $\hat{s}_{miso}(n)$.

The frequency-domain matched filtering may be expressed as:

$$\hat{s}_{miso}(k) = \underline{v}_{miso}^H \underline{h}^H(k) \underline{y}_{miso}(k), \text{ for } k=1, 2, \ldots N_F, \qquad \text{Eq (8)}$$

where $\hat{s}_{miso}(k)$ is the recovered symbol substream for subband k; and $y_{miso}(k)$ is the received symbol substream for subband k.

The $N_F$ received symbol substreams $y_{miso}(k)$, for $k=1, 2, \ldots N_F$, may be obtained by performing a fast Fourier transform (FFT) of each set of $N_F$ symbols in the received symbol stream $y_{miso}(n)$. The matched filter $m_{miso}(k) = \underline{v}_{miso}^H \underline{h}^H(k)$, for $k=1, 2, \ldots N_F$, is a complex-valued scalar that maximizes the received SNR for each subband. The $N_F$ recovered symbol substreams for the $N_F$ subbands may be multiplexed together to obtain the recovered symbol stream $\hat{s}_{miso}(n)$.

For both time-domain and frequency-domain matched filtering, the received SNR may be expressed as:

$$SNR_{miso} = \frac{P_{total}}{\sigma^2} \underline{v}_{miso}^H \underline{R}_{miso} \underline{v}_{miso} = \frac{P_{total}}{\sigma^2} \lambda_{miso}, \qquad \text{Eq (9)}$$

where $P_{total}$ is the total transmit power used by the transmitter for the data symbol stream;

$\sigma^2$ is the noise floor at the receiver; and $\lambda_{miso}$ is the principal eigenvalue of $\underline{R}_{miso}$.

The capacity $C_{miso}^{fi}$ of the MISO channel with frequency-independent eigensteering may be determined using frequency-domain analysis and assuming that the same steering vector is used for all $N_F$ subbands. The capacity $C_{miso}^{fi}$ may be expressed as:

$$C_{miso}^{fi} = \sum_{k=1}^{N_F} \log_2(1 + SNR(k)) = \sum_{k=1}^{N_F} \log_2(1 + \rho \cdot \underline{v}_{miso}^H \underline{R}(k) \underline{v}_{miso}), \qquad \text{Eq (10)}$$

where $\rho$ is the average received SNR as measured at the receive antenna, which is equal to the total receive power divided by the receiver noise $\sigma^2$. The matrix $\underline{R}(k)$ is the correlation matrix of $\underline{h}(k)$, which may be obtained and decomposed as follows:

$$\underline{R}(k) = \underline{h}^H(k) \underline{h}(k) = \underline{U}(k) \underline{\Lambda}(k) \underline{U}^H(k), \text{ for } k=1, 2, \ldots N_F, \qquad \text{Eq (11)}$$

where $\underline{\Lambda}(k)$ is the diagonal matrix of eigenvalues of $\underline{R}(k)$, and
$\underline{U}(k)$ is the unitary matrix of eigenvectors of $\underline{R}(k)$.

The quadratic term in equation (10) may be expressed as:

$$\underline{v}_{miso}^H \underline{R}(k) \underline{v}_{miso} = \underline{v}_{miso}^H \underline{U}(k) \underline{\Lambda}(k) \underline{U}^H(k) \underline{v}_{miso} = \underline{z}^H(k) \underline{\Lambda}(k) \underline{z}(k), \qquad \text{Eq (12)}$$

where $\underline{z}(k) = \underline{U}^H(k) \underline{v}_{miso}$. Since $\underline{R}(k)$ has only one non-zero eigenvalue, equation (12) may be simplified as follows:

$$\underline{v}_{miso}^H \underline{R}(k) \underline{v}_{miso} = |z_1(k)|^2 \lambda(k), \qquad \text{Eq (13)}$$

where $\lambda(k)$ is the non-zero eigenvalue of $\underline{R}(k)$, which is $\lambda(k) = \|\underline{h}(k)\|^2$ for a MISO channel, and $z_1(k)$ is the element of $\underline{z}(k)$ corresponding to the eigenvalue $\lambda(k)$. The capacity $C_{miso}^{fi}$ of the MISO channel with frequency-independent eigensteering may then be expressed as:

$$C_{miso}^{fi} = \sum_{k=1}^{N_F} \log_2(1 + \rho \cdot |z_1(k)|^2 \cdot \lambda(k)). \qquad \text{Eq (14)}$$

The capacity $C_{miso}^n$ for the MISO channel without eigensteering at the transmitter (or equivalently with a steering vector $\underline{v} = [g \ g \ \ldots \ g]$, where $g = \sqrt{1/N_T}$) may be expressed as:

$$C_{miso}^n = \sum_{k=1}^{N_F} \log_2\left(1 + \frac{\rho}{N_T} \cdot \lambda(k)\right). \qquad \text{Eq (15)}$$

In general, the capacity $C_{miso}^{fi}$ of the MISO channel with frequency-independent eigensteering is greater than the capacity $C_{miso}^{n}$ of the MISO channel without eigensteering.

An exemplary method has been described above for obtaining the frequency-independent steering vector $\underline{v}_{miso}$ for eigensteering at the transmitter in the MISO system. The steering vector may also be obtained in other manners, and this is within the scope of the invention.

The frequency-independent eigensteering may also be used for a MISO system that employs OFDM (i.e., a MISO-OFDM system). The transmitter can perform eigensteering in the time-domain, as shown in equation (5), where s(n) denotes a sequence of time-domain chips for OFDM symbols generated for the data stream by OFDM modulation. OFDM modulation is described below. The transmitter can also perform eigensteering in the frequency-domain on the data symbols for each subband, prior to the OFDM modulation to generate OFDM symbols. The receiver can perform matched filtering in the time-domain, as shown in equation (7), or the frequency-domain, as shown in equation (8).

ii) MIMO System

A time-dispersive MIMO channel with $N_T$ transmit antennas and $N_R$ receive antennas may be characterized by a three-dimensional time-domain channel impulse response matrix $\underline{\underline{H}}$ with dimensions of $N_R \times N_T \times (L+1)$. The matrix $\underline{\underline{H}}$ is composed of L+1 channel impulse response matrices $\underline{H}(n)$, for n=0, 1, . . . L, i.e., $\underline{\underline{H}} = [\underline{H}(0) \; \underline{H}(1) \; . . . \; \underline{H}(L)]$, which may be expressed as:

$$\mathcal{H}(n) = \begin{bmatrix} \underline{h}_1(n) \\ \underline{h}_2(n) \\ \vdots \\ \underline{h}_{N_R}(n) \end{bmatrix} = \begin{bmatrix} \underline{h}_{1,1}(n) & \underline{h}_{1,2}(n) & \cdots & \underline{h}_{1,N_T}(n) \\ \underline{h}_{2,1}(n) & \underline{h}_{2,2}(n) & \cdots & \underline{h}_{2,N_T}(n) \\ \vdots & \vdots & \ddots & \vdots \\ \underline{h}_{N_R,1}(n) & \underline{h}_{N_R,2}(n) & \cdots & \underline{h}_{N_R,N_T}(n) \end{bmatrix}, \quad \text{Eq (16)}$$

for n=0, 1, . . . L, where entry $h_{i,j}(n)$, for i=1, 2, . . . $N_R$, j=1, 2, . . . $N_T$, and n=0, 1, . . . L, is the coupling (i.e., complex gain) between transmit antenna j and receive antenna i for time delay n. The row vector $\underline{h}_i(n)$, for i=1, 2, . . . $N_R$ and n=0, 1, . . . L, includes $N_T$ complex values for the channel gains between the $N_T$ transmit antennas and receive antenna i for time delay n.

The channel impulse response may be estimated by the receiver based on pilot symbols sent by the transmitter. In one embodiment, the transmitter covers the pilot for each transmit antenna with an orthogonal code assigned to that antenna. The pilots sent from the $N_T$ transmit antennas are covered by $N_T$ orthogonal codes and may be individually recovered. At the receiver, the received pilot from each receive antenna i is decovered with the $N_T$ orthogonal codes at a particular time delay to obtain the channel response between receive antenna i and each of the $N_T$ transmit antennas for that time delay, i.e., one row of the matrix $\underline{H}(n)$. The decovering is performed separately for all $N_R$ receive antennas to obtain the $N_R$ rows of the matrix $\underline{H}(n)$. The decovering is also performed at L+1 time delays (i.e., for n=0, 1, . . . L) for each transmit-receive antenna pair to obtain the L+1 time-domain values for the channel impulse response for that transmit-receive antenna pair.

A time dispersive MIMO channel may also be characterized by a corresponding three-dimensional frequency-domain channel frequency response matrix $\underline{\underline{H}}$ with dimensions of $N_R \times N_T \times N_F$, where $N_F > L$. The matrix $\underline{\underline{H}}$ is composed of $N_F$ channel frequency response matrices $\underline{H}(k)$, for k=1, 2, . . . $N_F$, which can be obtained by computing an $N_F$-point discrete Fourier transform on the L+1 channel impulse response matrices $\underline{H}(n)$, for n=0, 1, . . . L, as follows:

$$\underline{H}(k) = \begin{bmatrix} \underline{h}_1(k) \\ \underline{h}_2(k) \\ \vdots \\ \underline{h}_{N_R}(k) \end{bmatrix} = \sum_{n=0}^{L} \mathcal{H}(n) \cdot e^{-j(2\pi/N_F)(k-1)n}, \quad \text{Eq (17)}$$

for $k = 1, 2, \ldots N_F$.

Each matrix $\underline{H}(k)$, for k=1, 2, . . . $N_F$, includes $N_R$ row vectors $\underline{h}_i(k)$, for i=1, 2, . . . $N_R$, for the $N_R$ receive antennas. Each row vector $\underline{h}_i(k)$ includes $N_T$ complex values for the channel gains between the $N_T$ transmit antennas and receive antenna i for subband k. Each entry $\underline{h}_{i,j}$ of the matrix $\underline{\underline{H}}$, for i=1, 2, . . . $N_R$ and j=1, 2, . . . $N_T$, includes $N_F$ frequency-domain values that may be obtained by taking the DFT of the L+1 time-domain values for a corresponding entry $\underline{h}_{i,j}$ of the matrix $\underline{\underline{H}}$. For each transmit-receive antenna pair, there is thus a one-to-one correspondence between the channel impulse response $\underline{h}_{i,j}$ and the channel frequency response $\underline{h}_{i,j}$.

Frequency-independent eigensteering may be performed in various manners for a MIMO system. Some exemplary frequency-independent eigensteering schemes are described below.

A. Principal-Mode Eigensteering

For principal-mode eigensteering, a data symbol stream is transmitted on the principal spatial channel of the MIMO channel using a single frequency-independent steering vector $\underline{v}_{pm}$. To obtain this steering vector, an $N_T \times N_T$ correlation matrix $\underline{R}_{mimo}$ is first computed as follows:

$$\underline{R}_{mimo} = \sum_{n=0}^{L} \mathcal{H}^H(n)\mathcal{H}(n) = \frac{1}{N_F}\sum_{k=1}^{N_F} \underline{H}^H(k)\underline{H}(k), \quad \text{Eq (18)}$$

$$= \sum_{n=0}^{L}\sum_{j=1}^{N_T} \underline{h}_j^H(n)\underline{h}_j(n) = \frac{1}{N_F}\sum_{k=1}^{N_F}\sum_{j=1}^{N_T} \underline{h}^H(k)\underline{h}(k).$$

Eigenvalue decomposition of $\underline{R}_{mimo}$ is then performed as follows:

$$\underline{R}_{mimo} = \underline{V}_{mimo}\underline{\Lambda}_{mimo}\underline{V}_{mimo}^H, \quad \text{Eq (19)}$$

where $\underline{V}_{mimo}$ is a unitary matrix of eigenvectors of $\underline{R}_{mimo}$ and $\underline{\Lambda}_{mimo}$ is a diagonal matrix whose diagonal entries are the eigenvalues of $\underline{R}_{mimo}$.

A MIMO channel may be decomposed into $N_S$ spatial channels, where $N_S \leq \min\{N_T, N_R\}$. The matrix $\underline{R}_{mimo}$ is of rank $N_S$ and the diagonal matrix $\underline{\Lambda}_{mimo}$ contains $N_S$ non-negative real values along the diagonal. The largest non-zero diagonal entry is referred to as the principal eigenvalue $\lambda_{mimo}$ of the matrix $\underline{R}_{mimo}$. In an embodiment, the steering vector $\underline{v}_{pm}$ to use for eigensteering is the principal eigenvector of $\underline{R}_{mimo}$, which is the column of $\underline{V}_{mimo}$ that corresponds to the principal eigenvalue of $\underline{R}_{mimo}$. The steering vector $\underline{v}_{pm}$ may be viewed as being for the principal spatial channel of the "averaged" MIMO channel.

The transmitter performs eigensteering on the data symbol stream s(n) with the steering vector $\underline{v}_{pm}$ to obtain $N_T$ transmit symbol streams $\underline{\chi}_{pm}(n)$, as follows:

$$\underline{\chi}_{pm}(n) = s(n) \cdot \underline{v}_{pm}. \qquad \text{Eq (20)}$$

With the eigensteering shown in equation (20), the data symbol stream s(n) observes an effective channel that is a single-input multiple-output (SIMO) channel with an effective channel impulse response of $\underline{H}(n)\underline{v}_{pm}$, for n=0, 1, ... L. The $N_T$ transmit symbol streams $\underline{\chi}_{pm}(n)$ are further processed and sent from the $N_T$ transmit antennas to the receiver.

The receiver obtains $N_R$ received symbol streams $\underline{y}_{pm}(n)$ from the $N_R$ receive antennas, which may be expressed as:

$$\underline{y}_{pm}(n) = \underline{H}(n) \otimes \underline{\chi}_{pm}(n) + \underline{n}_{mimo}(n), \qquad \text{Eq (21)}$$

where $\underline{n}_{mimo}(n)$ is additive white Gaussian noise with a mean vector of $\underline{0}$ and a covariance matrix of $\underline{\Lambda}_n = \sigma^2 \underline{I}$, where $\underline{0}$ is a vector of all zeros. The receiver can perform matched filtering of the received symbol streams $\underline{y}_{pm}(n)$ in either the time domain or the frequency domain.

The time-domain matched filtering may be expressed as:

$$\tilde{s}_{pm}(n) = \underline{v}_{pm}^H \underline{H}^H(L-n) \otimes \underline{y}_{pm}(n), \text{ for } n=0, 1, \ldots L. \qquad \text{Eq (22)}$$

The receiver matched filter is $\underline{m}_{pm}(n) = \underline{v}_{pm}^H \underline{H}^H(L-n)$, for n=0, 1 ... L, which includes $N_R$ individual matched filters for the $N_R$ receive antennas. The matched filter $m_{pm,i}(n)$ for each receive antenna has an impulse response of $m_{pm,i}(n) = \underline{v}_{pm}^H \underline{h}_i^H(L-n)$, for n=0, 1, ... L, that maximizes the received SNR for that receive antenna. The outputs of the $N_R$ individual matched filters for the $N_R$ receive antennas are summed to obtain the detected symbol stream $\tilde{s}_{pm}(n)$. Post processing (e.g., equalization) may be performed on the detected symbol stream $\tilde{s}_{pm}(n)$ to obtain the recovered symbol stream $\hat{s}_{pm}(n)$.

The frequency-domain matched filtering may be expressed as:

$$\hat{s}_{pm}(k) = \underline{v}_{pm}^H \underline{H}^H(k) \underline{y}_{pm}(k), \text{ for } k=1, 2, \ldots N_F, \qquad \text{Eq (23)}$$

where $\underline{y}_{pm}(k)$ is the received symbol substreams for subband k, which can be obtained by performing an FFT of each set of $N_F$ symbols in the received symbol streams $\underline{y}_{pm}(n)$. The receiver matched filter is $\underline{m}_{pm}(k) = \underline{v}_{pm}^H \underline{H}^H(k)$, for k=1, 2, ... $N_F$, which includes $N_R$ individual matched filters for the $N_R$ receive antennas. The matched filter $m_{pm,i}(k)$ for each receive antenna i has a response of $m_{pm,i}(k) = \underline{v}_{pm}^H \underline{h}_i^H(k)$, for k=1, 2, ... $N_F$. The outputs of the $N_R$ individual matched filters for the $N_R$ receive antennas for each subband k are summed to obtain the recovered symbol substream $\hat{s}_{pm}(k)$ for that subband. The $N_F$ recovered symbol substreams for the $N_F$ subbands may be multiplexed to obtain the recovered symbol stream $\hat{s}_{pm}(n)$.

For both the time-domain and frequency-domain matched filtering, the received SNR, averaged across the $N_R$ receive antennas, may be expressed as:

$$SNR_{mimo}^{pm} = \frac{\rho}{N_R} \underline{v}_{pm}^H \underline{R}_{mimo} \underline{v}_{pm}. \qquad \text{Eq (24)}$$

The matched filter $\underline{v}_{pm}^H \underline{H}^H(L-n)$, for n=0, 1, ... L, maximizes the received SNR.

The capacity $C_{mimo}^{pm}$ of the MIMO channel with principal-mode eigensteering may be expressed as:

$$C_{mimo}^{pm} = \sum_{k=1}^{N_F} \log_2(1 + \rho \cdot \underline{v}_{pm}^H \underline{H}^H(k) \underline{H}(k) \underline{v}_{pm}). \qquad \text{Eq (25)}$$

The quadratic term in equation (25) may be expressed as:

$$\underline{v}_{pm}^H \underline{H}^H(k) \underline{H}(k) \underline{v}_{pm} = \sum_{\ell=1}^{N_T} \|\underline{v}_{pm}^H \underline{u}_\ell(k)\|^2 \cdot \lambda_\ell(k), \qquad \text{Eq (26)}$$

where $\underline{u}_l(k)$ is the eigenvector associated with the l-th eigenvalue $\lambda_l(k)$ of the correlation matrix $\underline{R}(k) = \underline{H}^H(k)\underline{H}(k)$. The capacity $C_{mimo}^{pm}$ may then be expressed as:

$$C_{mimo}^{pm} = \sum_{k=1}^{N_F} \log_2\left(1 + \rho \cdot \sum_{\ell=1}^{N_T} \|\underline{v}_{pm}^H \underline{u}_\ell(k)\|^2 \cdot \lambda_\ell(k)\right). \qquad \text{Eq (27)}$$

B. Multi-Mode Eigensteering

For multi-mode eigensteering, multiple data symbol streams are transmitted on multiple spatial channels of the MIMO channel using multiple frequency-independent steering vectors in a matrix $\underline{V}_{mm}$, whose columns are the eigenvectors of the correlation matrix $\underline{R}_{mimo}$. Since $\underline{R}_{mimo}$ is of rank $N_S$, where $N_S \leq \min\{N_T, N_R\}$, the matrix $\underline{V}_{mm}$ may include up to $N_S$ eigenvectors $\underline{v}_l$, for l=1, 2, ... $N_S$, for up to $N_S$ eigenmodes of $\underline{R}_{mimo}$. For clarity, the following description assumes that all $N_S$ eigenmodes are used for data transmission.

The transmitter performs eigensteering on $N_S$ data symbol streams $\underline{s}_{mm}(n)$ with the steering matrix $\underline{V}_{mm}$ to obtain $N_T$ transmit symbol streams $\underline{\chi}_{mm}(n)$, as follows:

$$\underline{\chi}_{mm}(n) = \underline{V}_{mm} \underline{s}(n), \qquad \text{Eq (28)}$$

where $\underline{s}_{mm}(n) = [s_1(n)\ s_2(n)\ \ldots\ s_{N_S}(n)]^T$, $\underline{V}_{mm} = [\underline{v}_1\ \underline{v}_2\ \ldots\ \underline{v}_{N_S}]$, and $N_S \leq \min\{N_T, N_R\}$ for a full-rank MIMO channel. Each data symbol stream $s_l(n)$, for l=1, 2, ... $N_S$, is steered with a respective steering vector $\underline{v}_l$ in the matrix $\underline{V}_{mm}$. Each data symbol stream $s_l(n)$ observes an effective channel that is a SIMO channel with an effective channel impulse response of $\underline{H}(n)\underline{v}_l$, for n=0, 1, ... L. The $N_T$ transmit symbol streams $\underline{\chi}_{mm}(n)$ are further processed and sent from the $N_T$ transmit antennas to the receiver.

The receiver obtains $N_R$ received symbol streams $\underline{y}_{mm}(n)$ from the $N_R$ receive antennas, which $\underline{y}_{mm}(n) = \underline{H}(n) \otimes \underline{\chi}_{mm}(n) + \underline{n}_{mimo}(n)$. For a time dispersive MIMO channel, the eigensteering with multiple frequency-independent steering vectors in the matrix $\underline{V}_{mm}$ does not diagonalize the channel. Thus, when multiple spatial channels are used for data transmission using frequency-independent eigensteering, there will in general be cross-talk between the multiple symbol streams as well as intersymbol interference at the receiver.

The receiver can perform matched filtering of the received symbol streams $\underline{y}_{mm}(n)$ in either the time domain or the frequency domain. The time-domain matched filtering may be expressed as:

$$\tilde{\underline{s}}_{mm}(n) = \underline{V}_{mm}^H \underline{H}^H(L-n) \otimes \underline{y}_{mm}(n), \qquad \text{Eq (29)}$$

where $\tilde{\underline{s}}_{mm}(n)$ denotes $N_S$ detected symbol streams. The receiver matched filter is $\underline{M}_{mm}(n) = \underline{V}_{mm}^H \underline{H}^H(L-n)$, for n=0, 1, ... L, which includes $N_R$ individual matched filters for the $N_R$ receive antennas. The matched filter $\underline{m}_{mm,i}(n)$ for each receive antenna has an impulse response of $\underline{m}_{mm,i}(n) = \underline{V}_{mm}^H \underline{h}_i^H(L-n)$, for $n=0, 1, \ldots L$. The output of the matched filter for each receive antenna includes $N_S$ filtered symbol substreams corresponding to the $N_S$ steering vectors (i.e., $N_S$ columns of $\underline{V}_{mm}$). The $N_R$ filtered symbol substreams from the $N_R$ matched filters for each steering vector are combined to obtain the detected symbol stream $\tilde{s}_l(n)$ for that steering vector. $N_S$ detected symbol streams $\underline{\tilde{s}}_{mm}(n)$ are obtained for the $N_S$ data symbols $\underline{s}_{mm}(n)$ sent by the transmitter.

The frequency-domain matched filtering may be expressed as:

$$\underline{\tilde{s}}_{mm}(k) = \underline{V}_{mm}^H \underline{H}^H(k) \underline{y}_{mm}(k), \text{ for } k=1, 2, \ldots N_F, \quad \text{Eq (30)}$$

where $\underline{y}_{mm}(k)$ is the received symbol substream for subband k, which is obtained by performing an FFT of each set of $N_F$ symbols in the received symbol stream $\underline{y}_{mm}(n)$. The receiver matched filter is $\underline{M}_{mm}(k) = \underline{V}_{mm}^H \underline{H}^H(k)$, for $k=1, 2, \ldots N_F$, which includes $N_R$ individual matched filters for the $N_R$ receive antennas. The matched filter $\underline{m}_{mm,i}(k)$ for each receive antenna has a response of $\underline{m}_{mm,i}(k) = \underline{V}_{mm}^H \underline{h}_i^H(k)$, for $k=1, 2, \ldots N_F$. For each subband k, the output of the matched filter for each receive antenna includes $N_S$ filtered symbol substreams corresponding to the $N_S$ transmit steering vectors. For each subband k, the $N_R$ filtered symbol substreams from the $N_R$ matched filters for each steering vector are combined to obtain the detected symbol substream $\tilde{s}_l(k)$ for that steering vector. The $N_F$ detected symbol substreams for the $N_F$ subbands for each steering vector are then multiplexed to obtain the detected symbol stream $\tilde{s}_l(n)$ for the data symbol stream $s_l(n)$ sent with that steering vector. $N_S$ detected symbol streams $\underline{\tilde{s}}_{mm}(n)$ are obtained for $N_S$ data symbol streams $\underline{s}_{mm}(n)$ sent by the transmitter.

As noted above, if multiple data symbol streams are transmitted simultaneously, then there is cross-talk between these data symbol streams at the receiver for a time dispersive MIMO channel. A space-time or "joint" equalizer may be used to mitigate the cross-talk and intersymbol interference due to time dispersion in the MIMO channel. The space-time equalizer may be a minimum mean square error linear equalizer (MMSE-LE), a decision feedback equalizer (DFE), a maximum likelihood sequence estimator (MLSE), or some other type of equalizer. The space-time equalizer may be designed to operate on the $N_S$ detected symbol streams $\underline{\tilde{s}}_{mm}(n)$ in both time and space domains to obtain $N_S$ recovered symbol streams $\underline{\hat{s}}_{mm}(n)$, which are improved estimates of the data symbol streams $\underline{s}_{mm}(n)$ sent by the transmitter. Exemplary designs of the MMSE-LE, DFE, and MLSE are described in commonly assigned U.S. patent application Ser. No. 09/993,087, entitled "Multiple-Access Multiple-Input Multiple-Output (MIMO) Communication System," filed Nov. 6, 2001.

The space-time equalizer may also implement a successive equalization and interference cancellation receiver processing technique, which successively recovers one data symbol stream at a time. As each data symbol stream is recovered, the interference it causes to the remaining, not yet recovered data symbol streams is estimated and canceled from the detected symbol streams to obtain "modified" symbol streams. The modified symbol streams are then processed to recover the next data symbol stream. The process is repeated until all $N_S$ data symbol streams are recovered. By removing the interference due to each recovered data symbol stream, the not yet recovered data symbol streams experience less interference and may achieve higher SNRs. The successive equalization and interference cancellation receiver processing technique is also described in the aforementioned U.S. patent application Ser. No. 09/993,087.

The capacity $C_{mimo}^{mm}$ of the MIMO channel with multi-mode eigensteering may be expressed as:

$$C_{mimo}^{mm} = \sum_{k=1}^{N_F} \log_2 \left| I + \frac{\rho}{N_S} \cdot \underline{V}_{mm}^H \underline{R}(k) \underline{V}_{mm} \right|, \quad \text{Eq (31)}$$

where $|\underline{M}|$ denotes the determinant of $\underline{M}$. A correlation matrix $\underline{\tilde{R}}(k)$ may be defined as $\underline{\tilde{R}}(k) = \underline{V}_{mm}^H \underline{R}(k) \underline{V}_{mm}$. The eigenvalues of $\underline{\tilde{R}}(k)$ may be computed and denoted as $\tilde{\lambda}_l(k)$, for $l=1, 2, \ldots N_S$ and $k=1, 2, \ldots N_F$. The capacity $C_{mimo}^{mm}$ of the MIMO channel with multi-mode eigensteering may then be expressed as:

$$C_{mimo}^{mm} = \sum_{k=1}^{N_F} \sum_{l=1}^{N_S} \log_2 \left( 1 + \frac{\rho}{N_S} \cdot \tilde{\lambda}_l(k) \right). \quad \text{Eq (32)}$$

C. Main Path Eigensteering

For main path eigensteering, a data symbol stream is transmitted on the principal spatial channel for the main propagation path of the MIMO channel using a single frequency-independent steering vector $\underline{v}_{mp}$. As noted above, a time dispersive MIMO channel can be characterized by L+1 channel impulse response matrices $\underline{H}(n)$, for $n=0, 1, \ldots L$. In an embodiment, the main path is defined as the propagation path with the most received energy. The energy $E(n)$ of each channel impulse response matrix $\underline{H}(n)$, for $n=0, 1, \ldots L$, may be computed as follows:

$$E(n) = \|\underline{H}(n)\|^2 = \sum_{j=1}^{N_R} \sum_{i=1}^{N_T} |\underline{h}_{i,j}(n)|^2, \quad \text{Eq (33)}$$

for $n = 0, 1, \ldots L$.

The energy $E(n)$ is also (1) the trace of the correlation matrix $\underline{R}(n) = \underline{H}^H(n) \underline{H}(n)$ and (2) the square of the Frobenius norm of the channel impulse response matrix $\underline{H}(n)$. The largest energy, $E_{max}$, for all L+1 time delays is then determined as:

$$E_{max} = \max_{n=0 \ldots L} \{E(n)\}. \quad \text{Eq (34)}$$

The main path delay $n_{mp}$ is equal to the time delay of the channel impulse response matrix with the highest energy $E_{max}$. The channel response matrix $\underline{H}_{mp}$ for the main path is then $\underline{H}_{mp} = \underline{H}(n_{mp})$.

A correlation matrix $\underline{R}_{mp}$ of $\underline{H}_{mp}$ is computed as $\underline{R}_{mp} = \underline{H}_{mp}^H \underline{H}_{mp}$. Eigenvalue decomposition of the correlation matrix $\underline{R}_{mp}$ may be expressed as:

$$\underline{R}_{mp} = \underline{V}_{mp} \underline{\Lambda}_{mp} \underline{V}_{mp}^H, \quad \text{Eq (35)}$$

where $\underline{V}_{mp}$ is a unitary matrix of eigenvectors of $\underline{R}_{mp}$ and $\underline{\Lambda}_{mp}$ is a diagonal matrix of eigenvalues of $\underline{R}_{mp}$.

The matrix $\underline{R}_{mp}$ is of rank $N_S$ and the diagonal matrix $\underline{\Lambda}_{mp}$ contains $N_S$ non-negative real values along the diagonal. The frequency-independent steering vector $\underline{v}_{mp}$ to use for eigensteering is the principal eigenvector of $\underline{R}_{mp}$, which is the column of $\underline{V}_{mp}$ that corresponds to the largest eigenvalue of $\underline{R}_{mp}$.

The transmitter performs eigensteering on the data symbol stream s(n) with the steering vector $\underline{v}_{mp}$ to obtain $N_T$ transmit symbol streams $\underline{\chi}_{mp}(n)$, as follows:

$$\underline{\chi}_{mp}(n) = s(n) \cdot \underline{v}_{mp}. \qquad \text{Eq (36)}$$

The spatial processing shown in equation (36) steers the transmit power in the direction of the principal spatial channel for the strongest propagation path.

The receiver can perform matched filtering of the received symbol streams $\underline{y}_{mp}(n)$, which is $\underline{y}_{mp}(n) = \underline{H}(n) \otimes \underline{\chi}_{mp}(n) + \underline{n}_{mimo}(n)$, in either the time domain or the frequency domain. The time-domain matched filtering may be expressed as:

$$\tilde{s}_{mp}(n) = \underline{v}_{mp}^H \underline{H}^H(L-n) \otimes \underline{y}_{mp}(n), \text{ for } n=0,1,\ldots L. \qquad \text{Eq (37)}$$

The detected symbol stream $\tilde{s}_{mp}(n)$ may be post processed (e.g., equalized) to obtain the recovered symbol stream $\hat{s}_{mp}(n)$.

The frequency-domain matched filtering may be expressed as:

$$\hat{s}_{mp}(k) = \underline{v}_{mp}^H \underline{H}^H(k) \underline{y}_{mp}(k), \text{ for } k=1,2,\ldots N_F. \qquad \text{Eq (38)}$$

The $N_F$ recovered symbol substreams $\hat{s}_{mp}(k)$, for k=1, 2, ... $N_F$, for the $N_F$ subbands may be multiplexed to obtain the recovered symbol stream $\hat{s}_{mp}(n)$.

In general, the receiver processing for main path eigensteering may be performed similar to that described above for principal-mode eigensteering. However, the matched filtering is performed based on the steering vector $\underline{v}_{mp}$ for the principal spatial channel of the main path instead of the steering vector $\underline{v}_{pm}$ for the principal spatial channel of the "averaged" MIMO channel.

D. Receiver Eigensteering

For receiver eigensteering, the MIMO channel is viewed as being composed of $N_R$ MISO channels for $N_R$ receive antennas. $N_R$ frequency-independent steering vectors may be obtained for the $N_R$ MISO channels in similar manner as that described above for the MISO system.

As shown in equation (16), the matrix $\underline{H}(n)$ for the MIMO channel is composed of $N_R$ channel impulse response vectors $\underline{h}_i(n)$, for i=1, 2, ... $N_R$. Each row vector $\underline{h}_i(n)$ includes the channel impulse response between the $N_T$ transmit antennas and receive antenna i. An $N_T \times N_T$ correlation matrix $\underline{R}_i$ may be computed for each receive antenna, as follows:

$$\underline{R}_i = \sum_{n=0}^{L} \underline{h}_i^H(n) \underline{h}_i(n) = \frac{1}{N_F} \sum_{k=1}^{N_F} \underline{h}_i^H(k) \underline{h}_i(k), \qquad \text{Eq (39)}$$

for $i = 1, 2, \ldots N_R$.

Eigenvalue decomposition of the correlation matrix $\underline{R}_i$ for each receive antenna may be performed as follows:

$$\underline{R}_i = \underline{V}_i \underline{\Lambda}_i \underline{V}_i^H, \text{ for } i=1,2,\ldots N_R, \qquad \text{Eq (40)}$$

where $\underline{V}_i$ is a unitary matrix whose columns are the eigenvectors of $\underline{R}_i$; and $\underline{\Lambda}_i$ is a diagonal matrix whose diagonal entries are the eigenvalues of $\underline{R}_i$.

Since each $\underline{h}_i(n)$ is a row vector for one receive antenna, the correlation matrix $\underline{R}_i$ has rank of less than or equal to min $\{(L+1), N_T\}$. For each receive antenna i, the frequency-independent steering vector $\underline{v}_{rx,i}$ that maximizes the received SNR for that receive antenna is the column of $\underline{V}_i$ that corresponds to the maximum non-zero eigenvalue of $\underline{R}_i$. $N_R$ steering vectors $\underline{v}_{rx,i}$, for i=1, 2, ... $N_R$, are obtained for the $N_R$ receive antennas and may be represented by an $N_T \times N_R$ matrix $\underline{V}_{rx} = [\underline{v}_{rx,1}\ \underline{v}_{rx,2}\ \ldots\ \underline{v}_{rx,N_R}]$.

One or multiple data symbol streams may be transmitted with receiver eigensteering. If one data symbol stream s(n) is transmitted, then the transmitter performs eigensteering on this data symbol stream with each of the $N_R$ steering vectors to obtain $N_T$ transmit symbol streams $\underline{\chi}_{rx}(n)$, as follows:

$$\underline{\chi}_{rx}(n) = s(n) \cdot \sum_{i=1}^{N_R} \underline{v}_{rx,i}. \qquad \text{Eq (41)}$$

Again, if one data symbol stream is transmitted, then the receiver can perform matched filtering of the $N_R$ received symbol streams $\underline{y}_{rx}(n)$, which is $\underline{y}_{rx}(n) = \underline{H}(n) \otimes \underline{\chi}_{rx}(n) + \underline{n}_{mimo}(n)$, in either the time domain or the frequency domain. For the time-domain technique, the matched filtering is first performed for each receive antenna, as follows:

$$\tilde{s}_{rx,i}(n) = \underline{v}_{rx,i}^H \underline{h}_i^H(L-n) \otimes \underline{y}_{mp}(n), \text{ for } i=1,2,\ldots N_R, \qquad \text{Eq (42)}$$

where $\tilde{s}_{rx,i}(n)$ is the filtered symbol stream for receive antenna i. The $N_R$ filtered symbol streams for all $N_R$ receive antennas are then combined to obtain the detected symbol stream $\tilde{s}_{rx}(n)$, as follows:

$$\tilde{s}_{rx}(n) = \sum_{i=1}^{N_R} \tilde{s}_{rx,i}(n). \qquad \text{Eq (43)}$$

The detected symbol stream $\tilde{s}_{rx}(n)$ may be post-processed (e.g., equalized) to obtain the recovered symbol stream $\hat{s}_{rx}(n)$, which is an estimate of the transmitted data symbol stream s(n).

For the frequency-domain technique, the matched filtering is first performed for each subband of each receive antenna, as follows:

$$\hat{s}_{rx,i}(k) = \underline{v}_{rx,i}^H \underline{h}_i^H(k) \underline{y}_{rx}(k), \text{ for } i=1,2,\ldots N_R \text{ and } k=1, 2,\ldots N_F, \qquad \text{Eq (44)}$$

where $\hat{s}_{rx,i}(k)$ is the filtered symbol substream for subband k of receive antenna i. The $N_R$ filtered symbol substreams for all $N_R$ receive antennas for subband k are then combined to obtain the detected symbol substream $\hat{s}_{rx}(k)$ for subband k, as follows:

$$\hat{s}_{rx}(k) = \sum_{i=1}^{N_R} \hat{s}_{rx,i}(k), \text{ for } k=1,2,\ldots N_F. \qquad \text{Eq (45)}$$

The $N_F$ detected symbol substreams $\hat{s}_{rx}(k)$ for all $N_F$ subbands may be multiplexed together to obtain the recovered symbol stream $\hat{s}_{rx}(n)$.

If multiple ($N_D$) data symbol streams are transmitted, where $N_S \geq N_D > 1$, then each data symbol stream may be steered to a respective set of one or more receive antennas. The transmitter performs eigensteering for each data symbol stream $s_l(n)$ with a set of $N_l$ steering vectors for a set of $N_l$ receive antennas to which that data symbol stream is steered, where $N_l \geq 1$. The eigensteering at the transmitter for each data symbol stream $s_l(n)$ may be expressed as:

$$\underline{x}_{rx,\ell}(n) = s_\ell(n) \cdot \sum_{j=1}^{N_\ell} \underline{v}_{rx,\ell,j}, \text{ for } \ell = 1, 2, \ldots N_D, \quad \text{Eq (46)}$$

where $\underline{x}_{rx,l}(n)$ is the $N_T$ transmit symbol substreams for data symbol stream $s_l(n)$, and $\underline{v}_{rx,l,j}$, for $j=1 \ldots N_l$, are the $N_l$ steering vectors for data symbol stream $s_l(n)$.

The $N_D$ sets of $N_T$ transmit symbol substreams for all $N_D$ data symbol streams are then combined to obtain the $N_T$ transmit symbol streams $\underline{x}_{rx}(n)$, as follows:

$$\underline{x}_{rx}(n) = \sum_{\ell=1}^{N_D} \underline{x}_{rx,\ell}(n). \quad \text{Eq (47)}$$

The receiver can perform matched filtering of the received symbol stream $y_i(n)$ for each receive antenna in either the time domain as shown in equation (42) or the frequency domain as shown in equation (44). The receiver can then combine the filtered symbol substreams $\tilde{s}_{l,j}(n)$, for $j=1 \ldots N_l$, from all receive antennas used for each data symbol stream $s_l(n)$ to obtain the detected symbol stream $\tilde{s}_l(n)$ for that data symbol stream. A space-time equalizer may be used to equalize the $N_D$ detected symbol streams $\underline{\tilde{s}}_{rx}(n)$ to obtain $N_D$ recovered symbol streams $\underline{\hat{s}}_{rx}(n)$.

The frequency-independent eigensteering may also be used for a MIMO-OFDM system. The transmitter can perform eigensteering in the time-domain, as shown in equations (20), (28), (36) and (41), where s(n) and $\underline{s}(n)$ denote sequence(s) of time-domain chips for OFDM symbols generated for the data stream(s) by OFDM modulation. The transmitter can also perform eigensteering in the frequency-domain on the data symbols for each subband, prior to the OFDM modulation to generate OFDM symbols. The receiver can perform matched filtering in the time-domain, as shown in equations (22), (29), (37), (42) and (43). The receiver can also perform matched filtering in the frequency-domain, as shown in equations (23), (30), (38), (44) and (45).

iii) MISO System

FIG. 1 shows a block diagram of a transmitter 110 and a receiver 150 in a MISO system 100. At transmitter 110, a transmit (TX) data processor 120 receives a data stream d(n) from a data source 112, processes (e.g., encodes, interleaves, and modulates) the data stream in accordance with a selected transmission mode, and provides a data symbol stream s(n). The selected transmission mode may be associated with a particular data rate, a particular coding scheme or code rate, and a particular modulation scheme to use for the data stream, which are respectively indicated by the data rate, coding, and modulation controls provided by a controller 140.

A TX spatial processor 130 receives the data symbol stream s(n) and may perform wideband processing such as spectral spreading or multi-carrier modulation, as described below. TX spatial processor 130 further performs eigensteering based on the frequency-independent steering vector $\underline{v}_{miso}$ (which is also referred to as a TX steering vector) provided by controller 140. TX spatial processor 130 also multiplexes pilot in with the data and provides $N_T$ transmit chip streams $\underline{c}_{miso}(n)$ for the $N_T$ transmit antennas. The processing by TX data processor 120 and TX spatial processor 130 is described in further detail below.

A transmitter unit (TMTR) 132 receives and conditions (e.g., converts to analog, frequency upconverts, filters, and amplifies) the $N_T$ transmit chip streams to obtain $N_T$ modulated signals. Each modulated signal is then transmitted from a respective transmit antenna (not shown in FIG. 1) and via the MISO channel to receiver 150. The MISO channel distorts the transmitted signals with a channel impulse response $\underline{h}(n)$ and further degrades the transmitted signals with additive white Gaussian noise and possibly interference from other transmission sources.

At receiver 150, the $N_T$ transmitted signals are received by a single receive antenna (not shown in FIG. 1), and the received signal is provided to a receiver unit (RCVR) 154. Receiver unit 154 conditions and digitizes the received signal to obtain a stream of samples for the transmitted data and pilot. Receiver unit 154 provides a received symbol stream $y_{miso}(n)$ (for the data) to a receive (RX) spatial processor 160 and received pilot symbols (for the pilot) to a channel estimator 172. RX spatial processor 160 performs matched filtering of the received symbol stream $y_{miso}(n)$ with a matched filter and provides a recovered symbol stream $\hat{s}_{miso}(n)$, which is an estimate of the data symbol stream s(n) sent by transmitter 110. An RX data processor 170 then processes (e.g., demodulates, deinterleaves, and decodes) the recovered symbol stream in accordance with the selected transmission mode to obtain a decoded data stream $\hat{d}(n)$, which is an estimate of the data stream d(n) sent by transmitter 110. RX data processor 170 may further provide the status of each received data packet.

Channel estimator 172 processes the received pilot symbols to obtain channel gain and SNR estimates for the MISO channel. A matrix computation unit 174 then processes the channel gain estimates to obtain the frequency-independent steering vector $\underline{v}_{miso}$ for TX spatial processor 130 and the matched filter for RX spatial processor 160. A transmission mode selector 176 receives the SNR estimates from channel estimator 172 and the packet status from RX data processor 170, determines a suitable transmission mode for the data stream, and provides the selected transmission mode to a controller 180.

Controller 180 receives the steering vector $\underline{v}_{miso}$ from computation unit 174 and the selected transmission mode from transmission mode selector 176 and assembles feedback information for transmitter 110. The feedback information is sent to transmitter 110 and used to adjust the processing of the data stream d(n) sent to receiver 150. For example, transmitter 110 may use the feedback information to adjust the data rate, the coding scheme, the modulation scheme, the eigensteering, or any combination thereof, for the data stream sent to receiver 150.

Controllers 140 and 180 direct the operation at transmitter 110 and receiver 150, respectively. Memory units 142 and 182 provide storage for program codes and data used by controllers 140 and 180, respectively. Memory units 142 and 182 may be internal to controllers 140 and 180, as shown in FIG. 1, or external to these controllers.

Figure 2:
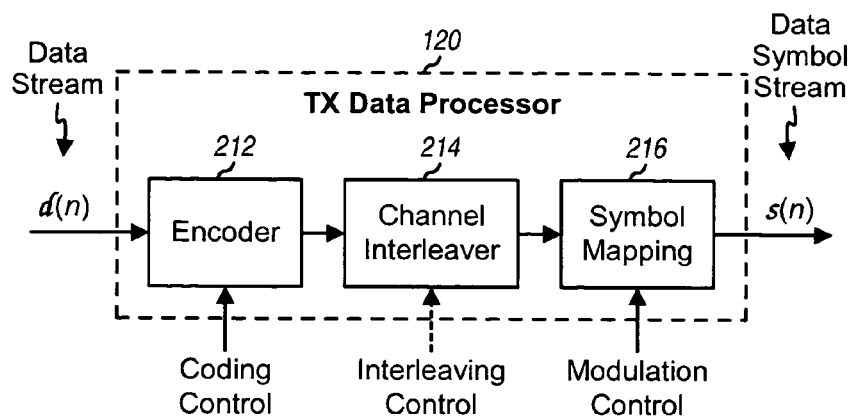
FIG. 2 shows a transmit (TX) data processor in the MISO system.

FIG. 2 shows a block diagram of an embodiment of TX data processor 120 in FIG. 1. Within TX data processor 120, an encoder 212 receives and codes the data stream d(n) based on a coding scheme indicated by the coding control and provides code bits. The data stream may carry one or more data packets, and each data packet is typically coded separately to obtain a coded data packet. The coding increases the reliability of the data transmission. The coding scheme may include cyclic redundancy check (CRC) coding, convolutional coding, turbo coding, block coding, and so on, or a combination thereof. A channel interleaver 214 interleaves the code bits based on an interleaving scheme, which may be indicated by an interleaving control if the interleaving is dependent on transmission mode. The interleaving provides time, frequency, and/or spatial diversity for the code bits.

A symbol mapping unit 216 maps the interleaved bits based on a modulation scheme indicated by the modulation control and provides a stream of modulation symbols (or simply, "data symbols"). Unit 216 groups each set of B interleaved bits to form a B-bit binary value, where $B \geq 1$, and further maps each B-bit value to a specific modulation symbol based on the modulation scheme (e.g., QPSK, M-PSK, or M-QAM, where $M=2^B$). Each modulation symbol is a complex value in a signal constellation defined by the modulation scheme.

Figure 3A:
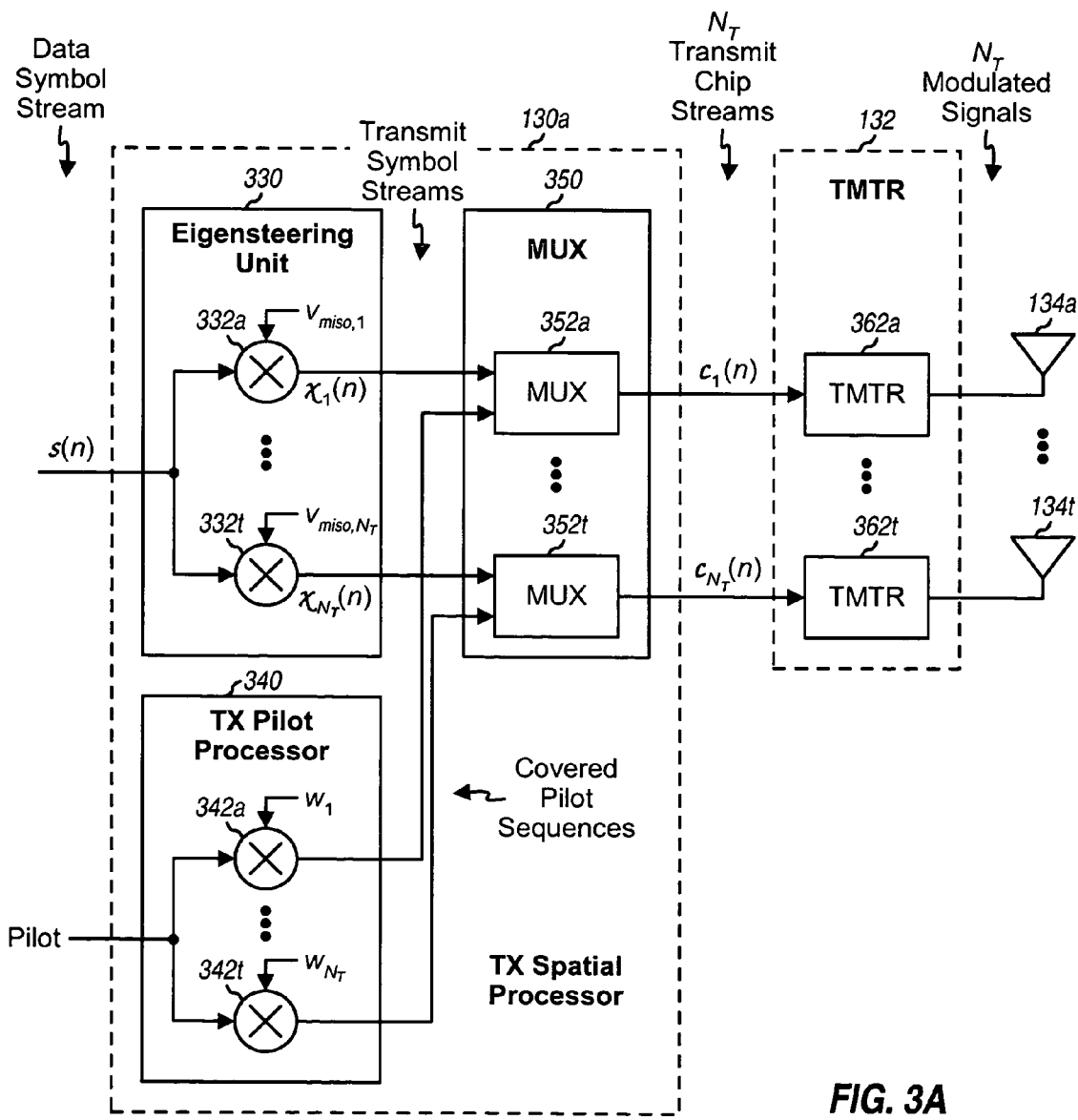
FIGS. 3A, 3B, and 3C show three embodiments of a TX spatial processor in the MISO system.

FIG. 3A shows a block diagram of a TX spatial processor 130a, which is an embodiment of TX spatial processor 130 in FIG. 1. TX spatial processor 130a includes an eigensteering unit 330, a TX pilot processor 340, and a multiplexer (MUX) 350.

Eigensteering unit 330 includes $N_T$ multipliers 332a through 332t, one multiplier 332 for each of the $N_T$ transmit antennas. Each multiplier 332 receives the data symbol stream s(n) and a respective element $v_{miso,j}$ of the TX steering vector $\underline{v}_{miso}$, multiplies each data symbol with the element $v_{miso,j}$, and provides a transmit symbol stream. Multipliers 332a through 332t perform frequency-independent eigensteering as shown in equation (5).

TX pilot processor 340 includes $N_T$ multipliers 342a through 342t, one multiplier 342 for each of the $N_T$ transmit antennas. Each multiplier 342 receives the pilot symbol and a unique orthogonal sequence $w_j$ assigned to its transmit antenna, multiplies the pilot symbol with the orthogonal sequence $w_j$, and provides a sequence of covered pilot symbols. Multipliers 342a through 342t generate $N_T$ orthogonal pilots for the $N_T$ transmit antennas, which may be used for channel estimation by receiver 150.

Multiplexer 350 includes $N_T$ multiplexers 352a through 352t, one multiplexer 352 for each of the $N_T$ transmit antennas. Each multiplexer 352 receives and multiplexes the transmit symbols from an associated multiplier 332 with the covered pilot symbols from an associated multiplier 342 and provides a respective stream of transmit chips $c_j(n)$. The pilot may be multiplexed with the data using time division multiplexing (TDM), as shown in FIG. 3A, code division multiplexing (CDM), subband multiplexing, or some other multiplexing scheme. In any case, multiplexers 352a through 352t provide $N_T$ transmit chip streams $c_j(n)$, for $j=1, 2, \ldots N_T$, for the $N_T$ transmit antennas.

Transmitter unit 132 includes $N_T$ transmitters 362a through 362t, one transmitter 362 for each of the $N_T$ transmit antennas. Each transmitter 362 receives and conditions a respective transmit chip stream to generate a modulated signal, which is then transmitted from an associated antenna 134.

Figure 3B:
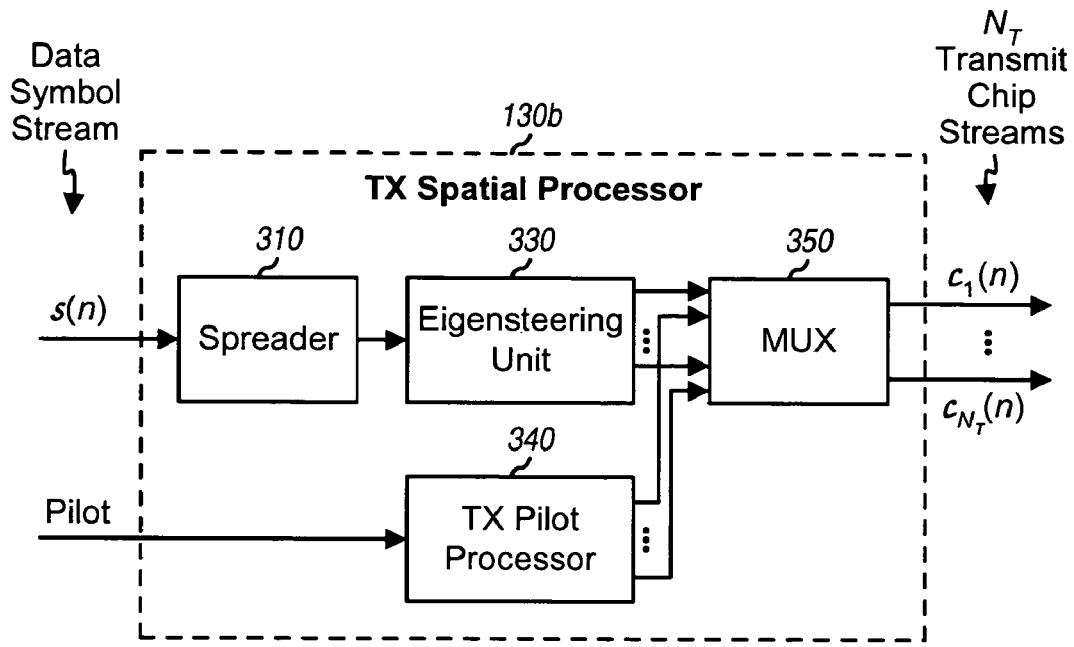

FIG. 3B shows a block diagram of a TX spatial processor 130b, which is another embodiment of TX spatial processor 130 in FIG. 1. TX spatial processor 130b performs spectral spreading in the time domain and includes a spreader 310, eigensteering unit 330, TX pilot processor 340, and multiplexer 350.

Within TX spatial processor 130b, spreader 310 receives and spectrally spreads the data symbol stream s(n) with a pseudo-random number (PN) sequence and provides a stream of spread data symbols. The spreading is especially applicable for a low rate data symbol stream to spectrally spread the data over the entire system bandwidth. The spreading may be performed in similar manner as for a CDMA system, which is well known in the art. The eigensteering is then performed on the spread data symbol stream (instead of the data symbol stream), as described above for FIG. 3A, to obtain $N_T$ transmit chip streams for the $N_T$ transmit antennas.

Figure 3C:
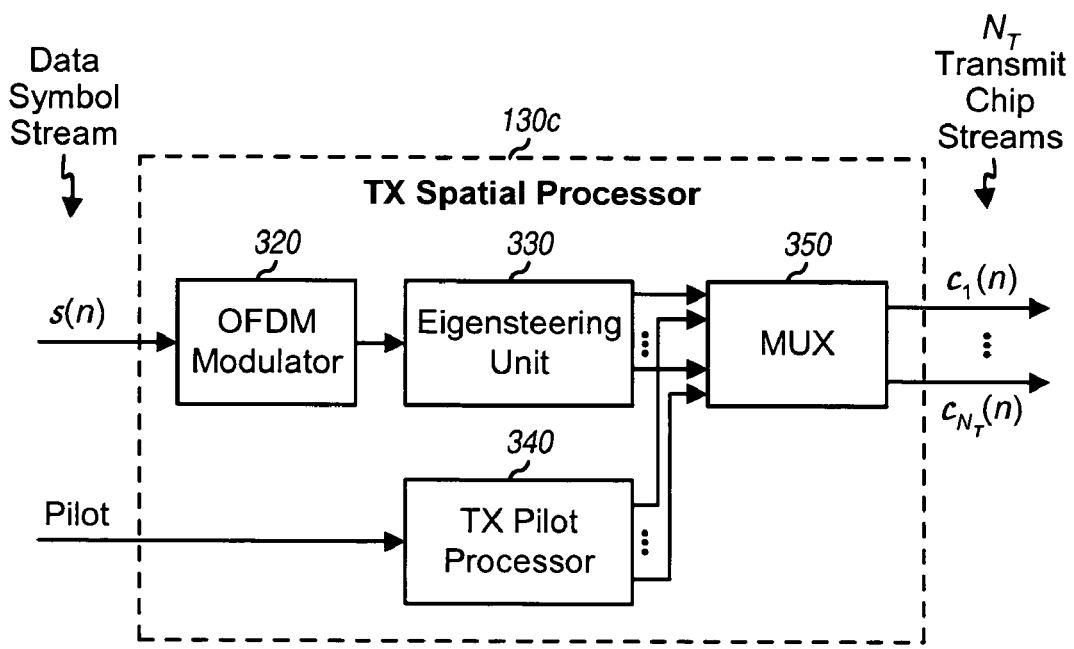

FIG. 3C shows a block diagram of a TX spatial processor 130c, which is yet another embodiment of TX spatial processor 130 in FIG. 1. TX spatial processor 130c performs OFDM modulation and includes an OFDM modulator 320, eigensteering unit 330, TX pilot processor 340, and multiplexer 350.

Within TX spatial processor 130c, an OFDM modulator 320 receives and performs OFDM modulation on the data symbol stream s(n). OFDM effectively partitions the overall system bandwidth into multiple ($N_F$) orthogonal subbands, which are also commonly referred to as tones, bins, and frequency subchannels. With OFDM, each subband is associated with a respective carrier that may be modulated with data. For each OFDM symbol period, one data or pilot symbol may be transmitted on each subband used for transmission, and a signal value of zero is provided for each unused subband. Within OFDM modulator 320, an inverse fast Fourier transform (IFFT) unit receives a set of data/pilot symbols and zeros for the $N_F$ subbands for each OFDM symbol period, transforms the set of data/pilot symbols and zeros to the time domain using an inverse fast Fourier transform, and provides a transformed symbol that contains $N_F$ time-domain chips. A cyclic prefix generator then repeats a portion of each transformed symbol to obtain an OFDM symbol that contains $N_F+N_{cp}$ chips, where $N_{cp}$ is the number of chips repeated. The cyclic prefix is used to combat frequency selective fading caused by time dispersion in the channel. OFDM modulator 320 provides a stream of data chips for a stream of OFDM symbols.

Eigensteering is then performed on the data chip stream (instead of the data symbol stream), as described above for FIG. 3A, to obtain $N_T$ transmit chip streams for the $N_T$ transmit antennas. Alternatively, the data symbol stream may be demultiplexed into $N_S$ data symbol substreams and eigensteering may be performed on each data symbol substream. In this case, the same steering vector $\underline{v}_{miso}$ is used for all subbands. OFDM modulation may then be performed on the output of the eigensteering for all subbands of each transmit antenna to obtain the transmit chip stream for that transmit antenna. In general, the eigensteering may be performed in either the time domain or the frequency domain. However, eigensteering in the time domain may require fewer multiplications and may thus be simpler to implement.

Figure 4A:
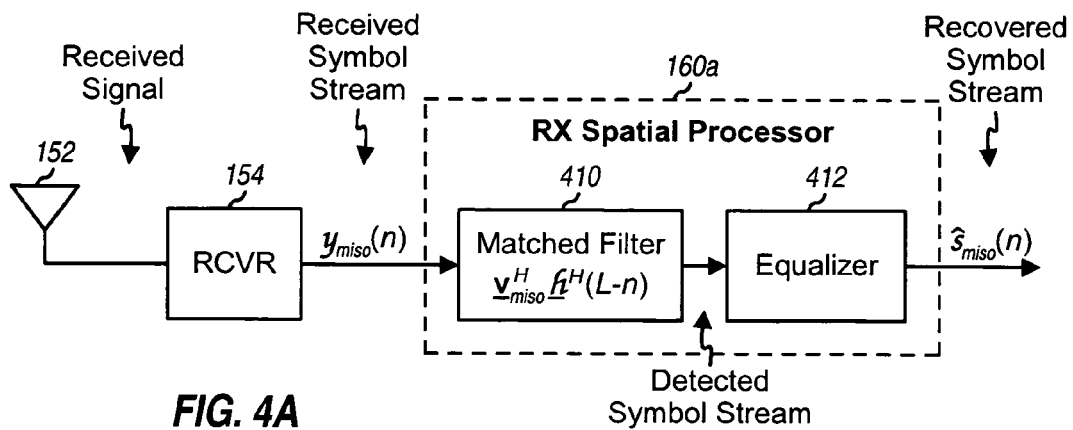
FIGS. 4A, 4B, and 4C show three embodiments of a receive (RX) spatial processor in the MISO system.

FIG. 4A shows a block diagram of an RX spatial processor 160a, which is one embodiment of RX spatial processor 160 in FIG. 1 and may be used in conjunction with TX spatial processor 130a in FIG. 3A. An antenna 152 receives the $N_T$ transmitted signals from transmitter 110 and provides the received signal. Receiver unit 154 conditions, digitizes, and pre-processes the received signal and provides the received symbol stream $y_{miso}(n)$. The pre-processing may include filtering, resampling, sample rate conversion, and so on.

Within RX spatial processor 160a, a matched filter 410 performs matched filtering of the received symbol stream $y_{miso}(n)$ with the matched filter $m_{miso}(n)=\underline{v}_{miso}^H \underline{h}^H(L-n)$, as shown in equation (7), and provides the detected symbol stream $\tilde{s}_{miso}(n)$. An equalizer 412 then performs equalization on the detected symbol stream and provides the recovered symbol stream $\hat{s}_{miso}(n)$. Equalizer 412 may implement an MMSE equalizer, a decision feedback equalizer, a maximum likelihood sequence estimator, or some other type of equalizer, all of which are known in the art. The equalization attempts to mitigate intersymbol interference due to frequency selectivity in the MISO channel. The matched filtering and equalization may be integrated together (e.g., matched filter 410 may be embedded in equalizer 412).

Figure 4B:
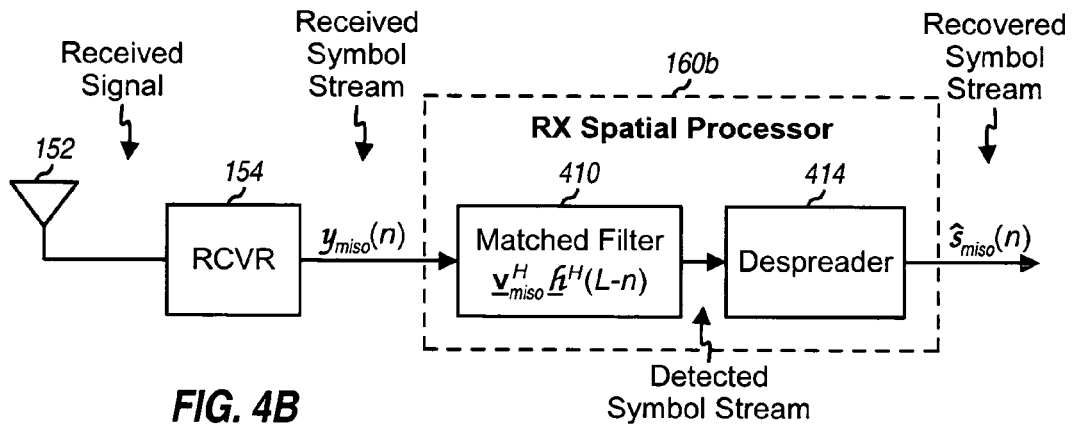

FIG. 4B shows a block diagram of an RX spatial processor 160b, which is another embodiment of RX spatial processor 160 in FIG. 1. RX spatial processor 160b performs spectral despreading in the time domain and may be used in conjunction with TX spatial processor 130b in FIG. 3B. Within RX spatial processor 160b, matched filter 410 performs matched filtering of the received symbol stream $y_{miso}(n)$ with the matched filter $m_{miso}(n) = \underline{v}_{miso}^H \underline{h}^H(L-n)$ and provides the detected symbol stream $\tilde{s}_{miso}(n)$. A despreader 412 then despreads the detected symbol stream with (the complex conjugate of) the PN sequence used by transmitter 110 and provides the recovered symbol stream $\hat{s}_{miso}(n)$. The despreading may be performed with a rake receiver in similar manner as for a CDMA system, which is known in the art.

Figure 4C:
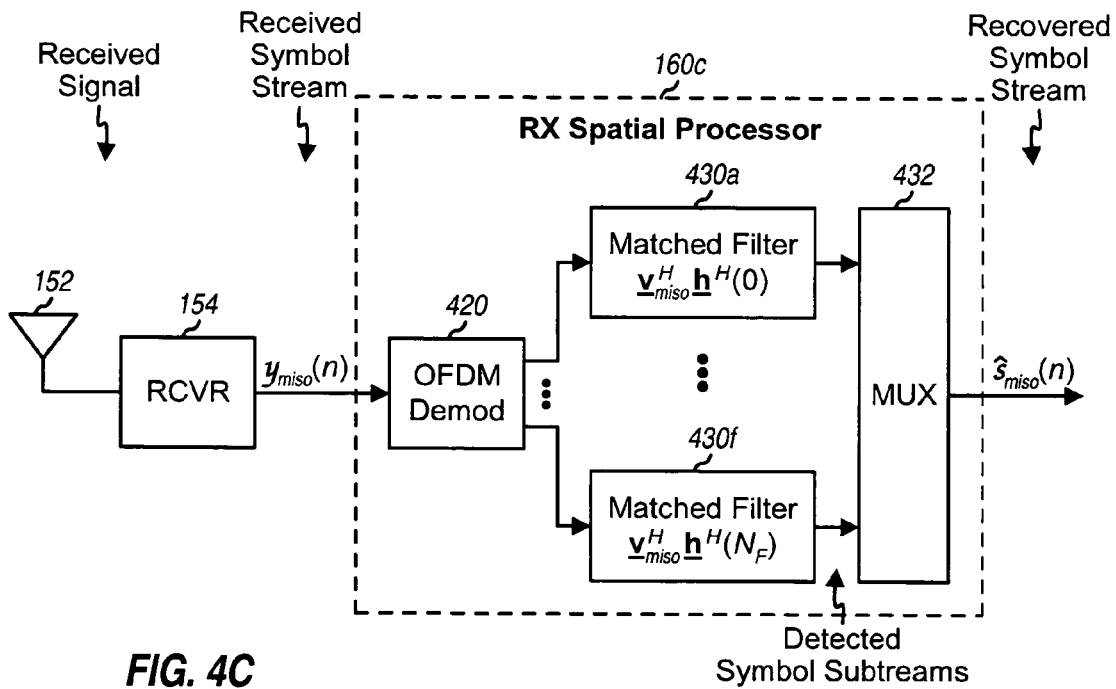

FIG. 4C shows a block diagram of an RX spatial processor 160c, which is yet another embodiment of RX spatial processor 160 in FIG. 1. RX spatial processor 160c performs OFDM demodulation and may be used in conjunction with TX spatial processor 130c in FIG. 3C. RX spatial processor 160c includes an OFDM demodulator 420, $N_F$ matched filters 430a through 430f for the $N_F$ subbands, and a multiplexer 432.

Within RX spatial processor 160c, OFDM demodulator 420 performs OFDM demodulation on the received symbol stream $y_{miso}(n)$. OFDM demodulator 420 first removes the cyclic prefix in each received OFDM symbol to obtain a received transformed symbol. OFDM demodulator 420 then transforms each received transformed symbol to the frequency domain using a fast Fourier transform (FFT) to obtain a set of $N_F$ received symbols for the $N_F$ subbands. OFDM demodulator 420 provides $N_F$ received symbol substreams $y_{miso}(k)$, for k=1, 2, . . . $N_F$, for the $N_F$ subbands to $N_F$ matched filters 430a through 430f. Each matched filter 430 performs matched filtering of its received symbol substream $y_{miso}(k)$ with its matched filter $m_{miso}(k) = \underline{v}_{miso}^H \underline{h}^H(k)$, which is a complex-valued scalar, and provides a detected symbol substream $\tilde{s}_{miso}(k)$. Multiplexer 432 receives and multiplexes the $N_F$ detected symbol substreams from all $N_F$ matched filters 430a through 430f and provides the recovered symbol stream $\hat{s}_{miso}(n)$. Fewer than $N_F$ subbands may be used for data transmission. In this case, the received symbols for the unused subbands are discarded and the matched filtering is not performed for the unused subbands.

Figure 5:
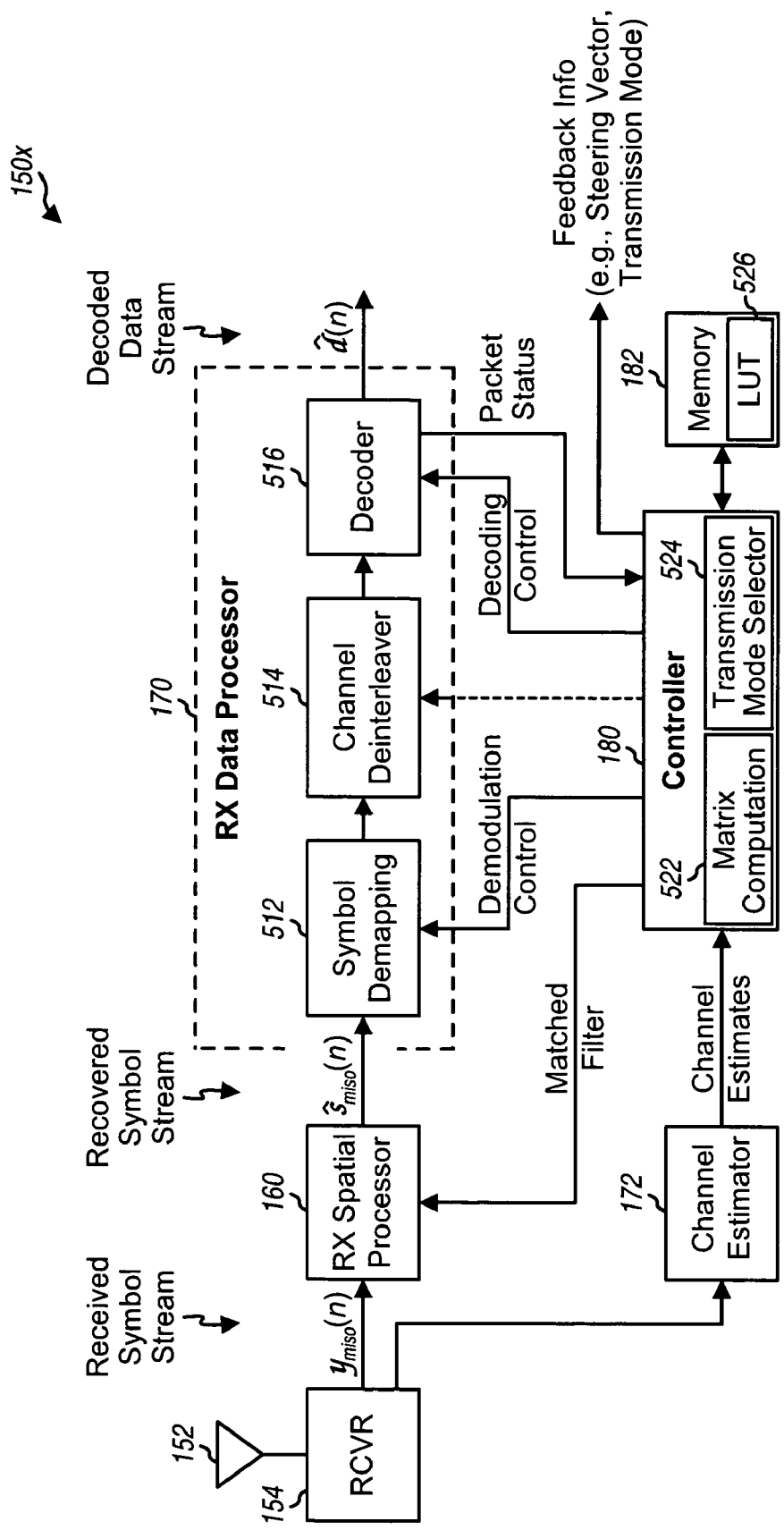
FIG. 5 shows a block diagram of the receiver in the MISO system.

FIG. 5 shows a block diagram of a receiver 150x, which is an embodiment of receiver 150 in FIG. 1. RX spatial processor 160 performs matched filtering and other pre-processing on the received symbol stream $y_{miso}(n)$ and provides the recovered symbol stream $\hat{s}_{miso}(n)$ to RX data processor 170.

Within RX data processor 170, a symbol demapping unit 512 demodulates the recovered symbols in accordance with the modulation scheme used for the data stream, as indicated by a demodulation control provided by controller 180. A channel deinterleaver 514 then deinterleaves the demodulated data in a manner complementary to the interleaving performed at transmitter 110. If the interleaving is dependent on transmission mode, then controller 180 provides a deinterleaving control to channel deinterleaver 514. A decoder 516 then decodes the deinterleaved data in a manner complementary to the encoding performed at transmitter 110, as indicated by a decoding control provided by controller 180. For example, a turbo decoder or a Viterbi decoder may be used for decoder 516 if transmitter 110 performs turbo or convolutional coding, respectively. Decoder 516 may also provide the status of each received data packet (e.g., indicating whether the packet was received correctly or in error).

Channel estimator 172 obtains received pilot symbols from receiver unit 154, estimates the MISO channel response and the noise floor at receiver 150x based on the received pilot symbols, and provides the channel impulse response estimate $\hat{\underline{h}}(n)$ and the noise floor estimate $\hat{\sigma}^2$ to controller 180. Controller 180 performs various functions related to eigensteering, matched filtering, and rate control for data transmission. For example, a matrix computation unit 522 within controller 180 performs computation to derive the frequency-independent steering vector $\underline{v}_{miso}$ for transmitter 110 and the matched filter for receiver 150. Unit 522 may also estimate the received SNR of the data stream. A transmission mode selector 524 selects a suitable transmission mode for the data stream d(n) based on the received SNR. Memory unit 182 may store a look-up table (LUT) 526 for all of the transmission modes supported by the MISO system and their required SNRs. Controller 180 provides the selected transmission mode for the data stream, the TX steering vector, acknowledgments (ACKs) and/or negative acknowledgments (NAKs), and so on as feedback information for transmitter 110.

iv) MIMO System

For a MIMO system, $N_S$ spatial channels are available for data transmission, where $N_S \leq \min \{N_T, N_R\}$. One data stream may be transmitted on each spatial channel. Each data stream may be independently processed in accordance with a transmission mode selected for that data stream.

Figure 6:
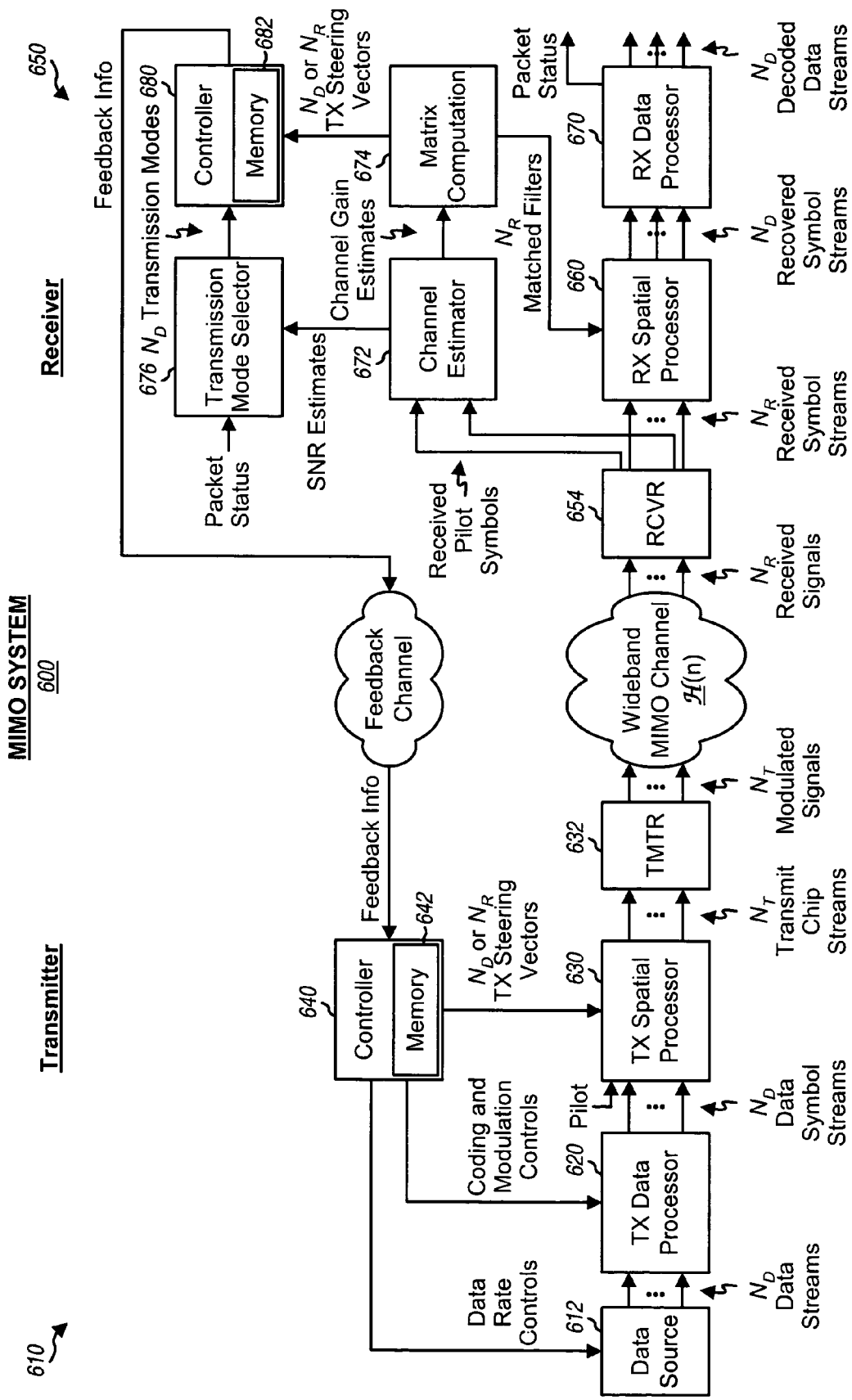
FIG. 6 shows a transmitter and a receiver in a MIMO system.

FIG. 6 shows a block diagram of a transmitter 610 and a receiver 650 in a MIMO system 600. At transmitter 610, a TX data processor 620 receives $N_D$ data streams, where $N_S \geq N_D \geq 1$. TX data processor 620 codes, interleaves, and modulates each data stream in accordance with its selected transmission mode and provides a corresponding data symbol stream. A TX spatial processor 630 receives $N_D$ data symbol streams from TX data processor 620, performs wideband processing (if any) and eigensteering based on a set of $N_D$ or $N_R$ TX steering vectors provided by controller 640, multiplexes in pilot, and provides $N_T$ transmit chip streams for the $N_T$ transmit antennas. The processing by TX data processor 620 and TX spatial processor 630 is described in further detail below. A transmitter unit 632 receives and conditions the $N_T$ transmit chip streams to obtain $N_T$ modulated signals, which are transmitted from $N_T$ transmit antennas (not shown in FIG. 6) and via the MIMO channel to receiver 650.

At receiver 650, the $N_T$ transmitted signals are received by each of $N_R$ receive antennas (not shown in FIG. 6), and the $N_R$ received signals from the $N_R$ receive antennas are provided to a receiver unit 654. Receiver unit 654 conditions, digitizes, and pre-processes each received signal to obtain a corresponding received symbol stream. Receiver unit 654 provides $N_R$ received symbol streams to an RX spatial processor 660 and received pilot symbols to a channel estimator 672. RX spatial processor 660 performs matched filtering of the $N_R$ received symbol streams with $N_R$ matched filters and provides $N_D$ recovered symbol streams, which are estimates of the $N_D$ data symbol streams sent by transmitter 610. An RX data processor 670 then processes (e.g., demodulates, deinterleaves, and decodes) each recovered symbol stream in accordance with its transmission mode to obtain a decoded data stream, which is an estimate of the data stream sent by transmitter 610. RX data processor 670 may further provide the status of each received data packet.

Channel estimator 672, matrix computation unit 674, and transmission mode selector 676 perform similar functions as channel estimator 172, matrix computation unit 174, and transmission mode selector 176, respectively, in FIG. 1 to determine the $N_D$ or $N_R$ TX steering vectors for transmitter 610, the $N_R$ matched filters for receiver 650, and the $N_D$ transmission modes for the $N_D$ data streams. A controller 680 assembles feedback information for transmitter 610, which may include the $N_D$ or $N_R$ TX steering vectors and the $N_D$ transmission modes.

Controllers 640 and 680 direct the operation at transmitter 610 and receiver 650, respectively. Memory units 642 and 682 provide storage for program codes and data used by controllers 640 and 680, respectively. Memory units 642 and 682 may be internal to controllers 640 and 680, as shown in FIG. 6, or external to these controllers.

If $N_D=1$, then the encoding, interleaving, and modulation for the single data stream may be performed as shown in FIG. 2. The eigensteering for the single data stream may be performed as shown in FIG. 3A, 3B, or 3C, depending on whether spectral spreading or OFDM modulation is performed on the data stream. However, the eigensteering is performed with the steering vector $\underline{v}_{pm}$ for the principal mode or the steering vector $\underline{v}_{mp}$ for the main path (instead of the steering vector $\underline{v}_{miso}$). The receiver matched filtering may be performed as described below. If $N_D>1$, then the data processing (e.g., encoding, interleaving, and modulation) and the eigensteering may be performed as described below.

Figure 7:
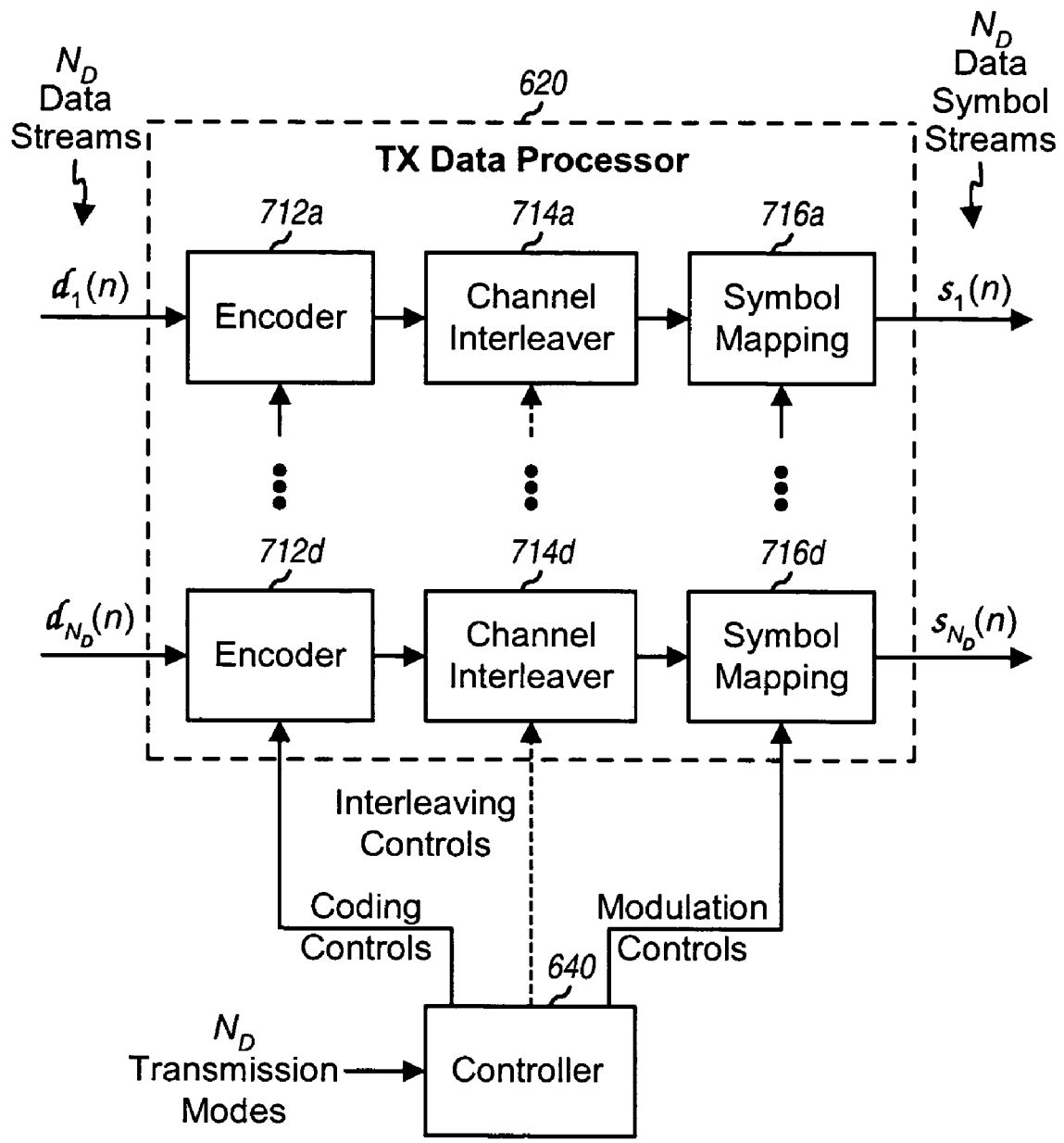
FIG. 7 shows a TX data processor in the MIMO system.

FIG. 7 shows a block diagram of an embodiment of TX data processor 620 in FIG. 6. For this embodiment, TX data processor 620 includes one set of encoder 712, channel interleaver 714, and symbol mapping unit 716 for each of the $N_D$ data streams. Each set of encoder, channel interleaver, and symbol mapping unit receives and processes a respective data stream $d_i(n)$ in similar manner as described above for TX data processor 120 in FIG. 2 to obtain a corresponding data symbol stream $s_i(n)$. The coding, interleaving, and modulation for each data stream are performed based on the coding, interleaving, and modulation controls provided by controller 640, which are generated based on the transmission mode selected for that data stream.

Figure 8A:
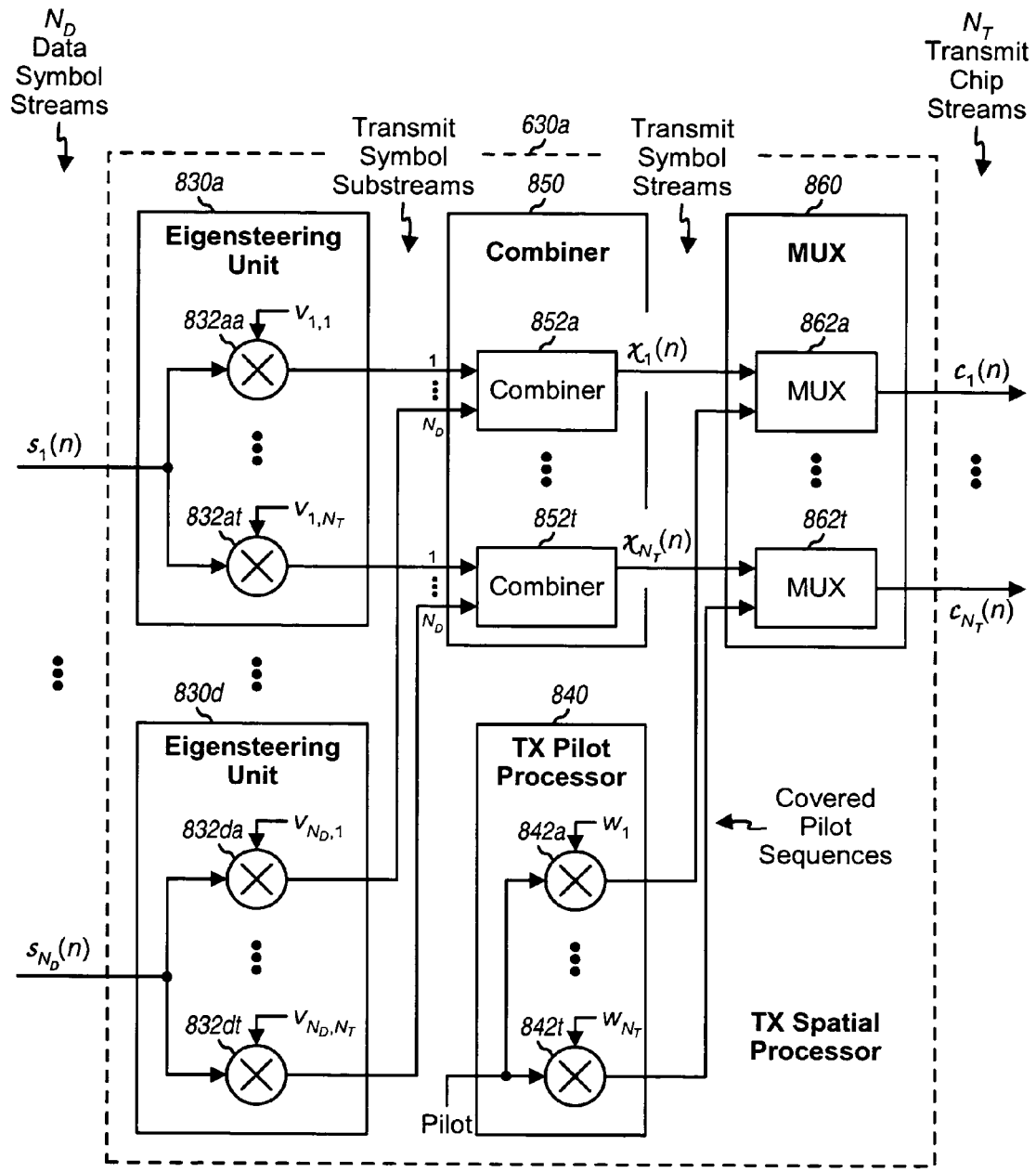
FIGS. 8A, 8B, and 8C show three embodiments of a TX spatial processor in the MIMO system.

FIG. 8A shows a block diagram of a TX spatial processor 630a, which is an embodiment of TX spatial processor 630 in FIG. 6 and may be used for multi-mode eigensteering. For this embodiment, TX spatial processor 630a includes $N_D$ eigensteering units 830a through 830d for the $N_D$ data streams, a TX pilot processor 840, a combiner 850, and a multiplexer 860.

For multi-mode eigensteering, each eigensteering unit 830 receives a respective data symbol stream $s_i(n)$ and a respective frequency-independent steering vector $\underline{v}_i$ in the matrix $\underline{V}_{mm}$. Each eigensteering unit 830 performs eigensteering on its data symbol stream with its steering vector, as described above for FIG. 3A, and provides a respective set of $N_T$ transmit symbol substreams $\chi_i(n)$ for the $N_T$ transmit antennas. Eigensteering units 830a through 830d provide $N_D$ sets of transmit symbol substreams for the $N_D$ data streams. Combiner 850 includes $N_T$ combiners 852a through 852t, one combiner 852 for each of the $N_T$ transmit antennas. Each combiner 852 receives and combines a respective set of $N_D$ transmit symbol substreams from eigensteering units 830a through 830d for its transmit antenna and provides a transmit symbol stream. Combiners 852a through 852t provide $N_T$ transmit symbol streams $\chi_{mm}(n)$ for the $N_T$ transmit antennas. Eigensteering units 830a through 830d and combiner 850 collectively perform the eigensteering shown in equation (28).

For receiver eigensteering, TX spatial processor 630a would include $N_R$ eigensteering units 830, one for each of the $N_R$ receive antennas. Each eigensteering unit 830 would receive a respective frequency-independent steering vector $\underline{v}_{rx,i}$ in the matrix $\underline{V}_{rx}$. If $N_D=1$, then the same data symbol stream $s(n)$ is provided to all $N_R$ eigensteering units and steered with the $N_R$ steering vectors to obtain $N_R$ sets of $N_T$ transmit symbol substreams. Each combiner 852 would then receive and combine a respective set of $N_R$ transmit symbol substreams from the $N_R$ eigensteering units for its transmit antenna and provides a transmit symbol stream. If $N_D>1$, then each data symbol stream may be provided to one or more of the $N_R$ eigensteering units for the one or more receive antennas to which the data symbol stream is steered. The eigensteering is then performed in similar manner to obtain the $N_T$ transmit symbol streams $\chi_{rx}(n)$ for the $N_T$ transmit antennas.

TX pilot processor 840 receives and covers the pilot symbol with $N_T$ orthogonal sequences, as described above for FIG. 3A, and provides $N_T$ sequences of covered pilot symbols for the $N_T$ transmit antennas. Multiplexer 860 includes $N_T$ multiplexers 862a through 862t, one multiplexer 862 for each of the $N_T$ transmit antennas. Each multiplexer 862 receives and multiplexes the transmit symbols from an associated combiner 852 with the covered pilot symbols from an associated multiplier 842 and provides a respective stream of transmit chips. Multiplexers 862a through 862t provide $N_T$ transmit chip streams $\underline{c}_{mimo}(n)=[c_1(n)\ c_2(n)\ \ldots\ c_{N_T}(n)]^T$ for the $N_T$ transmit antennas.

Figure 8B:
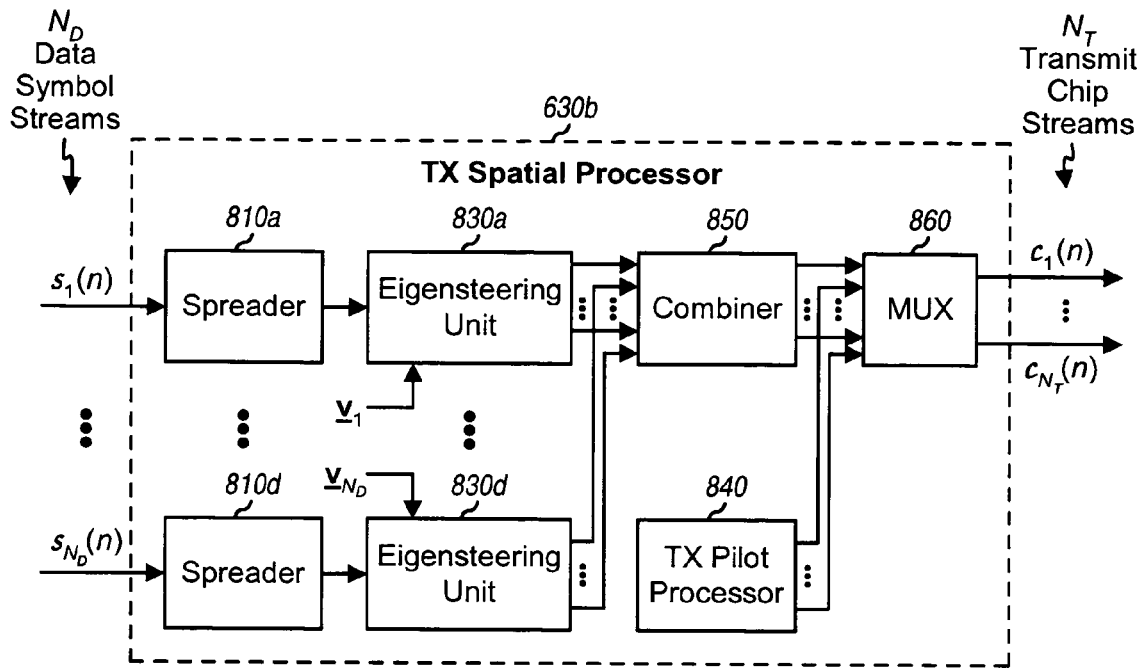

FIG. 8B shows a block diagram of a TX spatial processor 630b, which is another embodiment of TX spatial processor 630 in FIG. 6. TX spatial processor 630b performs spectral spreading in the time domain and includes $N_D$ spreaders 810a through 810d for $N_D$ data streams, $N_D$ eigensteering units 830a through 830d, TX pilot processor 840, combiner 850, and multiplexer 860. Each spreader 810 receives and spectrally spreads a respective data symbol stream $s_i(n)$ with a PN spreading sequence and provides a corresponding stream of spread data symbols. The same or different PN sequences may be used for the $N_D$ data symbol streams. Spreaders 810a through 810d provide $N_D$ spread data symbol streams for the $N_D$ data symbol streams. Eigensteering is then performed on each of the $N_D$ spread data symbol streams (instead of the data symbol streams), in similar manner as described above for FIGS. 3A and 8A, to obtain $N_T$ transmit chip streams for the $N_T$ transmit antennas.

Figure 8C:
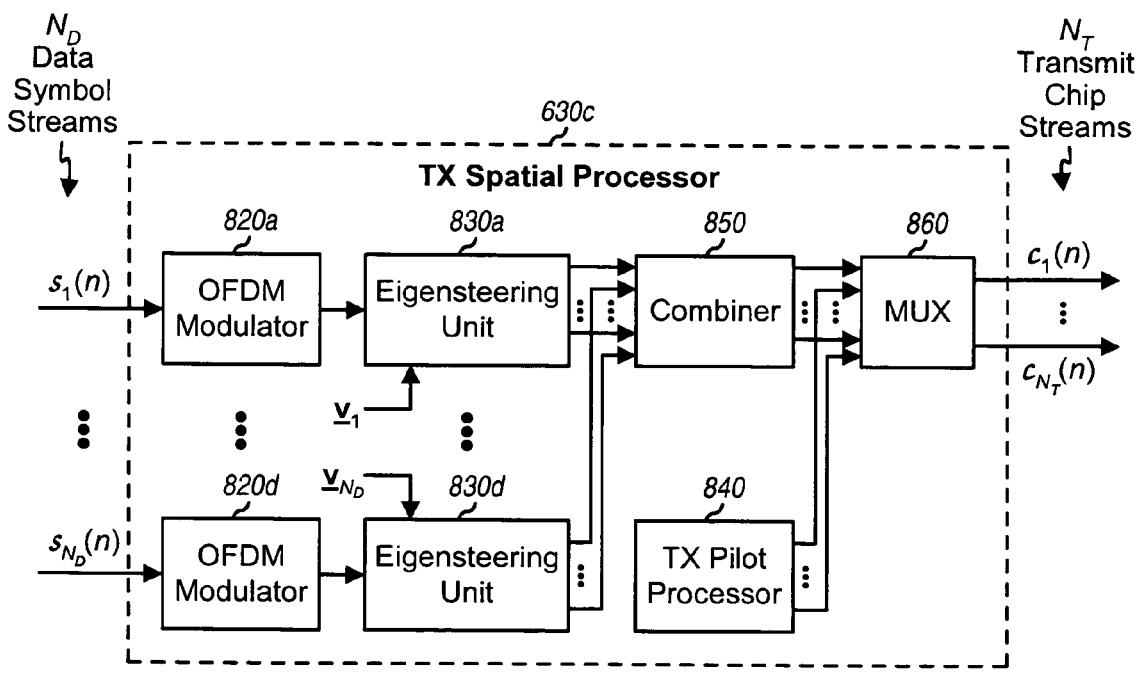

FIG. 8C shows a block diagram of a TX spatial processor 630c, which is yet another embodiment of TX spatial processor 630 in FIG. 6. TX spatial processor 630c performs OFDM modulation and includes $N_D$ OFDM modulators 820a through 820d for $N_D$ data streams, $N_D$ eigensteering units 830a through 830d, TX pilot processor 840, combiner 850, and multiplexer 860.

Each OFDM modulator 820 performs OFDM modulation on a respective data symbol stream $s_i(n)$, in similar manner as described above for FIG. 3C, and provides a stream of data chips. OFDM modulators 820a through 820d provide $N_D$ data chip streams for the $N_D$ data streams. Eigensteering is then performed on each of the $N_D$ data chip streams (instead of the data symbol stream), as described above for FIGS. 3A and 8A, to obtain $N_T$ transmit chip streams for the $N_T$ transmit antennas. Alternatively, the eigensteering may be performed in the frequency domain on the data symbol substream for each subband. In this case, each eigensteering unit uses the same steering vector $\underline{v}_i$ for all subbands.

Figure 9A:
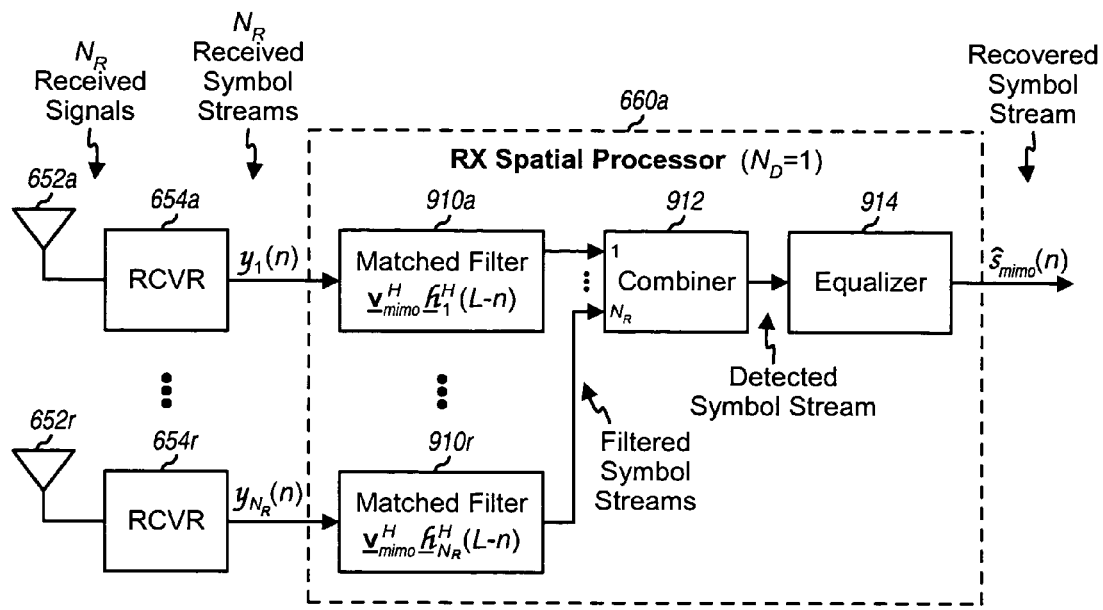
FIGS. 9A through 9F show six embodiments of an RX spatial processor in the MIMO system.

FIG. 9A shows a block diagram of an RX spatial processor 660a, which may be used for the case in which a single data stream is transmitted (i.e., $N_D=1$). Each of $N_R$ receive antennas 652a through 652r receives the $N_T$ transmitted signals from transmitter 610 and provides a received signal to an associated receiver unit 654. Each receiver unit 654 conditions, digitizes, and pre-processes its received signal and provides a received symbol stream $y_i(n)$.

1. RX spatial processor 660a includes $N_R$ matched filters 910a through 910r for the $N_R$ receive antennas, a combiner 912, and an equalizer 914. Each matched filter 910 performs matched filtering of its received symbol stream $y_i(n)$ with a matched filter $m_i(n) = \underline{v}_{mimo}^H \underline{h}_i^H(L-n)$ and provides a filtered symbol stream. The vector $\underline{v}_{mimo}$ is equal to the steering vector $\underline{v}_{pm}$ for principal mode eigensteering, the steering vector $\underline{v}_{mp}$ for main path eigensteering, or the steering vector $\underline{v}_{rx,i}$ for receiver eigensteering. For receiver eigensteering, each matched filter 910 is associated with a different steering vector $\underline{v}_{rx,i}$ for its receive antenna, which is not shown in FIG. 9A. The vector $\underline{h}_i(n)$ is the channel impulse response between the $N_T$ transmit antennas and receive antenna i. Combiner 912 receives and combines the $N_R$ filtered symbol streams from matched filters 910a through 910r and provides a detected symbol stream $\tilde{s}_{mimo}(n)$. Equalizer 914 performs equalization on the detected symbol stream and provides the recovered symbol stream $\hat{s}_{mimo}(n)$. Equalizer 914 may implement an MMSE equalizer, a decision feedback equalizer, a maximum likelihood sequence estimator, or some other type of equalizer.

Figure 9B:
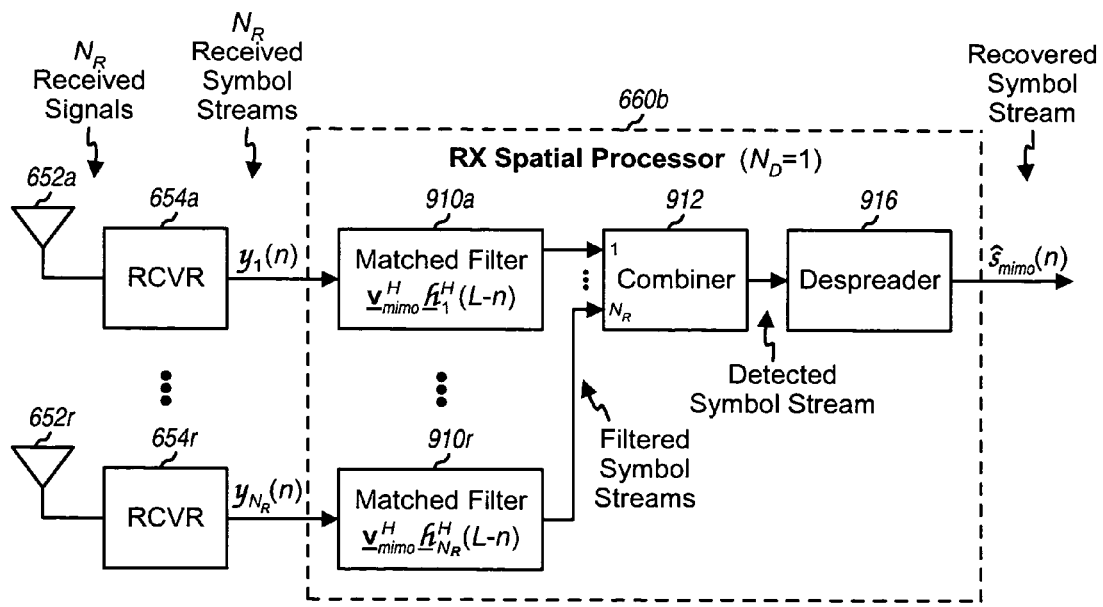

FIG. 9B shows a block diagram of an RX spatial processor 660b, which may also be used for the case in which a single data stream is transmitted (i.e., $N_D=1$). RX spatial processor 660b performs spectral despreading in the time domain and may be used in conjunction with TX spatial processor 630b in FIG. 8B.

RX spatial processor 660b includes $N_R$ matched filters 910a through 910r for the $N_R$ receive antennas, combiner 912, and a despreader 916. Each matched filter 910 performs matched filtering of a respective received symbol stream $y_i(n)$ with its matched filter $m_i(n) = \underline{v}_{mimo}^H \underline{h}_i^H(L-n)$ and provides a filtered symbol stream. Combiner 912 receives and combines the $N_R$ filtered symbol streams and provides the detected symbol stream $\tilde{s}_{mimo}(n)$. Despreader 916 then despreads the detected symbol stream with the PN sequence used by transmitter 610 and provides the recovered symbol stream $\hat{s}_{mimo}(n)$.

Figure 9C:
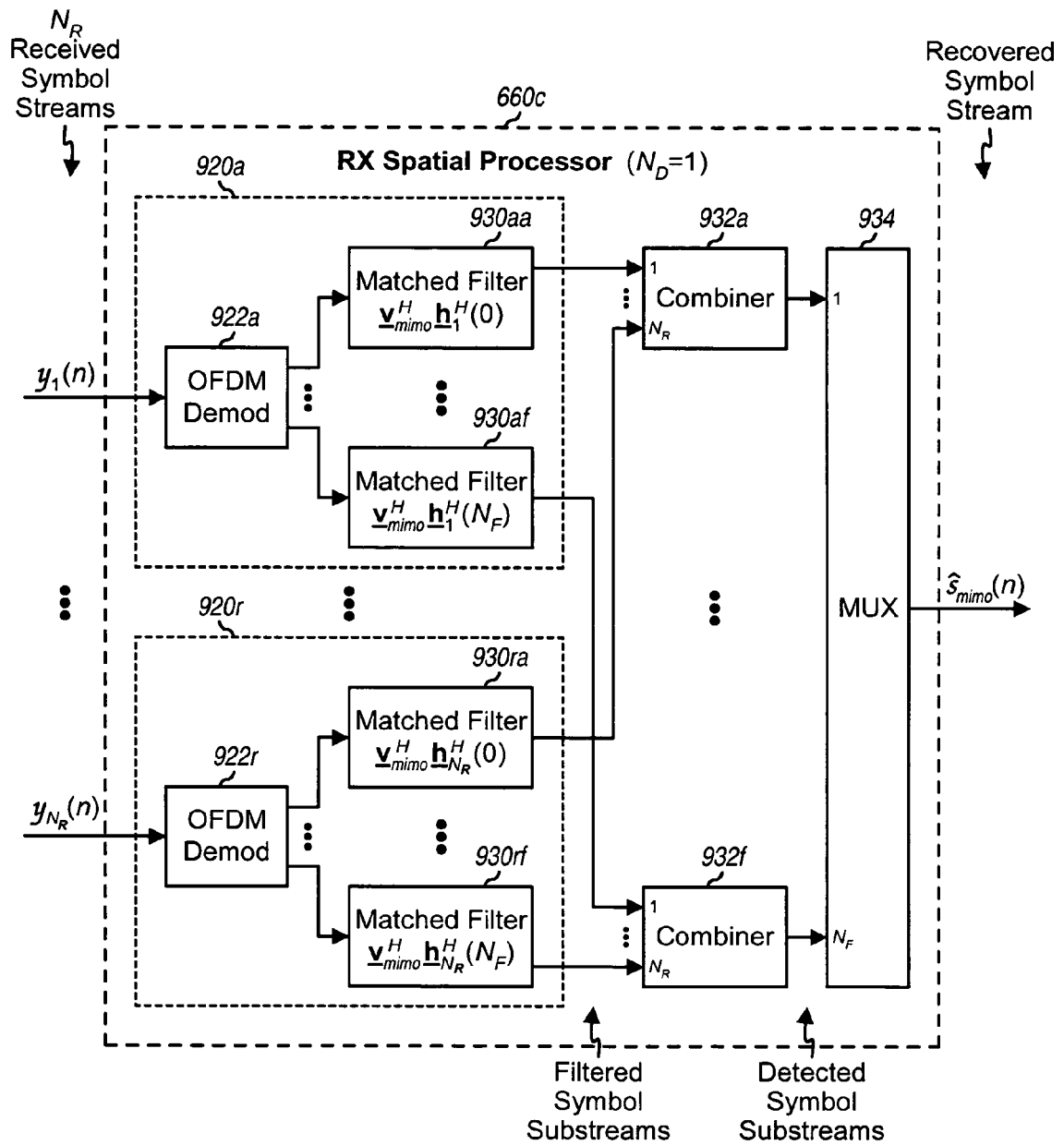

FIG. 9C shows a block diagram of an RX spatial processor 660c, which may also be used for the case in which a single data stream is transmitted (i.e., $N_D=1$). RX spatial processor 660c performs OFDM demodulation and may be used in conjunction with TX spatial processor 630c in FIG. 8C.

RX spatial processor 660c includes $N_R$ antenna matched filters 920a through 920r for the $N_R$ receive antennas, $N_F$ combiners 932a through 932f for the $N_F$ subbands, and a multiplexer 934. Each antenna matched filter 920 performs matched filtering for one receive antenna and includes an OFDM demodulator 922 and $N_F$ matched filters 930a through 930f for the $N_F$ subbands.

Within each antenna matched filter 920, OFDM demodulator 922 performs OFDM demodulation on the received symbol stream $y_i(n)$ for the associated receive antenna and provides $N_F$ received symbol substreams $y_i(k)$, for $k=1, 2, \ldots N_F$, for the $N_F$ subbands to $N_F$ matched filters 930a through 930f. Each matched filter 930 performs matched filtering of its received symbol substream $y_i(k)$ with its matched filter $m_i(k) = \underline{v}_{mimo}^H \underline{h}_i^H(k)$ and provides a filtered symbol substream. The vector $\underline{h}_i(k)$ is the channel frequency response for receive antenna i for subband k. Matched filters 930a through 930f for each antenna matched filter 920 provide $N_F$ filtered symbol substreams for the $N_F$ subbands to $N_F$ combiners 932a through 932f.

Each combiner 932 receives and combines the $N_R$ filtered symbol substreams from $N_R$ antenna matched filters 920a through 920r for its subband and provides a detected symbol substream for the subband. Multiplexer 934 receives and multiplexes the $N_F$ detected symbol substreams from combiners 932a through 932f for the $N_F$ subbands and provides the recovered symbol stream $\hat{s}_{mimo}(n)$.

Figure 9D:
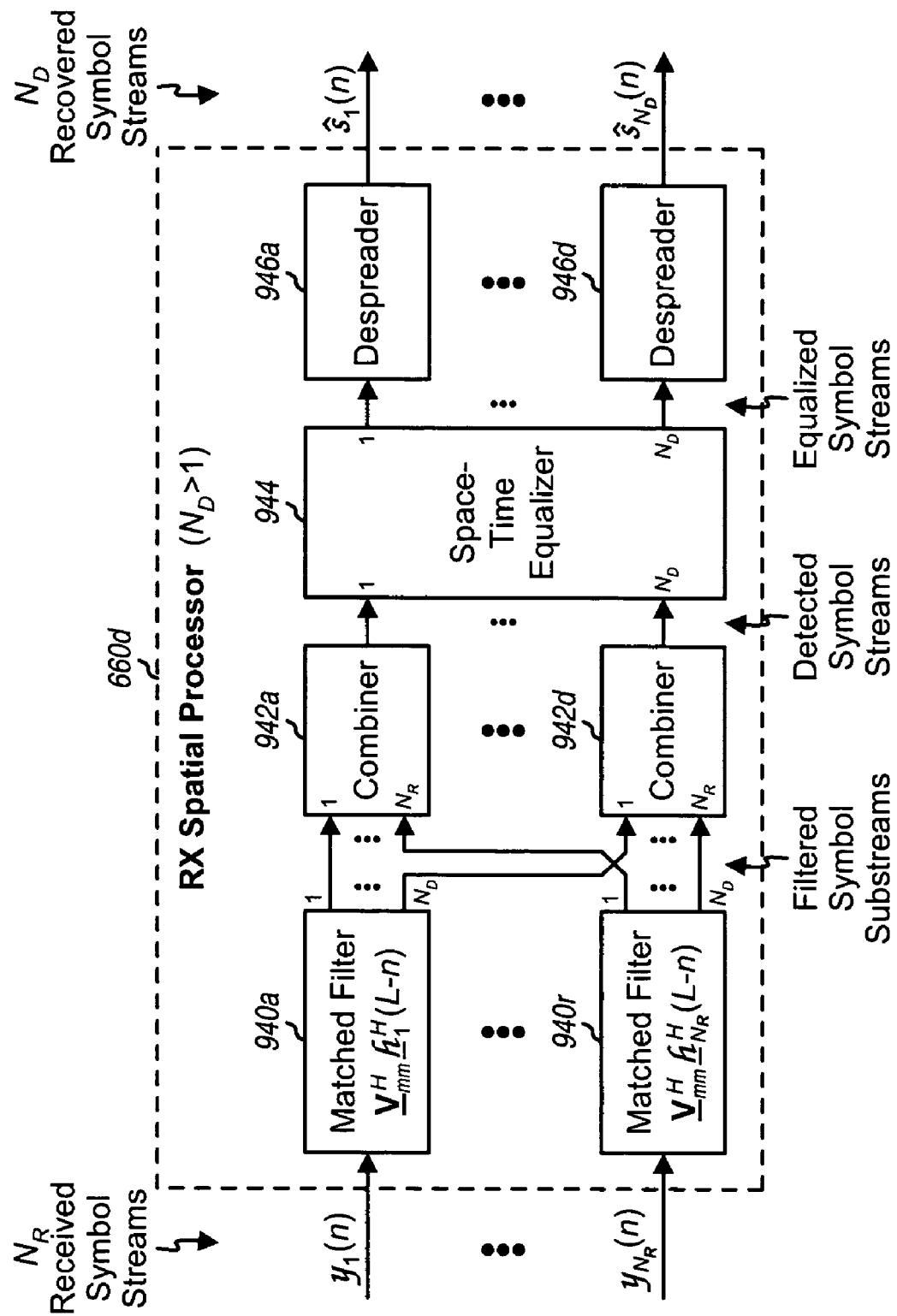

FIG. 9D shows a block diagram of an RX spatial processor 660d, which may be used for multi-mode eigensteering with $N_D > 1$. RX spatial processor 660d may be used in conjunction with TX spatial processor 630a in FIG. 8A or TX spatial processor 630b in FIG. 8B.

RX spatial processor 660d includes $N_R$ matched filters 940a through 940r for the $N_R$ receive antennas, $N_D$ combiners 942a through 942d for the $N_D$ data streams, a space-time equalizer 944, and $N_D$ despreaders 946a through 946d for the $N_D$ data streams. Each matched filter 940 performs matched filtering of a respective received symbol stream $y_i(n)$ with a matched filter $\underline{m}_i(k) = \underline{V}_{mm}^H \underline{h}_i^H(L-n)$ for an associated receive antenna and provides $N_D$ filtered symbol substreams for the $N_D$ data symbol streams. The matrix $\underline{V}_{mm}$ includes $N_D$ steering vectors $\underline{v}_l$, for $l=1, 2, \ldots N_D$, for the $N_D$ data symbol streams. Each matched filter 940 thus performs matched filtering of the received symbol stream $y_i(n)$ with $N_D$ matched filters $m_{l,i}(n) = \underline{v}_l^H \underline{h}_i^H(L-n)$, for $l=1, 2, \ldots N_D$, where $\underline{v}_l$ is the l-th column of $\underline{V}_{mm}$, to obtain the $N_D$ filtered symbol substreams for the associated receive antenna.

Each combiner 942 receives and combines the $N_R$ filtered symbol substreams from matched filters 940a through 940r for one data symbol stream and provides the detected symbol stream $\tilde{s}_l(n)$ for the data stream. Matched filters 940a through 940r and combiners 942a through 942d collectively perform the matched filtering shown in equation (29) and provides $N_D$ detected symbol streams $\underline{\tilde{s}}(n)$ for the $N_D$ data symbol streams.

If multiple data symbol streams are transmitted, then there is likely to be cross-talk between these data symbol streams at receiver 650. Space-time equalizer 944 performs equalization on the $N_D$ detected symbol streams from combiners 942a through 942d and provides $N_D$ equalized symbol streams. Space-time equalizer 944 may implement an MMSE linear equalizer, a decision feedback equalizer, a maximum likelihood sequence estimator, or some other type of equalizer that can jointly operate on multiple streams to mitigate cross-talk and/or maximize the received SNR in the presence of cross-talk, intersymbol interference, and noise. Space-time equalizer 944 may also implement the successive equalization and interference cancellation processing technique. Space-time equalizer 944 may also be omitted.

If spreading is not performed at transmitter 610, as shown in FIG. 8A, then the $N_D$ equalized symbol streams from space-time equalizer 944 are provided as the $N_D$ recovered symbol streams $\underline{\hat{s}}(n)$. If spreading is performed at transmitter 610 for each data symbol stream, as shown in FIG. 8B, then each despreader 946 receives and despreads a respective equalized symbol stream with the PN sequence and provides a corresponding recovered symbol stream. Despreaders 946a through 946d would then provide the $N_D$ recovered symbol streams $\underline{\hat{s}}(n)$.

Figure 9E:
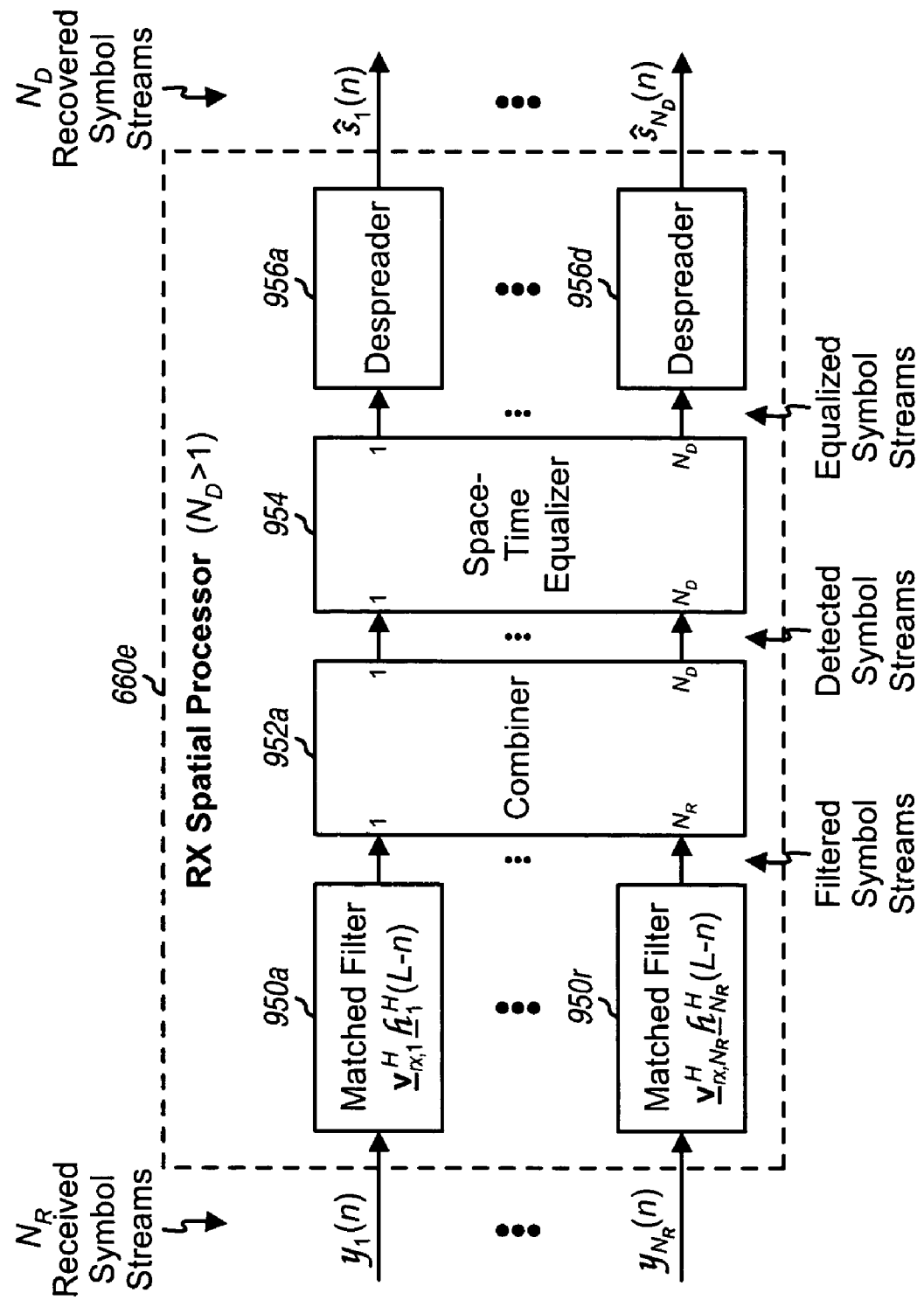

FIG. 9E shows a block diagram of an RX spatial processor 660e, which may be used for receiver eigensteering with $N_D > 1$. RX spatial processor 660e includes $N_R$ matched filters 950a through 950r for the $N_R$ receive antennas, a combiner 952, a space-time equalizer 954, and $N_D$ despreaders 956a through 956d for the $N_D$ data symbol streams. Each matched filter 950 performs matched filtering of a respective received symbol stream $y_i(n)$ with a matched filter $\underline{m}_{rx,i}(k) = \underline{v}_{rx,i}^H \underline{h}_i^H(L-n)$ for an associated receive antenna and provides a filtered symbol stream. Combiner 952 receives the $N_R$ filtered symbol streams from matched filters 950a through 950r, combines the filtered symbol streams for all receive antennas used for each data symbol stream, and provides the detected symbol stream $\hat{s}_l(n)$ for that data symbol stream. The combining is dependent on the eigensteering performed at the transmitter (i.e., the specific receive antennas to which each data symbol stream is steered). Combiner 952 provides $N_D$ detected symbol streams $\underline{\tilde{s}}(n)$ for the $N_D$ data symbol streams. Space-time equalizer 954 and despreaders 956a through 956d operate on the $N_D$ detected symbol streams as described above for FIG. 9D and provide the $N_D$ recovered symbol streams $\underline{\hat{s}}(n)$.

Figure 9F:
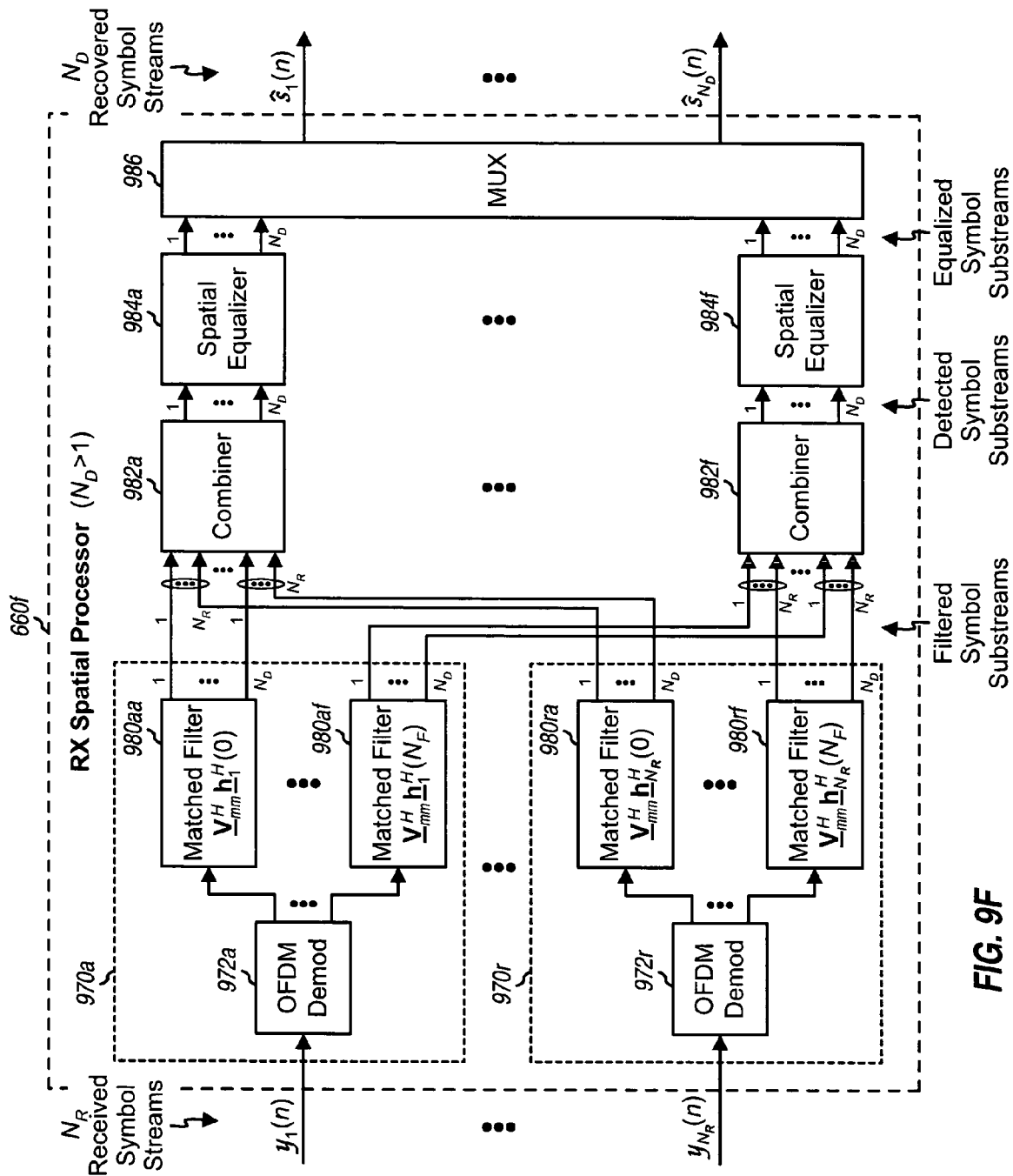

FIG. 9F shows a block diagram of an RX spatial processor 660f, which may also be used for multi-mode eigensteering with $N_D>1$. RX spatial processor 660f performs OFDM demodulation and may be used in conjunction with TX spatial processor 630c in FIG. 8C.

RX spatial processor 660f includes $N_R$ antenna matched filters 970a through 970r for the $N_R$ receive antennas, $N_F$ combiners 982a through 982f for the $N_F$ subbands, $N_F$ space-time equalizers 984a through 984f for the $N_F$ subbands, and a multiplexer 986. Each antenna matched filter 970 performs matched filtering for one receive antenna and includes an OFDM demodulator 972 and $N_F$ matched filters 980a through 980f for the $N_F$ subbands.

Within each antenna matched filter 970, OFDM demodulator 972 performs OFDM demodulation on the received symbol stream $y_i(n)$ for the associated antenna and provides $N_F$ received symbol substreams $y_i(k)$, for k=1, 2, ... $N_F$, for the $N_F$ subbands to $N_F$ matched filters 980a through 980f. Each matched filter 980 performs matched filtering of its received symbol substream $y_i(k)$ with its matched filter $\underline{m}_i(k) = \underline{V}_{mm}^H \underline{h}_i^H(k)$ and provides $N_D$ filtered symbol substreams for the $N_D$ data symbol streams for its subband. Matched filters 980a through 980f for each antenna matched filter 970 provide $N_F$ sets of $N_D$ filtered symbol substreams for the $N_F$ subbands to $N_F$ combiners 982a through 982f.

Each combiner 982 receives and combines the $N_R$ sets of $N_D$ filtered symbol substreams from $N_R$ antenna matched filters 970a through 970r for its subband and provides $N_D$ detected symbol substreams for its subband. Although not shown in FIG. 9F, each combiner 982 includes $N_D$ summers, one summer for each data symbol stream. Each summer receives and sums the $N_R$ filtered symbol substreams from antenna matched filters 970a through 970r for its subband and its data symbol stream to obtain the detected symbol substream for its subband.

Each spatial equalizer 984 performs equalization on the $N_D$ detected symbol substreams from an associated combiner 982 for its subband and provides $N_D$ equalized symbol streams for the subband. Spatial equalizer 984 may implement an MMSE linear equalizer or some other equalizer that jointly operates on multiple symbol streams to mitigate crosstalk and/or maximize the received SNR. Spatial equalizer 984 may also implement the successive equalization and interference cancellation processing technique.

Multiplexer 986 receives $N_F$ sets of $N_D$ equalized symbol substreams from combiners 984a through 984f for the $N_F$ subbands. Multiplexer 986 then multiplexes the $N_F$ equalized symbol substreams from combiners 984a through 984f for each data symbol stream and provides the recovered symbol stream $\hat{s}_l(n)$ for that data symbol stream.

Figure 10:
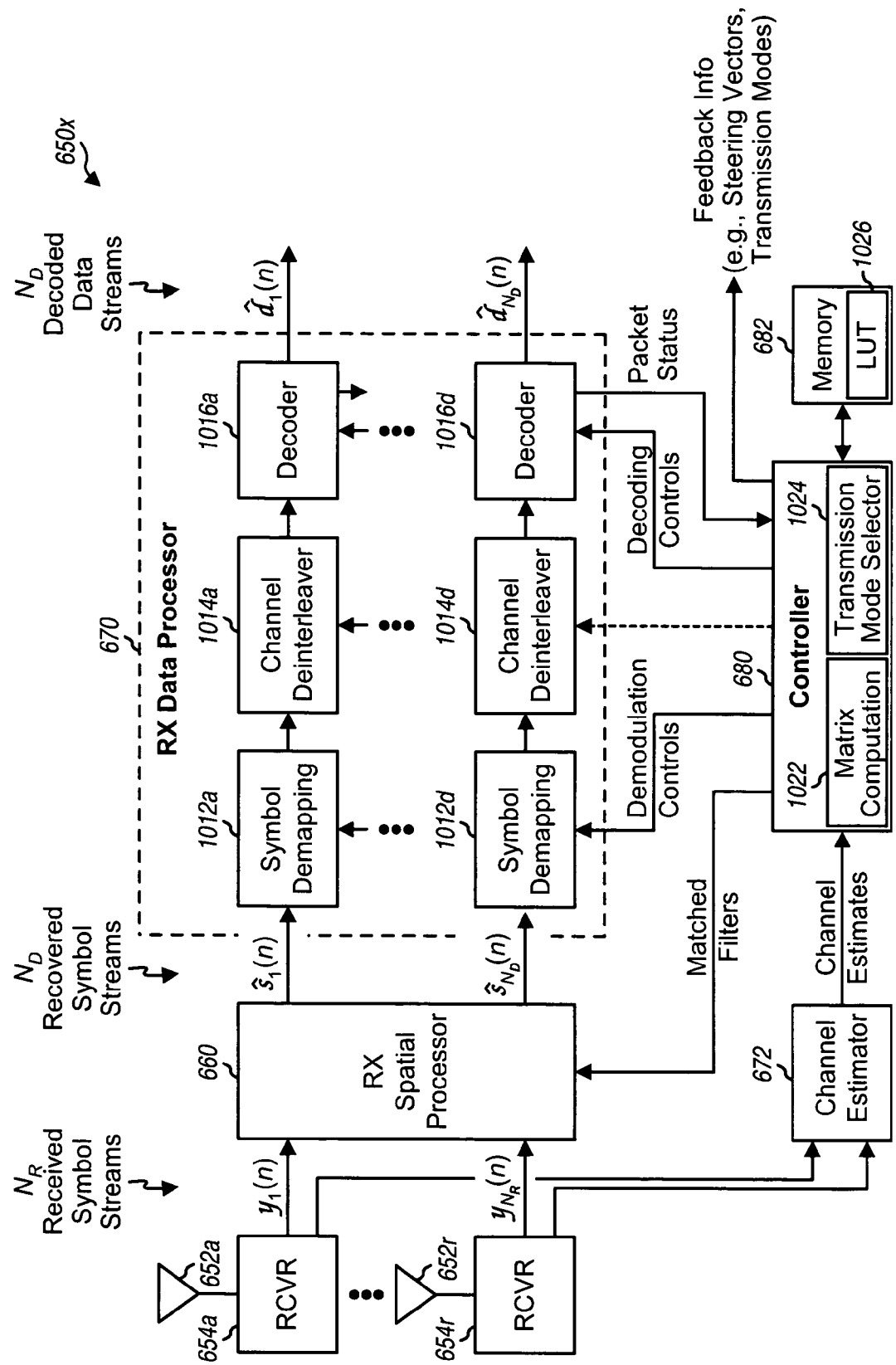
FIG. 10 shows a block diagram of the receiver in the MIMO system.

FIG. 10 shows a block diagram of a receiver 650x, which is an embodiment of receiver 650 in FIG. 6. RX spatial processor 660 performs matched filtering and post-processing on the $N_R$ received symbol streams $y_i(n)$, for i=1, 2, ... $N_R$, and provides $N_D$ recovered symbol streams $\hat{s}_l(n)$, for l=1, 2, ... $N_D$, to RX data processor 670. RX data processor 670 includes one set of symbol demapping unit 1012, deinterleaver 1014, and decoder 1016 for each of the $N_D$ recovered symbol streams. Each set of symbol demapping unit, deinterleaver, and decoder processes a respective recovered symbol stream as described above for FIG. 5. RX data processor 670 provides $N_D$ decoded data streams $\hat{d}_l(n)$, for l=1, 2, ... $N_D$.

Channel estimator 672 estimates the channel response and the receiver noise floor based on the received pilot symbols from receiver units 654a through 654r and provides the channel impulse response estimate $\underline{\hat{H}}(n)$ and the noise floor estimate $\hat{\sigma}^2$ to controller 680. Controller 680 performs various functions related to eigensteering, matched filtering, and rate control for the data transmission. For example, a matrix computation unit 1022 may perform computation to derive (1) the steering vector $\underline{v}_{pm}$ for principal mode eigensteering, (2) the steering vector $\underline{v}_{mp}$ for main path eigensteering, (3) $N_D$ steering vectors $\underline{v}_l$, for l=1, 2, ... $N_D$, for multi-mode eigensteering, or (4) $N_R$ steering vectors $\underline{v}_{rx,i}$, for i=1, 2, ... $N_R$, for receiver eigensteering. Computation unit 1022 also derives $N_R$ matched filters for receiver 650 and may further estimate the received SNR of the $N_D$ data streams. A transmission mode selector 1024 selects a suitable transmission mode for each data stream based on its received SNR. Memory unit 682 may store a look-up table 1026 for all of the supported transmission modes and their required SNRs. Controller 680 provides the $N_D$ TX steering vectors, the $N_D$ selected transmission modes for the $N_D$ data streams, ACKs and/or NAKs, and so on as feedback information for transmitter 610.

For embodiments described above, the receiver estimates the channel response of the MISO or MIMO channel, derives the steering vector(s) for the transmitter and the matched filter(s) for the receiver, and sends back the steering vector(s) as feedback information. For other embodiments, it may be possible for the transmitter to estimate the channel response and derive the steering vector(s). For example, in a time division duplexed (TDD) system with a shared frequency band, the downlink and uplink channel responses may be assumed to be reciprocal of one another. That is, if $\underline{H}(k)$ represents a channel frequency response matrix from antenna array A to antenna array B for subband k, then a reciprocal channel implies that the coupling from array B to array A is given by $\underline{H}^T(k)$. For the TDD system, the reciprocal channel characteristics can be exploited to allow the transmitter to estimate the link observed by the receiver based on pilot sent by the receiver on the other link. In general, the channel estimation and the computation of the steering vectors may be performed by the receiver or the transmitter, depending on the system design.

Figure 11:
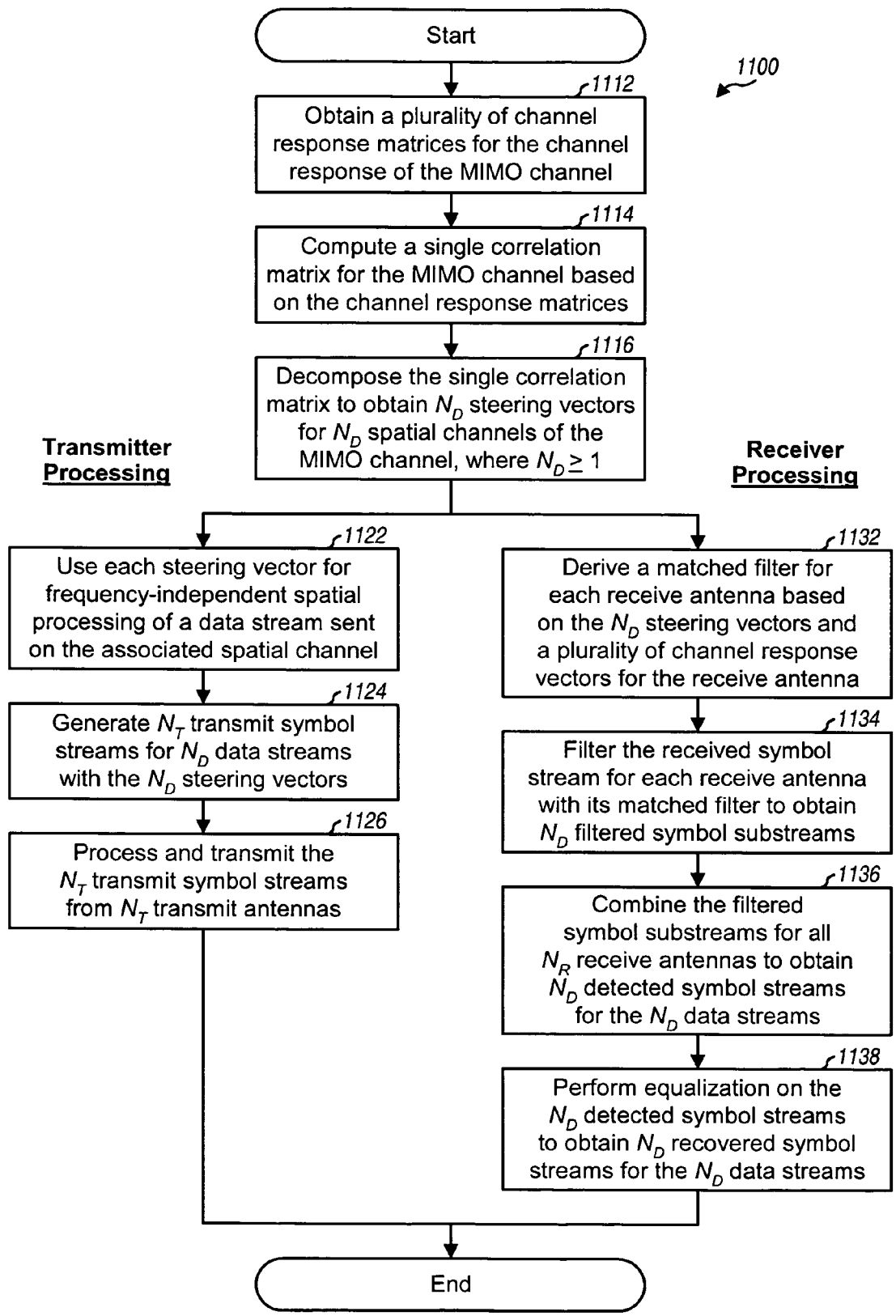
FIG. 11 shows a process for performing principal mode eigensteering, multi-mode eigensteering, and main path eigensteering in the MIMO system.

FIG. 11 shows a flow diagram of an embodiment of a process 1100 for performing principal mode eigensteering, multi-mode eigensteering, and main path eigensteering in a MIMO system. Initially, a plurality of channel response matrices are obtained for the channel response of the MIMO channel in the MIMO system (at block 1112). These channel response matrices may be (1) L+1 channel impulse response matrices for L+1 time delays (i.e., $\underline{H}(n)$ for n=0, 1, ... L) or (2) $N_F$ channel frequency response matrices for $N_F$ subbands (i.e., $\underline{H}(k)$ for k=1, 2, ... $N_F$)

A single correlation matrix is computed for the MIMO channel based on the channel response matrices (at block 1114). For principal mode eigensteering and multi-mode eigensteering, the single correlation matrix may be obtained by (1) computing a correlation matrix of each of the plurality of channel response matrices and (2) summing the correlation matrices for the channel response matrices to obtain the single correlation matrix, as shown in equation (18). For main path eigensteering, the single correlation matrix may be obtained by (1) determining the energy of each of the channel impulse response matrices, (2) identifying the channel impulse response matrix with the highest energy, (3) computing a correlation matrix of the channel impulse response matrix with the highest energy, and (4) defining the single correlation matrix for the MIMO channel as the correlation matrix of the channel impulse response matrix with the highest energy, as shown in equations (33) and (34) and the related description.

The single correlation matrix is then decomposed (e.g., using eigenvalue decomposition) to obtain $N_D$ steering vectors for $N_D$ spatial channels of the MIMO channel, where $N_S \geq N_D \geq 1$ and $N_S$ is the number of eigenmodes of the single correlation matrix (at block 1116). For principal mode eigensteering and main path eigensteering, $N_D=1$ and only one steering vector is obtained. For multi-mode eigensteering, $N_D>1$ and multiple steering vectors are obtained.

The operations shown at blocks 1112, 1114, and 1116 may be performed by receiver 650 in FIG. 6. The operations shown at blocks 1112, 1114, and 1116 may also be performed by transmitter 610 for a time-division duplexed (TDD) system in which the downlink and uplink share the same frequency band. In any case, the $N_D$ steering vectors may be used for eigensteering by the transmitter and matched filtering by the receiver.

At the transmitter, each steering vector may be used for frequency-independent eigensteering or spatial processing of a data stream sent on the spatial channel associated with the steering vector (at block 1122). The transmitter performs eigensteering on $N_D$ data symbol streams with the $N_D$ steering vectors to generate $N_T$ transmit symbol streams (at block 1124), which are further processed and transmitted from the $N_T$ transmit antennas (at block 1126).

At the receiver, matched filtering of $N_R$ received symbol streams for $N_R$ receive antennas, where $N_R \geq N_D$, may be performed in either the time domain or frequency domain. A matched filter may be derived for each receive antenna based on the $N_D$ steering vectors and a plurality of channel response vectors for that receive antenna (at block 1132). The channel response vectors for each receive antenna may be obtained from the channel response matrices. The received symbol stream for each receive antenna is filtered with the matched filter for that receive antenna to obtain $N_D$ filtered symbol substreams, one substream for each steering vector used by the transmitter (at block 1134). The filtered symbol substreams from all $N_R$ matched filters for the $N_R$ receive antennas are then combined to obtain $N_D$ detected symbol streams for the $N_D$ data streams sent by the transmitter (at block 1136). Equalization may be performed on the $N_D$ detected symbol streams to obtain $N_D$ recovered symbol streams (at block 1138). If $N_D>1$, then space-time equalization (e.g., with an MMSE-LE, a DFE, or an MLSE) may be performed on the multiple detected symbol streams to obtain multiple recovered symbol streams.

Figure 12:
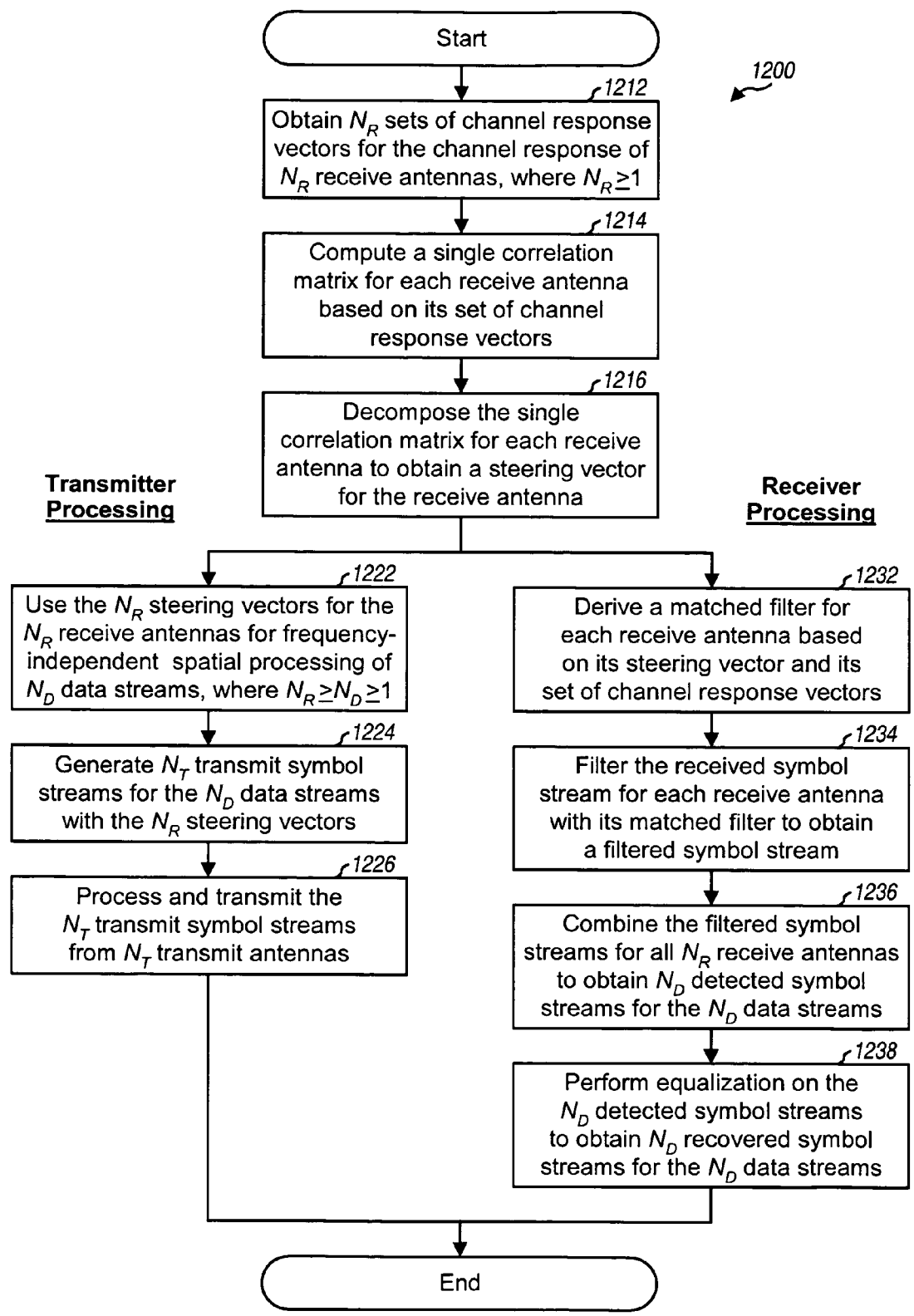
FIG. 12 shows a process for performing receiver eigensteering in the MISO or MIMO system.

FIG. 12 shows a flow diagram of an embodiment of a process 1200 for performing receiver eigensteering in a MISO or MIMO system with $N_T$ transmit antennas and $N_R$ receive antennas, where $N_T>1$ and $N_R \geq 1$ in this case. Initially, $N_R$ sets of channel response vectors are obtained for the $N_R$ receive antennas, one set for each receive antenna (at block 1212). Each set of channel response vectors is indicative of the channel frequency response or the channel impulse response between the $N_T$ transmit antennas and one receive antenna.

A single correlation matrix is computed for each receive antenna based on the set of channel response vectors for that receive antenna (at block 1214). This may be achieved by (1) computing a correlation matrix of each of the channel response vectors for the receive antenna and (2) summing correlation matrices for the channel response vectors for the receive antenna to obtain the single correlation matrix for the receive antenna. The single correlation matrix for each receive antenna is then decomposed (e.g., using eigenvalue decomposition) to obtain a steering vector for the receive antenna (at block 1216). The operations shown at blocks 1212, 1214, and 1216 may be performed by receiver 150 in FIG. 1 or receiver 650 in FIG. 6. The operations shown at blocks 1212, 1214, and 1216 may also be performed by transmitter 110 in FIG. 1 or transmitter 610 in FIG. 6 for a TDD system. In any case, $N_R$ steering vectors are obtained for the $N_R$ receive antennas and may be used for spatial processing by the transmitter and matched filtering by the receiver.

At the transmitter, the $N_R$ steering vectors may be used for frequency-independent eigensteering or spatial processing of $N_D$ data streams, where $N_R \geq N_D>1$ and $N_T \geq N_D$ (at block 1222). For a MISO system with only one receive antenna ($N_R=1$), one data stream is sent using one steering vector obtained for the one receive antenna (at blocks 1224 and 1226). For a MIMO system with a plurality of receive antennas ($N_R>1$), one or multiple data streams may be sent using the $N_R$ steering vectors obtained for the $N_R$ receive antennas. Each data stream may be steered toward one or multiple receive antennas.

At the receiver, matched filtering of $N_R$ received symbol streams for the $N_R$ receive antennas may be performed in either the time domain or the frequency domain. A matched filter is derived for each receive antenna based on the steering vector and the set of channel response vectors for that receive antenna (at block 1232). The received symbol stream for each receive antenna is filtered with the matched filter for that receive antenna to obtain a filtered symbol stream for the receive antenna (at block 1234). The $N_R$ filtered symbol streams from the $N_R$ matched filters for the $N_R$ receive antennas are then combined to obtain $N_D$ detected symbol streams for the $N_D$ data streams sent by the transmitter (at block 1236). Equalization may be performed on the $N_D$ detected symbol streams to obtain $N_D$ recovered symbol streams for the $N_D$ data streams sent by the transmitter (at block 1238).

v) Rate Selection

For both MISO system 100 and MIMO system 600, the receiver may estimate the received SNR for each spatial channel. The SNR computation may be dependent on the eigensteering scheme used for data transmission, as described above. The receiver may then compute an operating SNR, $\gamma_{op}(l)$, for each spatial channel based on the received SNR, $\gamma_{rx}(l)$ and an SNR offset, $\gamma_{os}(l)$ for the spatial channel (e.g., $\gamma_{op}(l)=\gamma_{rx}(l)+\gamma_{os}(l)$ where the units are in dB). The SNR offset may be used to account for estimation error, variability in the channel, and other factors. The receiver may select a suitable transmission mode for each spatial channel based on the operating SNR for that spatial channel.

The system may be designed to support a set of transmission modes. One of the supported transmission modes may be for a null rate (i.e., a data rate of zero). Each of the remaining transmission modes is associated with a particular non-zero data rate, a particular coding scheme or code rate, a particular modulation scheme, and a particular minimum SNR required to achieve the desired level of performance (e.g., 1% packet error rate (PER)) for a non-fading AWGN channel. For each supported transmission mode with a non-zero data rate, the required SNR is obtained based on the specific system design (i.e., the particular code rate, interleaving scheme, modulation scheme, and so on, used by the system for that transmission mode) and for an AWGN channel. The required SNR may be obtained by computer simulation, empirical measurements, and so on, as is known in the art. The set of supported transmission modes and their required SNRs may be stored in a look-up table.

The operating SNR, $\gamma_{op}(l)$, for each spatial channel may be provided to the look-up table, which then provides the transmission mode q(l) for that spatial channel. This transmission mode q(l) is the supported transmission mode with the highest data rate and a required SNR, $\gamma_{req}(l)$, that is less than or equal to the operating SNR (i.e., $\gamma_{req}(l) \leq \gamma_{op}(l)$). The receiver thus selects the highest possible data rate for each spatial channel based on the operating SNR for that spatial channel.

For clarity, specific embodiments of various eigensteering schemes have been described above. Other variants of these eigensteering schemes may also be devised, and this is within the scope of the invention. For example, the single correlation matrix for the MIMO channel may be computed in other manners than that described above for the principal mode and multi-mode eigensteering schemes. As another example, multiple data symbol streams may be transmitted on multiple spatial channels of the main path. As yet another example, $N_D$ data symbol streams may be transmitted on the $N_D$ best spatial channels based on the energy of the spatial channels. Other eigensteering schemes may also be devised based on the teachings provided herein, and this is within the scope of the invention.

The eigensteering techniques described herein may be implemented by various means. For example, these techniques may be implemented in hardware, software, or a combination thereof. For a hardware implementation, the processing at the transmitter for eigensteering and other pertinent functions may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing at the receiver for matched filtering and other pertinent functions may also be implemented within one or more ASICs, DSPs, and so on.

For a software implementation, the eigensteering techniques may be implemented with modules (e.g., procedures, functions, and so on) that perform the functions described herein. The software codes may be stored in memory units (e.g., memory units 142 and 182 in FIG. 1 or memory units 642 and 682 in FIG. 6) and executed by a processor (e.g., controllers 140 and 180 in FIG. 1 or controller 640 and 680 in FIG. 6). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing spatial processing in a wireless communication system, comprising:
    obtaining a plurality of channel response matrices for a channel response of a communication channel in the wireless communication system;
    computing a correlation matrix for the communication channel based on the plurality of channel response matrices; and
    decomposing the correlation matrix to obtain steering information for at least one spatial channel of the communication channel, wherein the steering information is used by a transmitting entity for spatial processing of a data stream sent on the at least one spatial channel associated with the steering information.

2. The method of claim 1, wherein the wireless communication system is a multiple-input multiple-output (MIMO) communication system, and the communication channel is a MIMO channel.

3. The method of claim 1, wherein the steering information includes at least one steering vector.

4. The method of claim 1, wherein the spatial processing is frequency-independent spatial processing.

5. The method of claim 1, wherein the plurality of channel response matrices comprise a plurality of channel impulse response matrices for a plurality of time delays of a channel impulse response of the communication channel.

6. The method of claim 1, wherein the plurality of channel response matrices comprise a plurality of channel frequency response matrices for a channel frequency response for a plurality of subbands of the communication channel.

7. The method of claim 1, wherein the computing the correlation matrix for the communication channel comprises:
    computing a correlation matrix of each of the plurality of channel response matrices to obtain a plurality of correlation matrices for the plurality of channel response matrices; and
    summing the plurality of correlation matrices for the plurality of channel response matrices to obtain the correlation matrix for the communication channel.

8. The method of claim 5, wherein the computing the correlation matrix for the communication channel comprises:
    determining energy of each of the plurality of channel impulse response matrices;
    identifying a channel impulse response matrix with highest energy among the plurality of channel impulse response matrices; and
    computing a correlation matrix of the channel impulse response matrix with the highest energy to generate the correlation matrix for the communication channel.

9. The method of claim 1, wherein eigenvalue decomposition of the correlation matrix is performed to obtain the steering information for the at least one spatial channel of the communication channel.

10. The method of claim 1, further comprising sending the steering information as feedback information to the transmitting entity.

11. The method of claim 1, wherein the steering information is used by the transmitting entity to generate a plurality of transmit chip streams for at least one data stream sent on the at least one spatial channel of the communication channel, and wherein the plurality of transmit chip streams are transmitted from a plurality of transmit antennas at the transmitting entity.

12. The method of claim 1, wherein the spatial processing is performed by the transmitting entity in the time-domain on a stream of time-domain chips generated for the data stream by OFDM modulation.

13. The method of claim 1, wherein the spatial processing is performed by the transmitting entity in the frequency-domain for each of a plurality of subbands on data symbols generated for the data steam.

14. The method of claim 1, further comprising:
obtaining, from the plurality of channel response matrices, a plurality of channel response vectors for each of a plurality of receive antennas at a receiving entity; and
deriving a matched filter for each of the plurality of receive antennas based on the steering information and the plurality of channel response vectors for the respective receive antenna.

15. The method of claim 14, wherein the matched filter for each of the plurality of receive antennas is used to maximize received signal-to-noise ratio (SNR) for the respective receive antenna.

16. The method of claim 14, further comprising filtering a plurality of received symbol streams for the plurality of receive antennas with the plurality of matched filters.

17. The method of claim 16, wherein the plurality of channel response matrices comprise a plurality of channel impulse response matrices for a plurality of time delays of a channel impulse response of the communication channel, and wherein the filtering is performed in the time domain with a plurality of time-domain matched filters derived for the plurality of receive antennas based on the steering information and the plurality of channel impulse response matrices.

18. The method of claim 16, wherein the plurality of channel response matrices comprise a plurality of channel frequency response matrices for a channel frequency response for a plurality of subbands of the communication channel, and wherein the filtering is preformed in the frequency domain with a plurality of frequency-domain matched filters derived for the plurality of receive antennas based on the steering information and the plurality of channel frequency response matrices.

19. The method of claim 3, wherein one steering vector is obtained and used by the transmitting entity for the spatial processing of one data stream.

20. The method of claim 19, further comprising:
deriving a matched filter for each of a plurality of receive antennas at a receiving entity based on the one steering vector and a plurality of channel response vectors for the receive antenna, wherein the plurality of channel response vectors for each receive antennas are obtained from the plurality of channel response matrices;
filtering a plurality of received symbol streams for the plurality of receive antennas with the plurality of matched filters to obtain a plurality of filtered symbol streams; and
combining the plurality of filtered symbol streams to obtain a detected symbol stream for the one data strewn sent by the transmitting entity.

21. The method of claim 20, further comprising performing equalization on the detected symbol stream to obtain a recovered symbol stream for the one data stream.

22. The method of claim 3, wherein a plurality of steering vectors are obtained and used by the transmitting entity for the spatial processing of a plurality of data streams sent on a plurality of spatial channels associated with the plurality of steering vectors.

23. The method of claim 22, further comprising:
deriving a matched filter for each of a plurality of receive antennas at a receiving entity based on the plurality of steering vectors and a plurality of channel response vectors for the receive antenna, wherein the plurality of channel response vectors for each receive antenna are obtained from the plurality of channel response matrices;
filtering a plurality of received symbol streams for the plurality of receive antennas with the plurality of matched filters to obtain a plurality of filtered symbol substreams; and
combining the plurality of filtered symbol substreams to obtain a plurality of detected symbol steams for the plurality of data streams sent by the transmitting entity.

24. The method of claim 23, further comprising performing space-time equalization for the plurality of detected symbol streams to obtain a plurality of recovered symbol streams for the plurality of data streams.

25. The method of claim 24, wherein the space-time equalization is preformed with a minimum mean square error linear equalizer (MMSE-LE), a decision feedback equalizer (DFE), or a maximum likelihood sequence estimator (MLSE).

26. An apparatus in a wireless communication system, comprising:
a channel estimator configured to obtain a plurality of channel response matrices for a channel response of a communication channel in the wireless communication system; and
a controller configured to compute a correlation matrix for the communication channel based on the plurality of channel response matrices and configured to decompose the correlation matrix to obtain steering information for at least one spatial channel of the communication channel, wherein the steering information is used by a transmitting entity for spatial processing of a data stream sent on the at least spatial channel associated with the steering information.

27. The apparatus of claim 26, wherein the wireless communication system is a multiple-input multiple-output (MIMO) communication system, and the communication channel is a MIMO channel.

28. The apparatus of claim 26, wherein the steering information includes at least one steering vector.

29. The apparatus of claim 26, wherein the spatial processing is frequency-independent spatial processing.

30. The apparatus of claim 26, wherein the controller is configured to compute a correlation matrix of each of the plurality of channel response matrices to obtain a plurality of correlation matrices for the plurality of channel response matrices, and is configured to sum the plurality of correlation matrices to obtain the correlation matrix for the communication channel.

31. The apparatus of claim 26, wherein the plurality of channel response matrices comprise a plurality of channel impulse response matrices for a plurality of time delays of a channel impulse response of the communication channel, and wherein the controller is configured to determine energy of each of the plurality of channel impulse response matrices and configured to compute a correlation matrix of a channel impulse response matrix with highest energy among the plurality of channel impulse response matrices to obtain the correlation matrix for the communication channel.

32. The apparatus of claim 26, further comprising:
a plurality of matched filters for a plurality of receive antennas, one matched filter for each receive antenna, each matched filter is configured to filter a received symbol stream for an associated receive antenna to obtain a filtered symbol stream, wherein the matched filter for each receive antenna is derived based on the steering information and a plurality of channel response vectors for the receive antenna, and wherein the plurality of channel response vectors for each receive antenna are obtained from the plurality of channel response matrices; and a combiner configured to combine a plurality of filtered symbol streams from the plurality of matched filters to obtain at least one detected symbol stream for at least one data steam sent by the transmitting entity.

33. An apparatus in a wireless communication system, comprising:

means for obtaining a plurality of channel response matrices for a channel response of a communication channel in the wireless communication system;

means for computing a correlation matrix for the communication channel based on the plurality of channel response matrices; and means for decomposing the correlation matrix to obtain steering information for at least one spatial channel of the communication channel, wherein the steering information is used by a transmitting entity for spatial processing of a data stream sent on the at least one spatial channel associated with the steering information.

34. The apparatus of claim 33, wherein the wireless communication system is a multiple-input multiple-output (MIMO) communication system, and the communication channel is a MIMO channel.

35. The apparatus of claim 33, wherein the steering information includes at least one steering vector.

36. The apparatus of claim 33, wherein the spatial processing is frequency-independent spatial processing.

37. The apparatus of claim 33, wherein the means for computing the correlation matrix comprises:

means for computing a correlation matrix of each of the plurality of channel response matrices to obtain a plurality of correlation matrices for the plurality of channel response matrices; and means for summing the plurality of correlation matrices to obtain the correlation matrix for the communication channel.

38. The apparatus of claim 33, wherein the plurality of channel response matrices comprise a plurality of channel impulse response matrices for a plurality of time delays of a channel impulse response of the communication channel.

39. The apparatus of claim 38, wherein the means for computing the correlation matrix comprises:

means for determining energy of each of the plurality of channel impulse response matrices; and means for computing a correlation matrix of a channel impulse response matrix with highest energy among the plurality of channel impulse response matrices to obtain the correlation matrix for the communication channel.

40. A processor readable media for storing instructions operable to:

receive a plurality of channel response matrices for a channel response of a communication channel in a wireless communication system;

compute a correlation matrix for the communication channel based on the plurality of channel response matrices; and decompose the correlation matrix to obtain steering information for at least one spatial channel of the communication channel, wherein the steering information is used by a transmitting entity for spatial processing of a data stream sent on the at least one spatial channel associated with the steering information.

41. The processor readable media of claim 40, wherein the wireless communication system is a multiple-input multiple-output (MIMO) communication system, and the communication channel is a MIMO channel.

42. The processor readable media of claim 40, wherein the steering information includes at least one steering vector.

43. The processor readable media of claim 40, wherein the spatial processing is frequency-independent spatial processing.

44. The processor readable media of claim 40, further storing instructions operable to:

compute a correlation matrix of each of the plurality of channel response matrices to obtain a plurality of correlation matrices for the plurality of channel response matrices; and sum the plurality of correlation matrices to obtain the correlation matrix for the communication channel.

45. The processor readable media of claim 40, wherein the plurality of channel response matrices comprise a plurality of channel impulse response matrices for a plurality of time delays of a channel impulse response of the communication channel.

46. The processor readable media of claim 45, further storing instructions operable to:

compute energy of each of the plurality of channel impulse response matrices; and compute a correlation matrix of a channel impulse response matrix with highest energy among the plurality of channel impulse response matrices to obtain the correlation matrix for the communication channel.

47. A method of performing spatial processing in a communication system, comprising:

obtaining a plurality of channel impulse response matrices for a communication channel in the wireless communication system, wherein the plurality of channel impulse response matrices comprise a plurality of time delays of a channel impulse response of the communication channel;

computing energy of each of the plurality of channel impulse response matrices;

identifying a channel impulse response matrix with highest energy among the plurality of channel impulse response matrices as a channel impulse response matrix for a main, path of the communication channel;

computing a correlation matrix of the channel impulse response matrix for the main path; and decomposing the correlation matrix to obtain steering information for a spatial channel of the main path, wherein the steering information is used by a transmitting entity for spatial processing of a data stream sent via the communication channel.

48. The method of claim 47, wherein the wireless communication system is a multiple-input multiple-output (MIMO) communication system, and the communication channel is a MIMO channel.

49. The method of claim 47, wherein the steering information includes at least one steering vector.

50. The method of claim 47, wherein the spatial processing is frequency-independent spatial processing.

51. The method of claim 47, wherein eigenvalue decomposition of the correlation matrix for the main path is performed to obtain the steering information for the spatial channel of the main path.

52. The method of claim 47, further comprising:
deriving a matched filter for each of a plurality of receive antennas at a receiving entity based on the steering information and a plurality of channel impulse response vectors for the receive antenna, wherein the plurality of channel impulse response vectors for each receive antenna are obtained from the plurality of channel impulse response matrices; and
filtering a plurality of received symbol streams for the plurality of receive antennas with the plurality of matched filters.

53. A method of performing spatial processing in a wireless communication system with a plurality of transmit antennas at a transmitting entity and a plurality of receive antennas at a receiving entity, the method comprising:
obtaining a plurality of sets of channel response vectors for the plurality of receive antennas, one set for each receive antenna, wherein each set of channel response vectors is indicative of a channel response between the plurality of transmit antennas and one of the plurality of receive antennas;
computing a correlation matrix for each of the plurality of receive antennas based on the set of channel response vectors for the receive antenna; and
decomposing the correlation matrix for each receive antenna to obtain a steering vector for the receive antenna, wherein a plurality of steering vectors are obtained for the plurality of receive antennas and the plurality of steering vectors are used by the transmitting entity for spatial processing of at least one data stream sent to the receiving entity.

54. The method of claim 53, wherein the spatial processing is frequency-independent spatial processing.

55. The method of claim 53, wherein the computing the correlation matrix for each receive antenna includes:
computing a correlation matrix of each of the plurality of channel response vectors for the receive antenna to obtain a plurality of correlation matrices for the plurality of channel response vectors for the receive antenna, and summing the plurality of correlation matrices for the plurality of channel response vectors for the receive antenna to obtain the correlation matrix for the receive antenna.

56. The method of claim 53, further comprising:
deriving a matched filter for each of the plurality of receive antennas based on the steering vector and the set of channel response vectors for the receive antenna, filtering a received symbol stream for each of the plurality of receive antennas with the matched filter for the receive antenna to obtain a filtered symbol stream for the receive antenna; and
combining a plurality of filtered symbol streams forte plurality of receive antennas to obtain at least one detected symbol stream for the at least one data stream sent by the transmitting entity.

57. The method of claim 53, wherein one data stream is sent by the transmitting entity to the plurality of receive antennas using the plurality of steering vectors.

58. The method of claim 53, wherein a plurality of data streams are sent by the transmitting entity to the plurality of receive antennas using the plurality of steering vectors.

59. The method of claim 58, further comprising:
deriving a matched filter for each of the plurality of receive antennas based on the steering vector and the plurality of channel response vectors for the receive antenna, wherein a plurality of matched filters are derived for the plurality of receive antennas;
filtering a plurality of received symbol streams for the plurality of receive antennas with the plurality of matched filters to obtain a plurality of filtered symbol streams; and
combining the plurality of filtered symbol streams to obtain a plurality of detected symbol streams for the plurality of data streams sent by the transmitting entity.

60. The method of claim 59, further comprising:
performing space-time equalization on the plurality of detected symbol streams to obtain a plurality of recovered symbol streams for the plurality of data streams.

61. An apparatus in a wireless communication system with a plurality of transmit antennas at a transmitting entity and a plurality of receive antennas at a receiving entity, the apparatus comprising:
a channel estimator configured to obtain a plurality of sets of channel response vectors for the plurality of receive antennas, one set for each receive antenna, wherein each set of channel response vectors is indicative of a channel response between the plurality of transmit antennas and one of the plurality of receive antennas; and
a controller configured to compute a correlation matrix for each of the plurality of receive antennas based on the set of channel response vectors for the receive antenna and to decompose the single correlation matrix for each receive antenna to obtain a steering vector for the receive antenna, wherein a plurality of steering vectors are obtained for the plurality of receive antennas and the plurality of steering vectors are used by the transmitting entity for spatial processing of at least one data stream sent to the receiving entity.

62. The apparatus of claim 61, wherein the spatial processing is frequency-independent spatial processing.

63. The apparatus of claim 61, wherein the controller is configured to compute a correlation matrix of each of the plurality of channel response vectors for each receive antenna to obtain a plurality of correlation matrices for the plurality of channel response vectors for the receive antenna and to sum the plurality of correlation matrices for the plurality of channel response vectors for the receive antenna to obtain the correlation matrix for the respective receive antenna.

64. The apparatus of claim 61, wherein the controller is configured to derive a matched filter for each of the plurality of receive antennas based on the steering vector and the set of channel response vectors for the respective receive antenna.

65. The apparatus of claim 64, further comprising:
a plurality of matched filters for the plurality of receive antennas, one matched filter for each receive antenna, each matched filter is configured to filter a received symbol stream for the associated receive antenna to obtain a filtered symbol stream; and
a combiner configured to combine a plurality of filtered symbol streams from the plurality of matched filters to obtain at least one detected symbol stream for the at least one data stream sent by the transmitting entity.

66. An apparatus in a wireless communications system, comprising:
means for obtaining a plurality of sets of channel response vectors for a plurality of receive antennas, one set for each receive antenna, wherein each set of channel response vectors is indicative of a channel response between a plurality of transmit antennas and one of the plurality of receive antennas;
means for computing a correlation matrix for each of the plurality of receive antennas based on the set of channel response vectors for the respective receive antenna; and means for decomposing the single correlation matrix for each receive antenna to obtain a steering vector for the respective receive antenna, wherein a plurality of steering vectors are obtained for the plurality of receive antennas and are used by a transmitting entity for spatial processing of at least one data stream sent to a receiving entity.

67. The apparatus of claim 66, wherein the spatial processing is frequency-independent spatial processing.

68. The apparatus of claim 66, further comprising:
means for computing a correlation matrix of each of the plurality of channel response vectors for each receive antenna to obtain a plurality of correlation matrices for the plurality of channel response vectors for the receive antenna; and
means for summing the plurality of correlation matrices for the plurality of channel response vectors for each receive antenna to obtain the correlation matrix for the respective receive antenna.

69. The apparatus of claim 66, further comprising:
means for deriving a matched filter for each of the plurality of receive antennas based on the steering vector and the set of channel response vectors for the respective receive antenna;
means for filtering a received symbol steam for each of the plurality of receive antennas with the matched fiber for the receive antenna to obtain a filtered symbol stream for the respective receive antenna; and
means for combining a plurality of filtered symbol streams for the plurality of receive antennas to obtain at least one detected symbol stream for the at least one data stream sent by the transmitting entity.

70. A computer-readable media for storing instructions operable to:
receive a plurality of sets of channel response vectors for a plurality of receive antennas, one set for each receive antenna, wherein each set of channel response vectors is indicative of a channel response between a plurality of transmit antennas and one of the plurality of receive antennas;
compute a correlation matrix for each of the plurality of receive antennas based on the set of channel response vectors for the respective receive antenna; and
decompose the correlation matrix for each receive antenna to obtain a steering vector for the respective receive antenna, wherein a plurality of steering vectors are obtained for the plurality of receive antenna and are used by a transmitting entity for spatial processing of at least one data stream sent to a receiving entity.

71. The processor readable media of claim 70, wherein the spatial processing is frequency-independent spatial processing.

72. The processor readable media of claim 70 and further storing instructions operable to:
compute a correlation matrix of each of the plurality of channel response vectors for each receive antenna to obtain a plurality of correlation matrices for the plurality of channel response vectors for the respective receive antenna; and
sum the plurality of correlation matrices for the plurality of channel response vectors for each receive, antenna to obtain the correlation matrix for the respective receive antenna.

73. The processor readable media of claim 70 and further storing instructions operable to:
derive a matched filter for each of the plurality of receive antennas based on the steering vector and the set of channel response vectors for the respective receive antenna;
filter a received symbol stream for each of the plurality of receive antennas with the matched filter for the receive antenna to obtain a filtered symbol stream for the respective receive antenna; and
combine a plurality of filtered symbol streams for the plurality of receive antennas to obtain at least one detected symbol stream for the at least one data stream sent by the transmitting entity.

74. A method of performing spatial processing in a multiple-input single-output (MISO) system utilizing orthogonal frequency division multiplexing (OFDM), the method comprising: obtaining a set of channel response vectors indicative of a channel response between a plurality of transmit antennas at a transmitting entity and a receive antenna at a receiving entity in the MISO system; computing a correlation matrix based on the set of channel response vectors; and decomposing the correlation matrix to obtain steering information used by the transmitting entity for spatial processing of a data stream sent to the receiving entity.

75. The method of claim 74, wherein the wireless communication system is a multiple-input single-output (MISO) communication system.

76. The method of claim 74, wherein the steering information includes at least one steering vector.

77. The method of claim 74, wherein the spatial processing is frequency-independent spatial processing.

78. The method of claim 74, wherein the spatial processing is performed by the transmitting entity in the dine-domain on a stream of time-domain chips generated for the data stream by OFDM modulation.

79. The method of claim 74, wherein the spatial processing is performed by the transmitting entity in the frequency-domain for each of a plurality of subbands on data symbols generated for the data stream.

80. The method of claim 74, further comprising: deriving a matched filter based on the steering information and the set of channel response vectors; and filtering a received symbol stream with the matched filter to obtain a detected symbol stream.

* * * * *